United States Patent
Sheridon

(10) Patent No.: US 6,542,283 B1
(45) Date of Patent: Apr. 1, 2003

(54) GYRICON DISPLAYS UTILIZING MAGNETIC ELEMENTS AND MAGNETIC TRAPPING

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/200,553

(22) Filed: Nov. 25, 1998

(51) Int. Cl.⁷ .............................................. G02B 26/00
(52) U.S. Cl. ...................... 359/296; 359/107; 359/111; 359/298; 427/214; 427/282; 347/172
(58) Field of Search ................................. 359/107, 111, 359/296, 298; 347/172; 427/214, 282

(56) References Cited

U.S. PATENT DOCUMENTS

| | | | |
|---|---|---|---|
| 3,036,388 A | 5/1962 | Tate | 35/66 |
| 3,406,363 A | 10/1968 | Tate | 335/302 |
| 3,615,993 A | 10/1971 | French | 156/155 |
| 3,846,161 A | 11/1974 | Marks | 117/93 |
| 3,982,334 A | 9/1976 | Tate | 35/66 |
| 4,117,194 A | 9/1978 | Barbe et al. | 428/374 |
| 4,126,854 A | 11/1978 | Sheridon | 340/373 |
| 4,139,841 A | 2/1979 | Roberts | 340/373 |
| 4,197,063 A | 4/1980 | Davidson | 425/8 |
| 4,209,481 A | 6/1980 | Kashiro et al. | 264/24 |
| 4,232,084 A | 11/1980 | Tate | 428/309 |
| 4,256,677 A | 3/1981 | Lee | 264/8 |
| 4,261,653 A | 4/1981 | Goodrich | 350/362 |
| 4,810,431 A | 3/1989 | Leidner | 254/15 |
| 5,262,098 A | 11/1993 | Crowley et al. | 264/8 |
| 5,290,066 A | 3/1994 | Mody | 281/15.1 |
| 5,344,594 A | 9/1994 | Sheridon | 264/4.1 |
| 5,354,521 A | 10/1994 | Goodman | 264/24 |
| 5,411,398 A | 5/1995 | Nakanishi et al. | 434/409 |
| 5,468,275 A | 11/1995 | Lin et al. | 65/497 |
| 5,474,590 A | 12/1995 | Lin | 65/202 |
| 5,515,075 A | 5/1996 | Nakagiri et al. | 345/111 |
| 5,526,016 A | 6/1996 | Nakagiri et al. | 345/111 |
| 5,569,432 A | 10/1996 | Maciejewski | 264/439 |
| 5,582,841 A | 12/1996 | Watton et al. | 425/8 |
| 5,627,562 A | 5/1997 | Skodlar | 345/111 |
| 5,647,883 A | 7/1997 | Houpt et al. | 65/494 |
| 5,708,525 A | 1/1998 | Sheridon | 359/296 |
| 5,717,514 A * | 2/1998 | Sheridon | |
| 5,717,515 A * | 2/1998 | Sheridon | |
| 5,737,115 A * | 4/1998 | MacKinlay et al. | |
| 5,739,801 A * | 4/1998 | Sheridon | |
| 5,751,268 A | 5/1998 | Sheridon | 345/107 |
| 5,754,332 A | 5/1998 | Crowley | 359/296 |
| 5,760,761 A | 6/1998 | Sheridon | 345/107 |
| 5,767,826 A | 6/1998 | Sheridon et al. | 345/84 |

OTHER PUBLICATIONS

Patent Abstracts of Japan, vol. 1998, No. 13, Nov. 30, 1998 & JP 10 214048 A (Brother Ind Ltd.), Aug. 11, 1998 *abstract*.

(List continued on next page.)

Primary Examiner—Cynthia H. Kelly
Assistant Examiner—Kimberly Nguyen
(74) Attorney, Agent, or Firm—Oliff & Berridge, PLC

(57) ABSTRACT

A sheet material for use in a gyricon display in which a rotatable element, which has a portion which is capable of being permanently magnetized may be oriented to experience either an attractive force or a repelling force between itself and another magnetized element. The attractive force between the element and the pad serve to latch the element in place and prevent unwanted display changes from taking place while the repellant force serves to trap the element in place for the same reasons. The element may be constructed to be either cylindrically or spherically shaped. Further, the sheet material may also contain soft magnetic material pads which may be arranged to provide multiple latching states as desired.

26 Claims, 35 Drawing Sheets

OTHER PUBLICATIONS

Lawrence L. Lee, A Magnetic–Particles Display, *Proceeding of the S.I.D.*, vol. 16/3, Third Quarter 1975, pp. 177–184.

Lawrence L. Lee, 9.5: Matrix–Addressed Magnetic Particles Displays, *S.I.D. 77 Digest,* First Edition, Apr. 1977, pp. 112–113.

M. Saitoh, T. Mori, R. Ishikawa, and H. Tamura, A Newly Developed Electrical Twisting Ball Display, *Proceedings of the S.I.D.*, vol. 23/4, 1982, pp. 249–253.

Nicholas K. Sheridon, U.S. Ser. No. 08/889,762, A Method for Fabricating Polychromal Segmented Balls for a Twisting Ball Display, Filed Jul. 10, 1997.

Nicholas K. Sheridon, U.S. Ser. No. 08/890,830, An Apparatus for Fabricating Polychromal Segmented Balls for a Twisting Ball Display, Filed Jul. 10, 1997.

Nicholas K. Sheridon, U.S. Ser. No. 08/962,976, A Method of Manufacturing a Twisting Cylinder Display Using Multiple Chromatic Values, Filed Oct. 30, 1997.

* cited by examiner

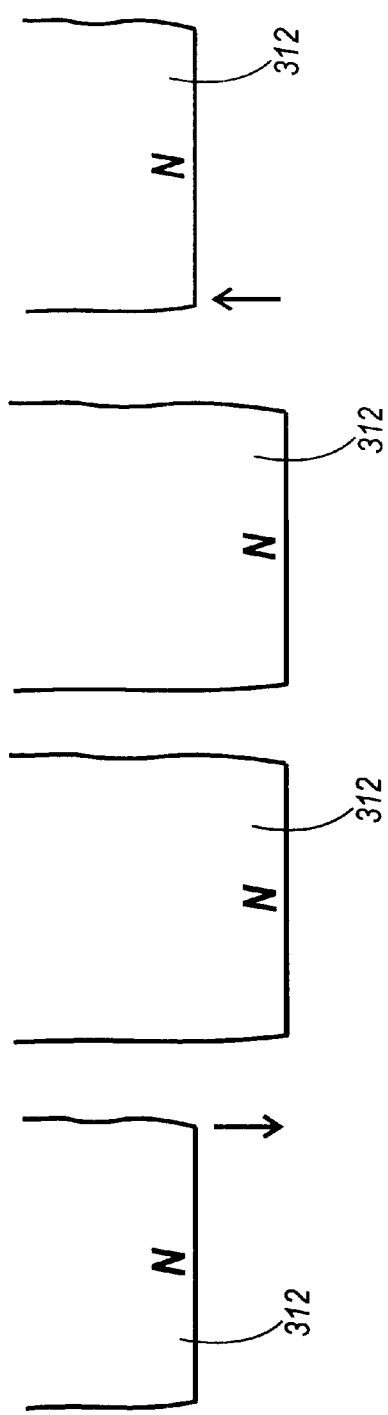
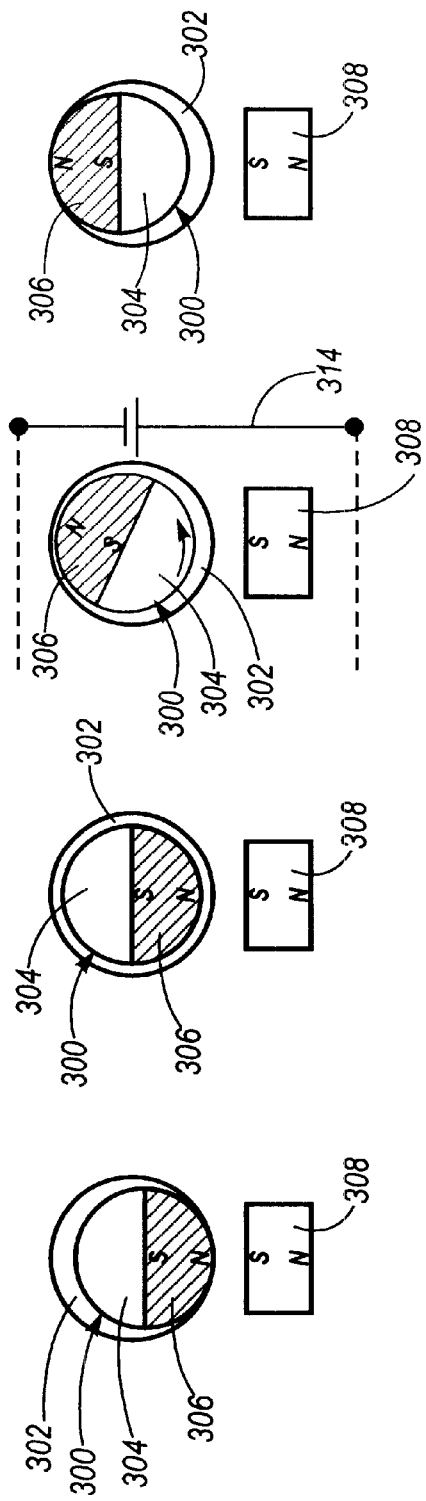
FIG. 42  FIG. 41  FIG. 40  FIG. 39

GYRICON DISPLAYS UTILIZING MAGNETIC ELEMENTS AND MAGNETIC TRAPPING

CROSS-REFERENCE TO RELATED APPLICATIONS

The present invention is related to the following U.S. patent applications that are filed simultaneously with this application:

"Gyricon Displays Utilizing Magnetic Addressing And Latching Mechanisms" by Sheridon, U.S. patent application Ser. No. 09/199,544, "Gyricon Displays Utilizing Rotating Elements And Magnetic Latching" by Sheridon, U.S. Pat. No. 6,147,791, "Method Of Making Uniformly Magnetized Elements For A Gyricon Display" by Sheridon, U.S. Pat. No. 6,097,531, "An Apparatus For Making Uniformly Magnetized Elements For A Gyricon Display" by Sheridon, U.S. patent application Ser. No. 09/200,406, "A Method Of Making A Gyricon Display Using Magnetic Latching" by Sheridon, U.S. Pat. No. 6,110,538, "A Method Of Making A Gyricon Display Using Magnetic Latching" by Sheridon, U.S. patent application Ser. No. 09/199,818, "A Method Of Making A Gyricon Display Using Magnetic Latching" by Sheridon, U.S. patent application Ser. No. 09/199,543, "Magnetic Unlatching And Addressing Of A Gyricon Display" by Sheridon, U.S. patent application Ser. No. 09/199,473.

INCORPORATION BY REFERENCE

The following U.S. patents are herein fully incorporated by reference:

U.S. Pat. No. 4,126,854 by Sheridon titled "Twisting Ball Panel Display",

U.S. Pat. No. 4,143,103 by Sheridon titled "Method Of Making A Twisting Ball Panel Display", U.S. Pat. No. 5,262,098 by Crowley et al. titled "Method And Apparatus For Fabrication Bichromal Balls For A Twisting Ball Display", U.S. Pat. No. 5,344,594, by Sheridon titled "Method For Fabrication Of Multicolored Balls For A Twisting Ball Display", U.S. Pat. No. 5,389,945, by Sheridon titled "Writing System Including Paper-Like Digitally Addressed Media and Addressing Device Therefor", U.S. Pat. No. 5,604,027 by Sheridon titled "Some Uses Of Microencapsulation For Electric Paper", U.S. Pat. No. 5,717,514 by Sheridon titled "Polychromal Segmented Balls For A Twisting Ball Display", Pat. No. U.S. Pat. No. 5,767,826 by Sheridon et al. titled "Substractive Color Twisting Ball Display", U.S. Pat. No. 5,777,782 by Sheridon titled "Auxiliary Optics For A Twisting Ball Display", U.S. Pat. No. 6,055,091 by Sheridon et al. titled "Twisting Cylinder Display", U.S. patent application Ser. No. 08/960,865 by Sheridon et al. titled "Twisting Cylinder Display", U.S. Pat. No. 5,894,367 by Sheridon titled "Twisting Cylinder Display Using Multiple Chromatic Values", and U.S. patent application Ser. No. 09/037,767 by Howard et al. titled "Charge Retention Islands For Electric Paper And Applications Thereof".

BACKGROUND

This invention relates generally to Electric Paper or Gyricons and more particularly concerns a rotating element sheet material in which magnetic fields are used in addition to electric fields for addressing, latching the rotating elements into place once an image has been selected for display, and to provide selected threshold behaviors for individual types of elements.

Lee (L. L. Lee, "A Magnetic Particles Display", IEEE Trans. On Elect. Devices, Vol. ED-22, Number 9, September 1975 and L. L. Lee, "Matrix Addressed Magnetic Particles Display", in 1977 Soc. For Information Display International Symposium, Digest of Technical Papers, Boston, April 1977) has described the addressing of a twisting rotating element display in which the rotating elements have a magnetic dipole with magnetic fields. U.S. Pat. No. 3,036,388 by Tate, and issued in May 1962 uses a stylus consisting of a magnetic dipole to address a display consisting of magnetized particles having black and white surfaces corresponding to a given magnetic polarity. More recently, U.S. Pat. No. 5,411,398 by Nakanishi et al. and titled "Magnetic Display System" describes the use of a magnetic dipole to address a display consisting of black ferromagnetic particles and white, non-magnetic particles dispersed in an oil and in turn contained in microcapsules arranged in a layer. Upon application of a magnetic dipole, the black ferromagnetic particles are pushed to the rear of the microcapsules, revealing only the white particles, or pulled to the front of the microcapsules so that mostly only the black ferromagnetic particles can be seen by an observer.

In the above prior art only magnetic fields are used to address twisting or moving magnetic particles and rotating elements. There is no mention or attempt to use electrical fields combined with magnetic fields.

U.S. Pat. Nos. 4,126,854 titled "Twisting Ball Panel Display" issued Nov. 21, 1978, and U.S. Pat. No. 4,143,103 titled "Method Of Making A Twisting Ball Display", issued Mar. 6, 1979, both by Sheridon, describe a twisting rotating element (or "Gyricon") display that comprises bichromal rotating elements contained in liquid-filled spherical cavities and embedded in an elastomer medium. One segment of the bichromal rotating elements has a larger electrical charge in contact with the liquid and in the presence of the electrical field than the other segment. Thus, for a given polarity of applied electrical field, one segment will rotate toward and be visible to an observer of the display. Applying the opposite polarity of electrical field will cause the rotating element to rotate and present the other segment to be seen by the observer.

U.S. Pat. No. 4,143,103 describes the response of the bichromal rotating element to the applied electrical field as a threshold response. That is, as the external field is increased, the bichromal rotating element remains stationary in position, until a threshold voltage is reached, at which time the rotating element starts to rotate from its initial position. The amount of rotation increases with an increasing electrical field until a 180 degree rotation can be achieved. The value of the external field that causes a 180 degree rotation is called the full addressing voltage.

The response pattern of the bichromal rotating element to an external electrical field determines the types of addressing that may be used to create images on the Gyricon display. There are known in the art three types of addressing schemes for displays. The first of these is active matrix addressing, which places the least demands on the properties of the display.

In active matrix addressing a separate addressing electrode is provided for each pixel of the display and each of these electrodes is continuously supplied with an addressing voltage. The complete set of voltages can be changed for each addressing frame. This type of addressing places the least demands on the properties of the display medium, however, active matrix addressing is the most expensive, most complicated and least energy efficient type of addressing.

The second type of addressing scheme is passive matrix addressing. Passive matrix addressing makes use of two sets of electrodes, one on each side of the display medium. Typically, one of these consists of horizontal conductive bars and the other consists of vertical conductive bars. The bars on the front surface or window of the display are necessarily transparent. To address the display medium a voltage is placed on a horizontal conductive bar and a voltage is placed on a vertical conductive bar. The segment of medium located at the intersection of these two bars experiences a voltage equal to the sum of these two voltages. If the voltages are equal, as they usually are, the sections of medium located adjacent to the each of the bars, but not at the intersection of the bars, experience ½ the voltage experienced by the section of medium at the bar intersection. Passive addressing is less complicated and more energy efficient because the pixels of the display medium are addressed only for as long as is required to change their optical states. However, the requirements for a medium that can be addressed with a passive matrix display are significantly greater than for the active matrix case. The medium must respond fully to the full addressing voltage but it must not respond to ½ the full addressing voltage. This is called a threshold response behavior. The medium must also stay in whichever optical state it has been switched into by the addressing electrodes without the continuous application of voltage, that is it should store the image without power. Passive addressing is the most widely used method of addressing displays and is the lowest cost.

The third type of addressing, and probably the most useful for Electric Paper (paper surrogate) applications, consists of a linear array of addressing electrodes in the form of a bar that can be moved over the surface of the display medium. Typically, the medium is placed over a grounding electrode and is protected from possible mechanical damage from the moving bar by placing a thin window between the bar and the Electric Paper. As the bar is moved over the display medium, it applies voltages to specific pixels of the medium for short periods of time and generates a full image each time the bar is scanned over the surface. In one variation of this method, the addressing bar deposits image-wise charge on the surface of the window.

The requirements imposed on the display medium by this form of addressing then depend on which type of addressing bar is used. If the addressing bar simply exposes the medium to voltages as it passes over the display window, then it is necessary for the display medium to exhibit threshold behavior. Thus the area of the medium directly under the addressing bar electrode must change optical states when exposed to the full addressing voltage, but as the bar moves to the next row of pixels, this same area of medium must not respond to the diminished voltages experienced by the medium from the moving addressing bar. As in passive addressing, this requires that the medium have a sharp threshold response. This addressing bar also requires that the optical state of the medium completely change during the time the addressing bar electrodes move over its vicinity which usually limits the display frame addressing speed. Copending U.S. patent application Ser. No. 09/037,767 by Howard et al. and titled "charge Retention Islands For Electric Paper And Applications Thereof" also assigned to the same assignee as this application, describes an arrangement of addressing electrodes that greatly reduces the switching speed requirements of the medium due to this effect.

In U.S. patent application Ser. No. 09/037,767 the addressing bar deposits image-wise charge on the surface of the display window. The charge deposition addressing method relaxes the requirements on the display medium. The addressing bar speed over the medium surface is limited only by the rate at which it can deposit image-wise charge, because the medium can respond to the voltage associated with the deposited charge pattern at its own speed. Threshold response behavior is not so important, however the ability to store the image is because it can be expected that the image-wise charge deposited on the window surface will leak off over a short period of time. However, addressing bars that can deposit image-wise charge on the display window tend to be bulky and more expensive than bars that simply impose image-wise voltages directly.

There is a need, therefore, to find other means to control the optical switching characteristics and optical image storage characteristics of Gyricon display media. It is the purpose of this patent application to disclose new and improved means of accomplishing this by the addition of magnetic materials in the composition of the Gyricon rotating elements and the sheet material and by the use of externally imposed magnetic fields.

Accordingly, it is the primary aim of the invention to provide a means for controlling the optical switching characteristics and the image storage characteristics of gyricon sheets by using magnetic materials and magnetic fields to provide sharp and uniform threshold voltages, provide improved image latching characteristics, and in conjunction with electric fields to provide improved addressing methods.

Further advantages of the invention will become apparent as the following description proceeds.

SUMMARY OF THE INVENTION

A material for use in a gyricon display system. The material has a substrate and an element, which can be made rotatable by a non-destructive operation, having a diameter and a circumference, disposed in the substrate. The element is made up of at least two portions with each portion having an associated optical modulation characteristic. The optical modulation characteristics of at least one portion are different from the optical modulation characteristic of at least one other portion, and at least one portion is capable of being permanently magnetized. The element has an anisotropy for providing an electrical dipole moment, the electrical dipole moment rendering the element electrically responsive such that when the rotating element is rotatably disposed in an electric field while the electrical dipole moment of the element is provided, the element tends to rotate to an orientation in which the electrical dipole moment aligns with the field. There is also at least one magnetized pad disposed within said substrate for each element. The magnetized pad is associated with an element and spaced from its associated element. The pad is so constructed and arranged such that when the permanently magnetized portion of the element is oriented such that the permanently magnetized portion of the element is the portion of the element nearest the magnetized pad a magnetic attractive force will exist between the soft magnetic material pad and the permanently magnetized portion of the element. If the permanently magnetized portion of the element is oriented such that the permanently magnetized portion of the element is the portion of the element furthest from the magnetized pad a magnetic repellant force will exist between the magnetized pad and the permanently magnetized portion of the element trapping the element in that orientation. The elements may be substantially cylindrical or spherical in shape.

BRIEF DESCRIPTION OF THE DRAWINGS

While the present invention will be described in connection with a preferred embodiment and method of use, it will be understood that it is not intended to limit the invention to that embodiment/procedure. On the contrary, it is intended to cover all alternatives, modifications and equivalents as may be included within the spirit and scope of the invention as defined by the appended claims.

FIG. 39 shows a first step in an addressing process, according to the present invention, for a gyricon sheet shown in FIGS. 20–24.

FIG. 40 shows a second step in an addressing process, according to the present invention, for a gyricon sheet shown in FIGS. 20–24.

FIG. 41 shows a third step in an addressing process, according to the present invention, for a gyricon sheet shown in FIGS. 20–24.

FIG. 42 shows a fourth step in an addressing process, according to the present invention, for a gyricon sheet shown in FIGS. 20–24.

DETAILED DESCRIPTION OF THE INVENTION

Figure 1:
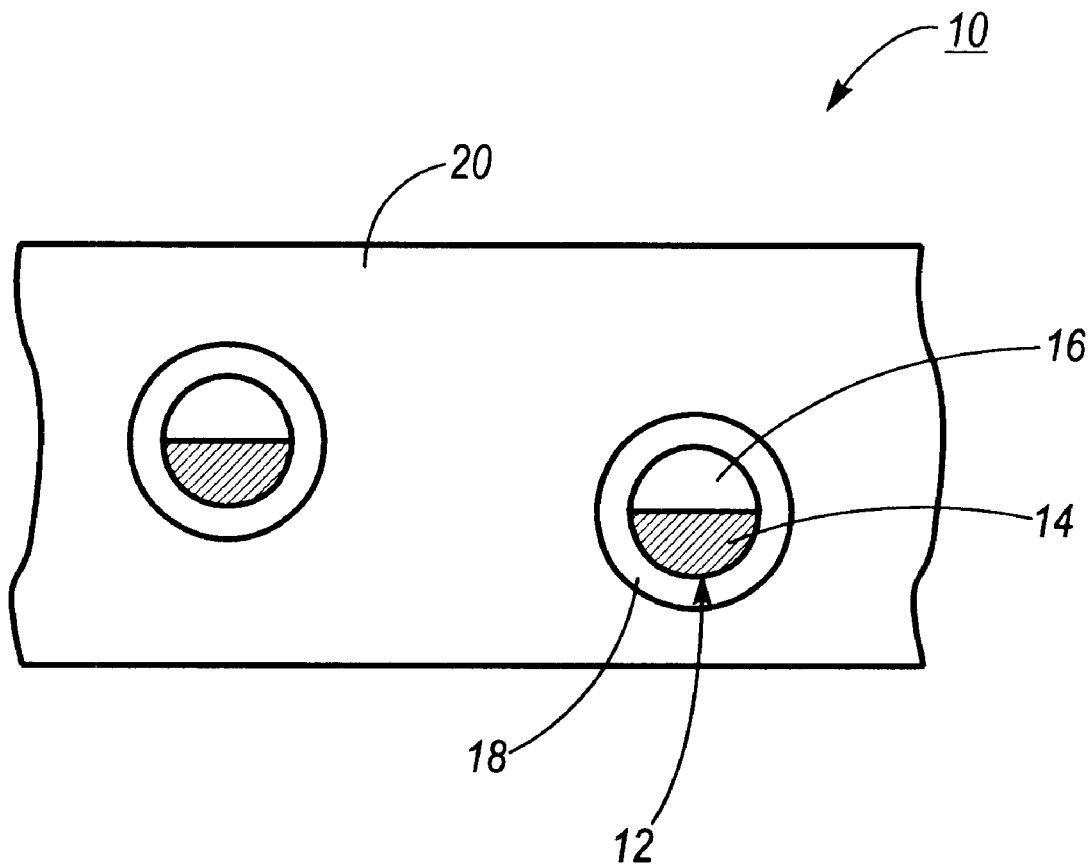
FIG. 1 shows a cross-sectional view of a prior art gyricon.

Turning now to FIG. 1 a prior art Gyricon sheet 10 is shown. The gyricon sheet consists of spherically symmetric rotating elements 12 with anisotropic electrical and optical properties. The rotating element 12 can be made to rotate and thus exhibit changes in optical properties by the imposition of external electrical fields. FIG. 1 portrays a gyricon sheet 10 as disclosed in U.S. Pat. No. 4,143,103 by Sheridon, titled "Method Of Making A Twisting Ball Panel Display", and incorporated by reference hereinabove in the form of a bichromal rotating element having segments 14, 16 with different electrical and optical properties. This rotating element 12 is located in an oil filled cavity 18 in a transparent optical medium 20. When voltages are applied to addressing electrodes (not shown) the rotating element 12 will rotate, presenting either the black segment 14 or the white segment 16 to the viewer.

Figure 2:
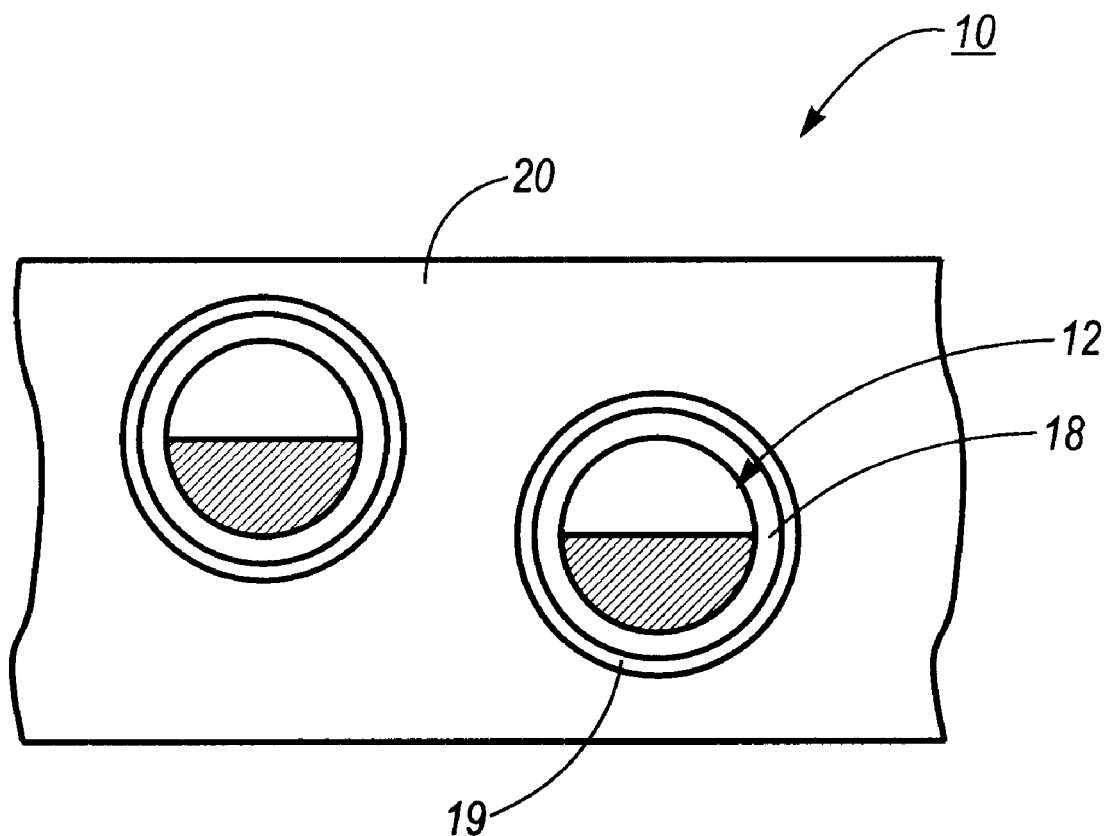
FIG. 2 shows a cross-sectional view of a prior art gyricon.

Another method of making gyricon sheets is disclosed in U.S. Pat. No. 5,604,027 titled "Some Uses Of Microencapsulation For Electric Paper" by Sherdon and hereinabove incorporated by reference. The resultant structure is shown in FIG. 2 and has the same components as the structure shown in FIG. 1, therefore the same reference numerals will be used for the same elements. The gyricon sheet 10 is composed of a transparent optical medium 20, with an oil filled cavity 18 enclosing a rotating element 12. However, due to the manufacturing process a skin 19 is interposed between the oil filled cavity 18 and the transparent optical medium 20 and encloses the oil filled cavity 18.

Figure 3:
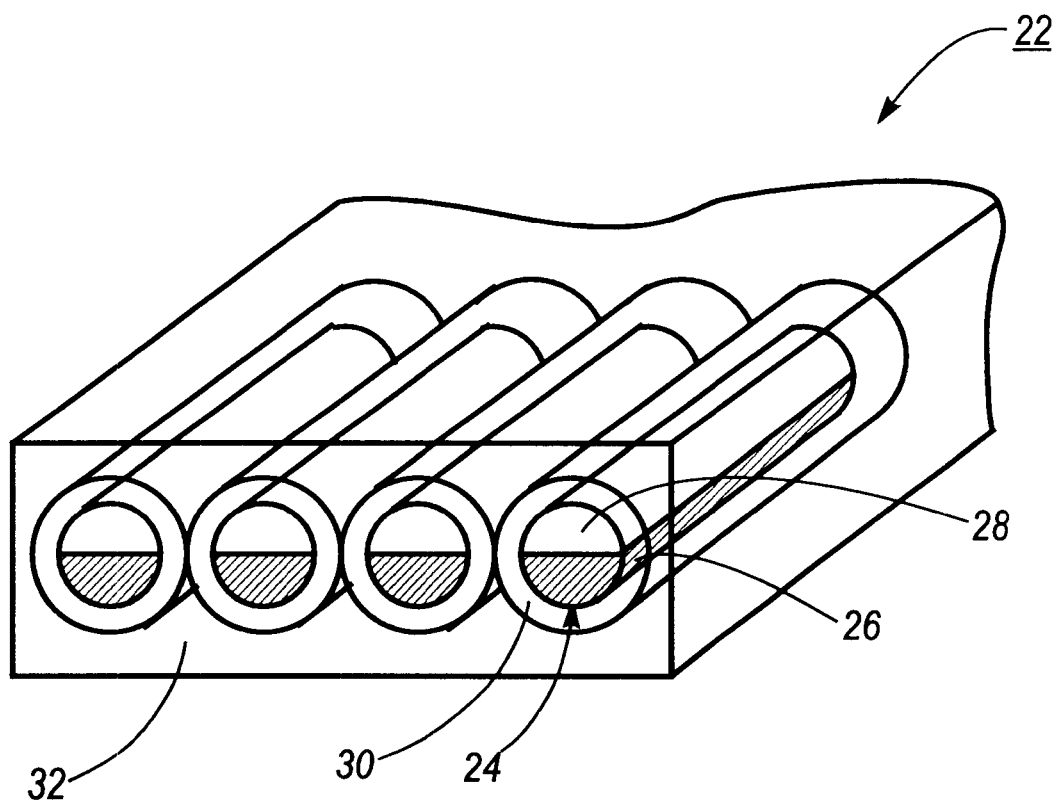
FIG. 3 shows a perspective view of a prior art gyricon.

FIG. 3 shows an example of a gyricon sheet 22 which has cylindrically symmetric rotating elements 24 with anisotropic electrical and optical properties. Notice that the cross-section of a spherically or cylindrically symmetric element is the same.

The rotating element 24 can also be made to rotate and thus exhibit changes in optical properties by the imposition of external electrical fields. FIG. 3 portrays a gyricon sheet 22 as disclosed in U.S. Pat. No. 6,055,091 by Sheridon et al. and titled "Twisting Cylinder Display" and herein incorporated by reference in the form of a bichromal cylinder having surfaces 26, 28 with different electrical and optical properties. This rotating element 24 is located in an oil filled cavity 30 in a transparent optical medium 32. When voltages are applied to addressing electrodes (not shown) the rotating element 24 will rotate, presenting either the black surface 26 or the white surface 28 to the viewer.

While the bichromal rotating elements 12 and 24 shown in FIGS. 1 and 3, respectively, are the simplest, many other variations also exist. U.S. Pat. No. 5,717,514 by Sheridon titled "Polychromal Segmented Balls For A Twisting Ball Display" herein incorporated by reference, describes several variations of spherical rotating elements. U.S. Pat. No. 5,894,367 by Sheridon titled "Twisting Cylinder Display Using Multiple Chromatic Values" and U.S. patent application Ser. No. 08/960,865 by Sheridon titled "Twisting Cylinder Display", both herein incorporated by reference, describe several variations of cylindrical rotating elements. Improvements in the ease of addressing both spherical and cylindrical optical elements can be made by the use of magnetic materials in their construction and the use of both magnetic and electrical fields in their addressing.

Soft Magnetic Material Pad Devices

The following devices all incorporate a "soft magnetic material" in the construction of a gyricon sheet. The term "soft magnetic material" is used to describe a magnetic material that is capable of developing a strong magnetic dipole strength while exposed to a strong external magnetic field, but that is not capable of retaining significant remnant magnetism when no longer exposed to the external field. In contrast are "hard magnetic materials" which retain significant magnetism when no external field is present, for example a permanent magnet. Soft magnetic materials include paramagnetic materials, ferromagnetic materials, ferromagnetic materials and supermagnetic materials, all of which may be suitable for use in the present application.

Gyricon With Single Latched State

Figure 4:
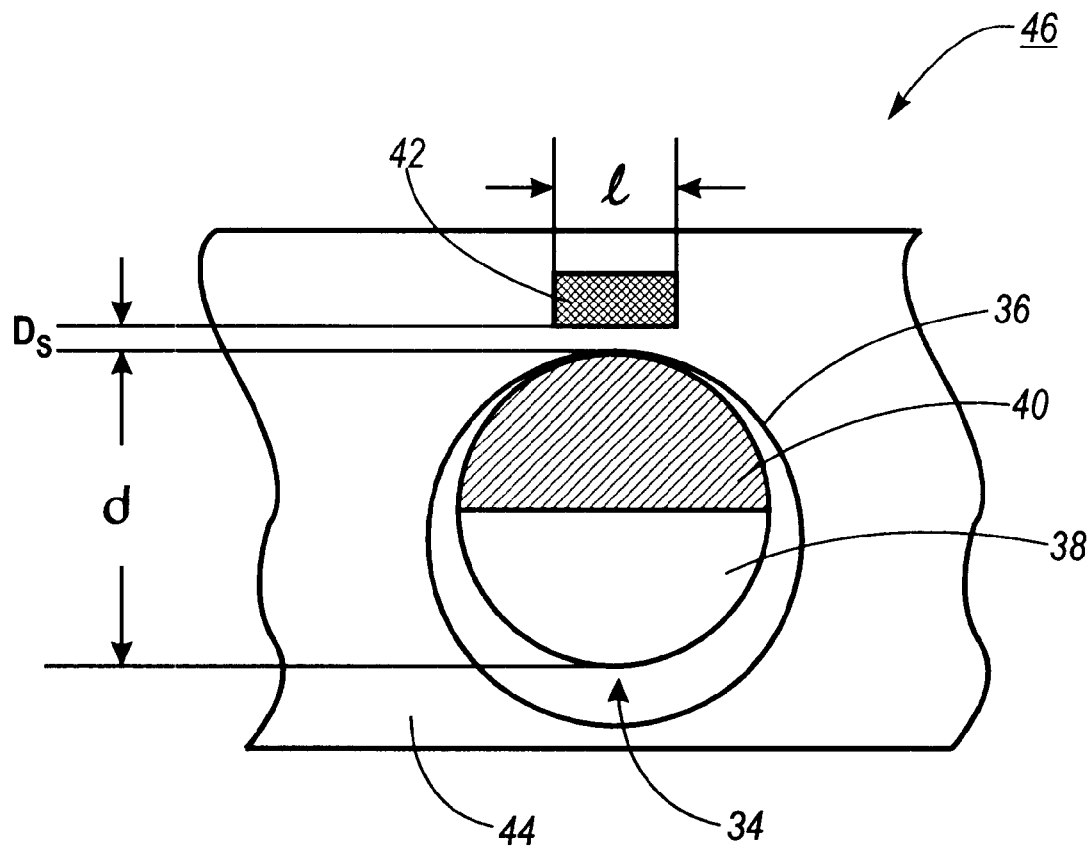
FIG. 4 shows a cross-sectional view of a first embodiment of a gyricon sheet according to the present invention.

In FIG. 4 is shown a cross-section of a portion of a magnetically assisted Gyricon sheet 46 made from a transparent optical medium 44. A cross-section of a black and white bichromal spherical or cylindrical rotating element 34 is shown in which a black magnetized segment 40 is made from black pigments, some of which are permanently magnetizable. It should be noted that black and white are used here for illustrative purposes only and any colors could be chosen. A white unmagnetized segment 38 is constructed from the usual materials and is not magnetizable. This rotating element 34 is contained in an oil filled cavity 36. A soft magnetic material pad 42 is incorporated near the cavity structure of each rotating element 34 as shown in FIG. 4 and separated from the oil filled cavity by a separation distance $D_s$. The soft magnetic material pad 42 should preferably have a length l no smaller than ¼ of the rotating element diameter d. The only restriction on the upper limit of the length l is that it must not be so large as to interfere with surrounding rotating elements or their soft magnetic material pads. This will be dictated by the packing density of the gyricon sheet 46. Depending on the packing density, the length l of the soft magnetic material pad 42 can be as large as the diameter d of the rotating element 34 or even twice as large as the diameter d of the rotating element 34 or more. The rotating element 34 is also made from materials that develop electrical potentials in contact with the liquid in the oil filled cavity 36 and in the presence of the electrical field, so that the two segments 38, 40 of the rotating element 34 develop different electrical potentials from each other.

When the black magnetized segment 40 of the rotating element 34 is adjacent to the soft magnetic material pad 42 embedded next to the oil filled cavity 36, a strong magnetic force tends to hold the rotating element 34 in place. This is because the distance between the magnetized portion of the rotating element and the soft magnetic material pad 42 is short compared to the dimensions of the magnetized portion of the rotating element, thus providing a strong magnetic field. For practical purposes, the separation distance $D_s$ between the rotating element 34 and the soft magnetic material pad 42 should be no more than the diameter d of the rotating element 34 multiplied by a factor of three. This magnetic force will cause the rotating element 34 to be attached to the oil filled cavity 36 wall. The magnetic force will also require a larger electrical field than otherwise to cause the rotating element 34 to start to rotate in the oil filled cavity 36 because the electrical field must first overcome the magnetic force to cause the rotating element 34 to rotate. However, except for the increased value of the applied electric field, the gyricon sheet 46 may be addressed by any of the addressing methods described herein above or known in the art. Once the rotating element 34 has rotated a short distance it will experience a much reduced force from interaction with the soft magnetic material pad 42 and the motion of the rotating element 34 will be dominated by the applied electrical field. Therefore if a rotating element 34 is aligned in its oil filled cavity 36 in an orientation in which the magnetized segment 40 is adjacent to the soft magnetic material pad 42, a strong electrical field will be required to initiate rotation. By controlling the density to be approximately uniform for all rotating elements and controlling the type of magnetic particles of the magnetized segment 40 of the rotating element 34, the threshold value of electrical field required to initiate rotation can be made uniform and sharp. This is because the effects of the magnetic field on the threshold voltage will dominate over other effects on the threshold voltage, for instance that of non-uniformities in size or chemical composition.

When the rotating elements 34 are in the reverse orientation, that is with the unmagnetized segment 38 near the soft magnetic material pad 42, then the rotating element 34 will be held against the oil filled cavity 36 wall by the usual forces.

Rotating Element Fabrication—Magnetic Segment

The rotating element 34 can be fabricated with a modified rotating disk assembly, as described in U.S. Pat. No. 5,262,098 by Crowley et al. titled "Method And Apparatus For Fabrication Bichromal Balls For A Twisting Ball Display", and U.S. Pat. No. 6,055,091 by Sheridon et al. titled "Twisting Cylinder Display" and incorporated by reference hereinabove, or other planar stream free jet type devices such as those disclosed in U.S. Pat. No. 5,344,594, titled "Method For Fabrication Of Multicolored Balls For A Twisting Ball Display", by Sheridon and also incorporated by reference hereinabove. Also, a method for making bichromal spheres with a magnetic hemisphere is disclosed in U.S. Pat. No. 4,810,431 by Leidner and titled "Method Of Manufacturing Plastic Particles For A Particle Display."

Figure 5:
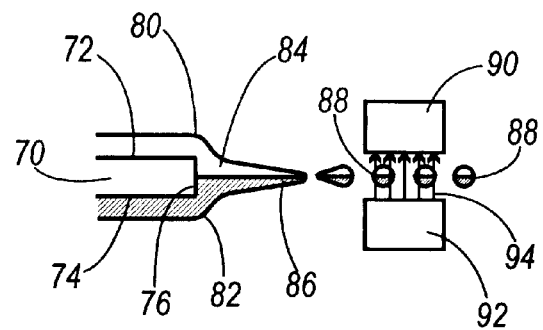
FIG. 5 shows a cross-sectional view of a method of making rotating elements according to the present invention.

To generally understand the concepts of magnetic rotating element generation, FIG. 5 shows a separator member 70, having two opposed surfaces 72, 74 connected at edge 76, over which two fine planar streams 80, 82 of hardenable material are flowing. In this example, planar stream 80 contains a white pigment while planar stream 82 contains a magnetic pigment similar to that used in the manufacture of magnetic tapes, such as black magnetic pigment Type 031182 by Wright Industries, Brooklyn, N.Y. either alone or in conjunction with other black pigments as are known in the art. The planar streams 80, 82 form an outboard reservoir 84 of liquid which contains equal, side-by side, amounts of each liquid from each planar stream 80, 82.

A free jet 86 of liquid is formed from the reservoir 84 when the flow rate of the liquid away from the edge 76 is great enough. Methods known in the art for creating a free jet 86 include a spinning disk assembly and a paddle wheel assembly which are described in U.S. Pat. No. 5,262,098 by Crowley et al. titled "Method And Apparatus For Fabrication Bichromal Balls For A Twisting Ball Display", and a jet assembly, a planar sheet liquid sheet, and a cylindrical liquid sheet described in U.S. Pat. No. 5,344,594, titled "Method For Fabrication Of Multicolored Balls For A Twisting Ball Display", by Sheridon, any of which may be suitably used. If low viscosity hardenable liquids are used, the free jet 86 breaks up into rotating elements 88 at its distal end as shown in FIG. 5.

While the rotating elements 88 are in flight from the free jet 86, they pass through a steady magnetic field 94, which is shown being created by two magnets 90, 92. As the rotating elements 88 pass through the magnetic field the section of the rotating elements 88 containing the magnetic pigment will become magnetized. As the rotating elements 88 are identically oriented with respect to their trajectories, they will be identically magnetized with respect to their geometric poles. The steady magnetic field may be created by any number of ways known in the art, for example, a permanent magnet, an electromagnet, an electric field or a direct current flowing through a coil. To properly magnetize the magnetic pigment the magnetic field 94 should be at least 50 gauss. It should be noted that the placement of the magnetic field 94 relative to the separator member 70 is illustrative only. The magnetic field 94 could be placed closer to or further away from the separator member 70. For instance, if placed closer, the magnetic field 94 would magnetize the magnetic particles before the free jet 86 breaks up into the rotating elements 88. If placed further away, the magnetic field 94 would magnetize the magnetic particles after the rotating elements 88 have hardened.

If high viscosity hardenable liquids are used, as disclosed in U.S. Pat. No. 6,055,091 by Sheridon et al., then the free jet 86 forms filaments which are suitable for making cylindrically symmetric rotating elements 34. As shown in FIG. 5, with respect to spheres 88, if the filaments are passed between a magnetic field 94 while they are being spun, the magnetic pigment will be magnetized and all filaments will be identically magnetized.

Figure 6:
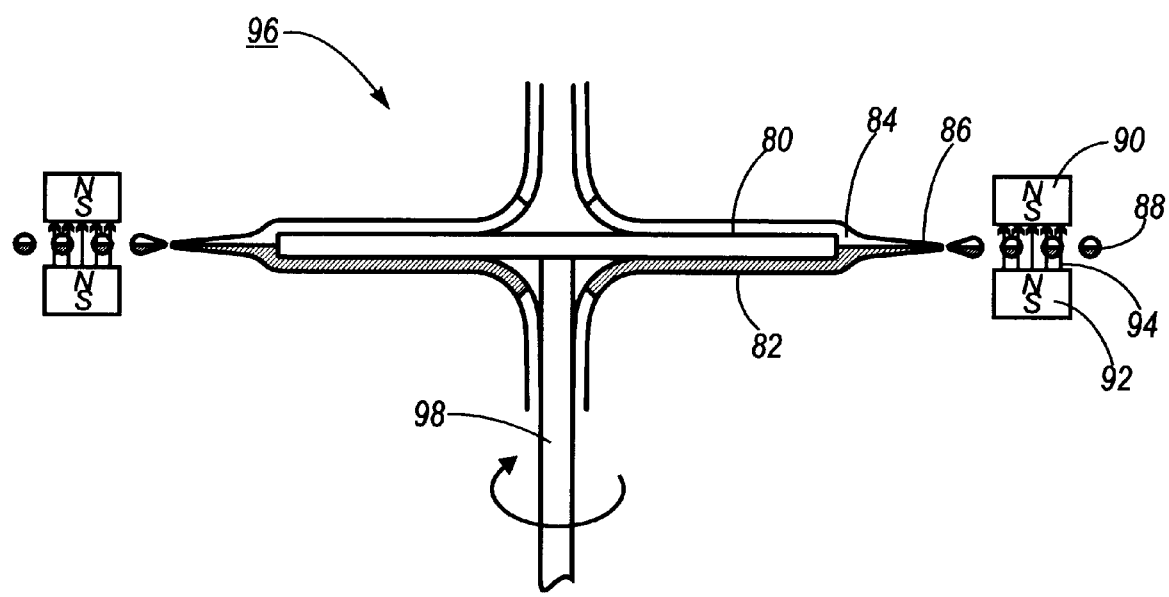
FIG. 6 shows a cross-sectional view of an apparatus used to make rotating elements according to the present invention.

FIG. 6 shows an implementation of the technique described above with respect to FIG. 5 using a spinning disk assembly 96. Like elements are given the same reference numerals as used in FIG. 5. The separator member 70 is implemented by a spinning disk which rotates around a spindle 98, The separator member has two surfaces 72, 74 connected at edge 76, over which two fine planar streams 80, 82 of low viscosity hardenable material are flowing. In this example, planar stream 80 contains a white pigment while planar stream 82 contains a magnetic pigment similar to that used in the manufacture of magnetic tapes, such as black magnetic pigment type 031182 by Wright Industries, Brooklyn, N.Y. either alone or in conjunction with other black pigments as are known in the art. The planar streams 80, 82 form an outboard reservoir 84 of liquid which contains equal side-by side, amounts of each liquid from each planar stream 80, 82.

A free jet 86 of liquid is formed from the reservoir 84, in an approximately planar area outward from the reservoir, when the flow rate of the liquids away from the edge 76 is great enough. The free jet 86 breaks up into rotating elements 88 at its distal end. While the rotating elements 88 are in flight from the free jet 86, they pass through a steady magnetic field 94, which is shown being created by two torous-shaped magnets 90, 92. As the rotating elements 88 pass through the magnetic field the section of the rotating elements 88 containing the magnetic pigment will become magnetized. As the rotating elements 88 are identically oriented with respect to their trajectories, they will be identically magnetized with respect to their geometric poles.

If high viscosity hardenable liquids are used, then identically magnetized filaments, suitable for cylindrically symmetric rotating elements will be created instead of spheres 88.

Sheet Fabrication Method 1

Figure 7:
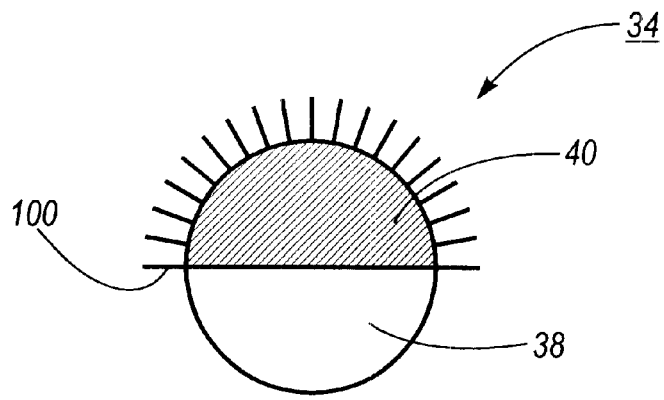
FIG. 7 shows a first step in a process used to make a gyricon sheet shown in FIG. 4.
Figure 8:
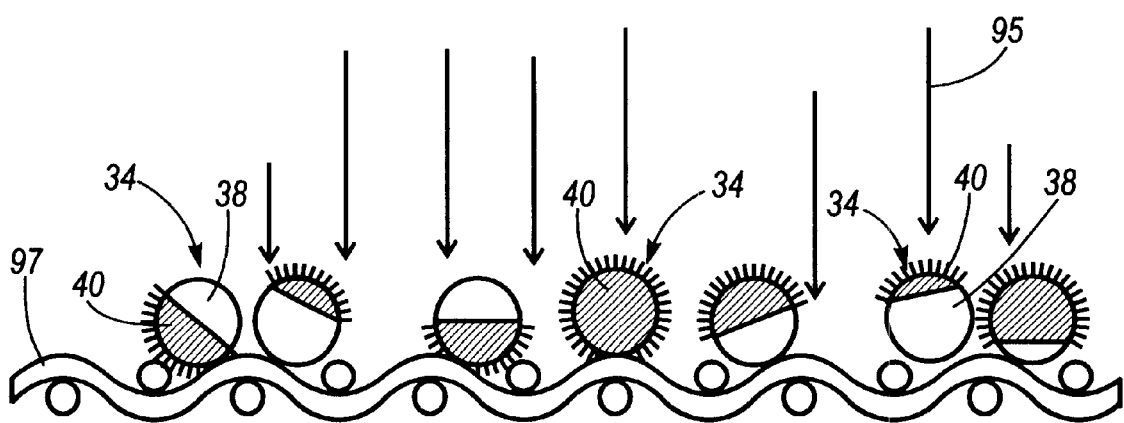
FIG. 8 shows a second step in a process used to make a gyricon sheet shown in FIG. 4.
Figure 9:
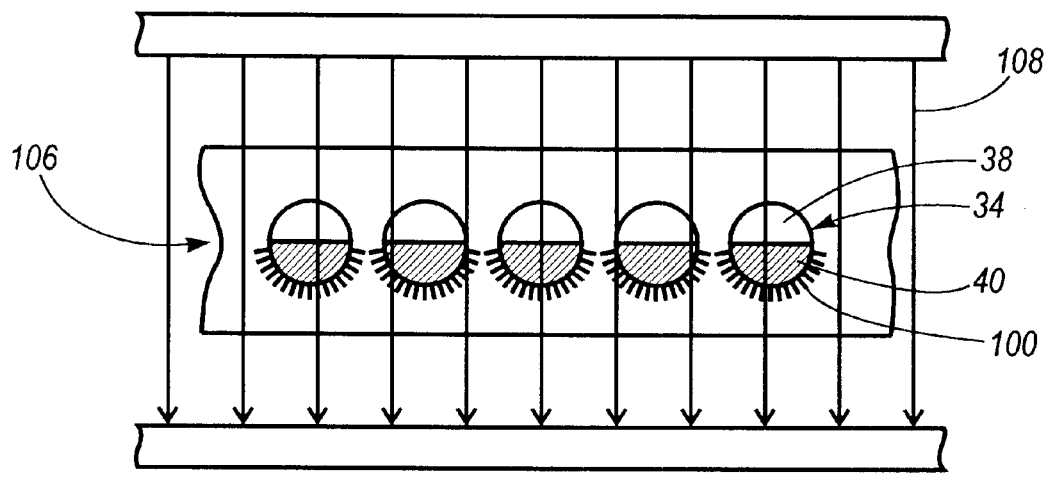
FIG. 9 shows a third step in a process used to make a gyricon sheet shown in FIG. 4.

The gyricon sheet 46 with the soft magnetic material pad 42 can be fabricated by first mixing the magnetized rotating element 34 with a soft magnetic material powder such as Black Pigment #V-302 by the Ferro Corp, Brooklyn N.Y. The soft magnetic material particles 100 would cluster around the magnetized segment 40 as shown in FIG. 7. Surplus particles 100 are removed from the rotating elements 34 by placing them in a fluidized bed or placing them on a screen 102 where they are washed with controlled air jets 104 as shown in FIG. 8. The rotating elements 34 are then mixed with a liquid resin and spread out onto a thin layer on a flat surface to form an uncured sheet 106 a shown in FIG. 9. A uniform magnetic field 108 is applied to cause the magnetized rotating elements 34 to rotate into common alignment with each other. When this happens the magnetic pigment 100 will also migrate to remain adjacent to the magnetized segment 40. After alignment has occurred, as shown in FIG. 9, but before removing the magnetic field 108, the sheet is cured into a tough silicone elastomer, as is known in the art. After curing, the elastomer is swelled by placing it into an oil bath as is also know in the art. The powdered soft magnetic material particles 100 have thus been incorporated into the elastomer matrix to form the soft magnetic material pad 42 in the vicinity of the magnetized segment 40 of the rotating element 34 shown in FIG. 4.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 4 shows a cross-sectional view for either a spherically or cylindrically shaped rotating element 34 the pad will tend to form in a circular shape for a spherically shaped rotating element 34 or in an elongated shape for a cylindrically shaped rotating element.

Sheet Fabrication Method 2

Figure 10:
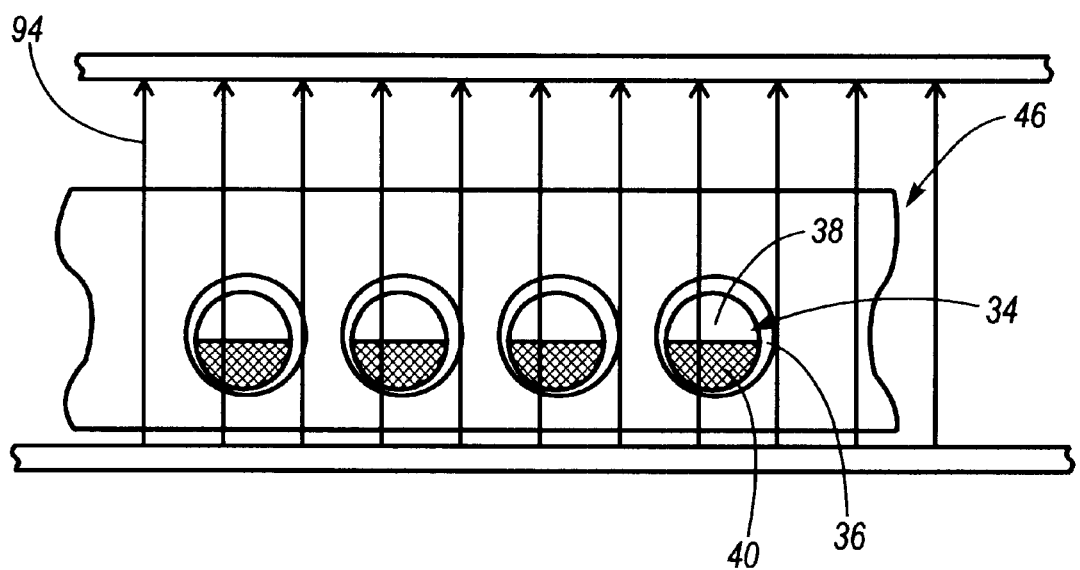
FIG. 10 shows a first step in an alternate process used to make a gyricon sheet shown in FIG. 4.

Alternatively, the gyricon sheet 46 with:the soft magnetic material pad 42 can be fabricated as part of an addition to a gyricon sheet which has been made using any method of creating a gyricon sheet including those described hereinabove or any of the references incorporated hereinabove and using magnetizable elements. The sheet may be constructed using either rotating elements 34 that are pre-magnetized, as used above, or containing magnetizable but not yet magnetized rotating elements 34. If the sheet 46 is constructed using rotating elements 34 that have not been magnetized, then once the sheet has been constructed and soaked in oil so that the rotating elements 34 may rotate, a uniform electric field is applied to orient the rotating elements 34 in a common direction, as is known in the art. Once the rotating elements 34 have been oriented in a common direction a strong magnetic field 94, as detailed hereinbefore, is applied to magnetize the rotating elements 34 uniformly as shown in FIG. 10.

Figure 11:
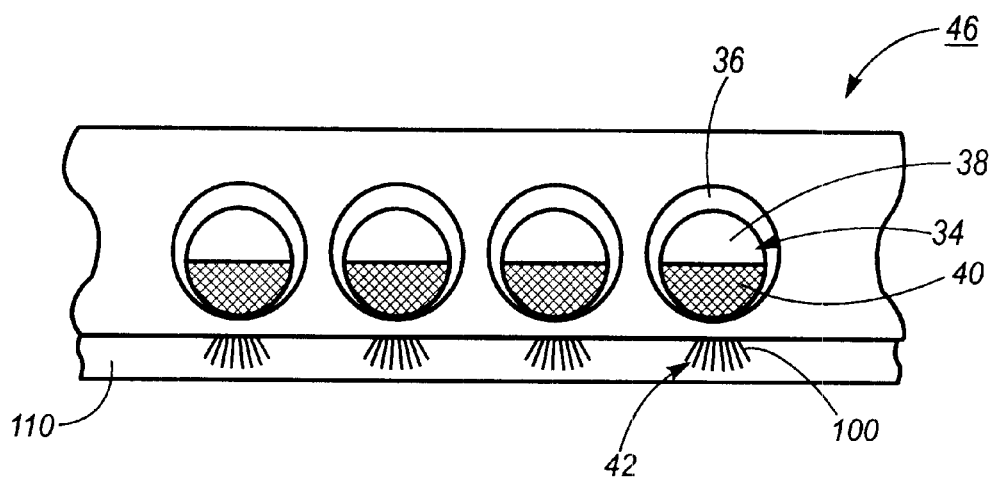
FIG. 11 shows a second step in an alternate process used to make a gyricon sheet shown in FIG. 4.

In either case, once a sheet 46 has been obtained with uniformly magnetized rotatable particles 34 oriented in a common direction, a thin layer 110 of uncured or molten material, such as an uncured elastomer, epoxy or a molten polymer, containing powdered soft magnetic material particles 100 is adhered to one side of the gyricon sheet. The powdered soft magnetic material particles 100 will be attracted towards the magnetic segments 40 of the rotating elements and migrate to form the soft magnetic material pads 42 as shown in FIG. 11. At this point the thin layer 110 containing the particles 100 is cured or otherwise solidified, locking the soft magnetic material pads 42 in place.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 4 shows a cross-sectional view for either a spherically or cylindrically shaped rotating element 34 and the pad 42 will tend to form in a circular shape for a spherically shaped rotating element 34 or in an elongated shape for a cylindrically shaped rotating element.

Sheet Fabrication Method 3

Figure 12:
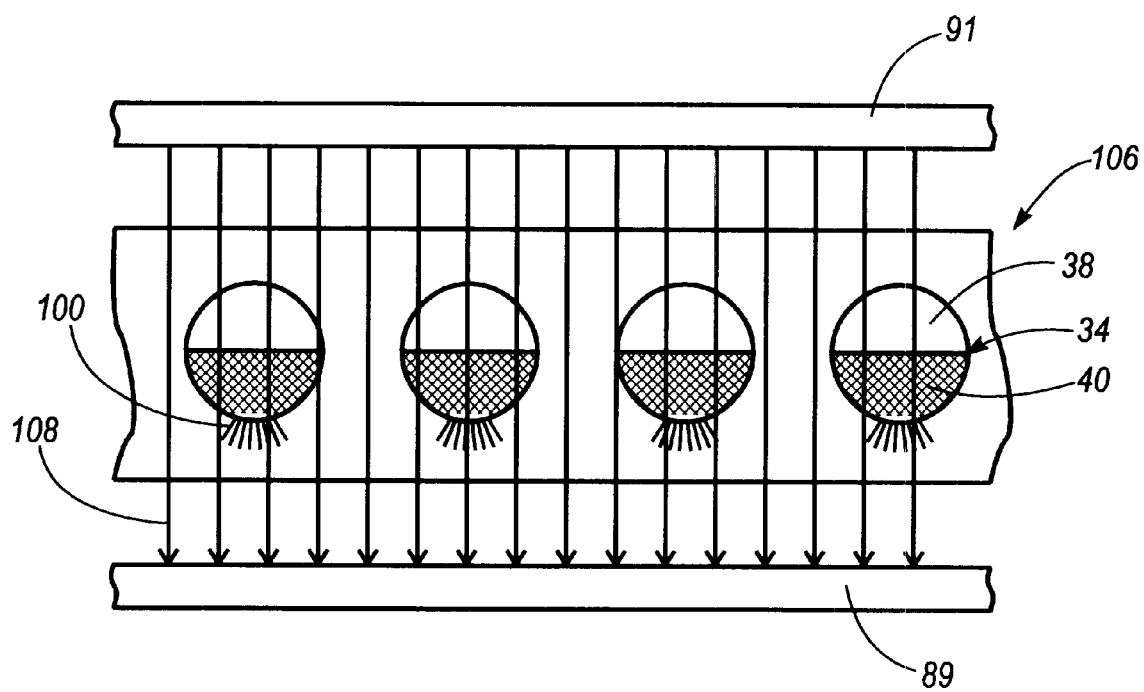
FIG. 12 shows a first step in another alternate process used to make a gyricon sheet shown in FIG. 4.

Alternatively, the gyricon sheet 46 with the soft magnetic material pad 42 can be formed by mixing into an uncured elastomer soft magnetic material powder 100 and magnetized rotating elements 34. This is formed into an uncured sheet 106 on a surface, and the curing is delayed to allow the pigment particles 100 to be attracted to the magnetized segments 40 of the rotating elements 34. This pigment particles 100 will be attracted to the magnetized segments 40 because the magnetized segments 40 create a very non-uniform magnetic field in their vicinities. This field provides the mechanical force to move the pigment particles to the surface of the magnetized segments 40 of the rotating elements. When this process is sufficiently complete, a uniform magnetic field 108, shown in this example being created using two magnets 89, 91 is applied to the sheet, causing the rotating elements 34 and the attached soft magnetic material pigment particles 100, to rotate into common alignment. As is shown in FIG. 12. While this field is continuously applied the elastomer sheet is cured as is known in the art. The sheet can then be swelled, as is also known in the art.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 4 shows a cross-sectional view for either a spherically or cylindrically shaped rotating element 34 the pad will tend to form in a circular shape for a spherically shaped rotating element 34 or in an elongated shape for a cylindrically shaped rotating element.

Gyricon Elements With Dual Latched States

As discussed hereinbefore, with respect to FIG. 4, a controlled threshold is provided by using a rotating element which incorporates a single magnetic segment interacting with a single soft magnetic material pad located adjacent to the oil-filled cavity containing the rotating element. However, this provides threshold control for only the rotational transition when the magnetized portion of the rotating element is adjacent to the soft magnetic material pad and the rotating element is being rotated so that this portion is at the opposite side of the cavity. This is good enough for many applications. For some passive addressing applications however, it is desired to rotate elements into both polarities electronically, without first erasing the whole image. In these applications there is a need for two thresholds, one for each rotation state.

Configuration 1—Element With a Single Magnetic Portion and Two Pads

Figure 13:
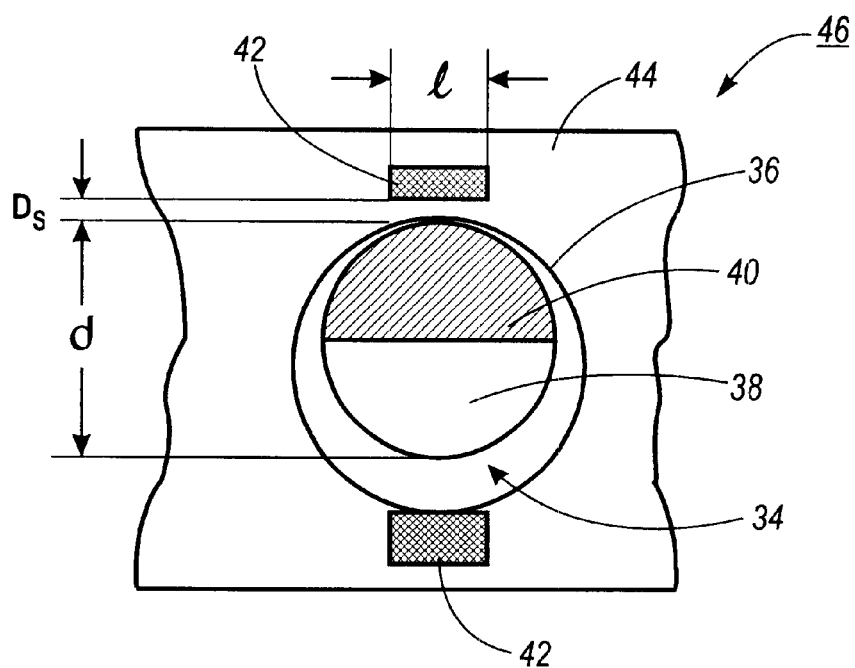
FIG. 13 shows a cross-sectional view of a second embodiment of a gyricon sheet according to the present invention.

In FIG. 13 is shown a cross-section of a portion of a magnetically assisted Gyricon sheet 46. This is the same sheet as shown in FIG. 4, with a slight modification, and therefore the same reference numerals will be used for the same elements. A black and white bichromal rotating element 34 is shown in which the black magnetized segment 40 is made from black pigments, some of which are permanently magnetizable. It should be noted that black and white are used here for illustrative purposes only and any colors could be chosen. The white unmagnetized segment 38 is constructed from the usual materials and is not magnetizable. This rotating element 34 is contained in an oil filled cavity 36. In contrast to FIG. 4, two soft magnetic material pads 42 are incorporated near the cavity structure of each rotating element in an opposed configuration. The rotating element 34 is also made from materials that develop electrical potentials in contact with the liquid in the oil filled cavity 36 and in the presence of the electrical field, so that the segments 38, 40 of the rotating element 34 develop different electrical potentials from each other.

When the black magnetized segment 40 of the rotating element 34 is adjacent to either of the soft magnetic material pads 42 embedded next to the oil filled cavity 36, a strong magnetic force tends to hold the rotating element 34 in place. This is because the distance between the magnetized portion of the rotating element 34 and the soft magnetic material pad 42 is very short compared to the dimensions of the magnetized portion of the rotating element, thus providing a strong magnetic field. For practical purposes, the separation distance between $D_s$ the rotating element 34 and the soft magnetic material pad 42 should be no more than the diameter d of the rotating element 34 multiplied by a factor of three. The soft magnetic material pad 42 should preferably have a length t no smaller than ¼ of the rotating element diameter d. The only restriction on the upper limit of the length l is that it must not be so large as to interfere with surrounding rotational elements or their soft magnetic material pads. This will be dictated by the packing density of the gyricon sheet 46. Depending on the packing density, and the length l of the soft magnetic material pad 42 can be as large as the diameter d of the rotating element 34 or even twice as large as the diameter d of the rotating element 34 or more. This magnetic force will cause the rotating element 34 to be attached to the wall of the oil filled cavity, and will also require a larger electrical field than otherwise to cause the rotating element 34 to start to rotate in the oil filled cavity 36. Once the rotating element 34 has rotated a short distance it will experience a much reduced force from interaction with the soft magnetic material pad 42 and the motion of the rotating element 34 will be dominated by the applied electrical field. Therefore if a rotating element 34 is aligned in its oil filled cavity 36 in an orientation in which the magnetized segment 40 is adjacent to either of the soft magnetic material pads 42, a strong electrical field will be required to initiate rotation. By controlling the density, for uniformity among particles, and the type of magnetic particles of the magnetized segment 40 of the rotating element 34, the threshold value of electrical field required to initiate rotation can be made uniform and sharp. This is because the effects of the magnetic field on the threshold voltage will dominate over other effects on the threshold voltage.

Using a rotating element 34 with a magnetic segment and two soft magnetic material pads provides thresholds for both states of rotation. Two magnetic soft magnetic material pads 42 are used, one for each desired orientation of the rotating element, and therefore, the threshold is controlled for both states in contrast to the embodiment described above and shown in FIG. 4. This enhancement would be useful in providing for the sharp threshold and image storage requirements needed to effectively implement passive addressing.

Sheet Fabrication

This sheet may be fabricated using any of the methods described above to obtain the initial sheet. However, this results in providing only one soft magnetic material pad 42, and two soft magnetic material pads 42 are desired. Therefore, once an initial sheet is fabricated having one soft magnetic material pad 42 the second pad can be provided using the thin layer technique described above and discussed with respect to FIG. 14.

Figure 14:
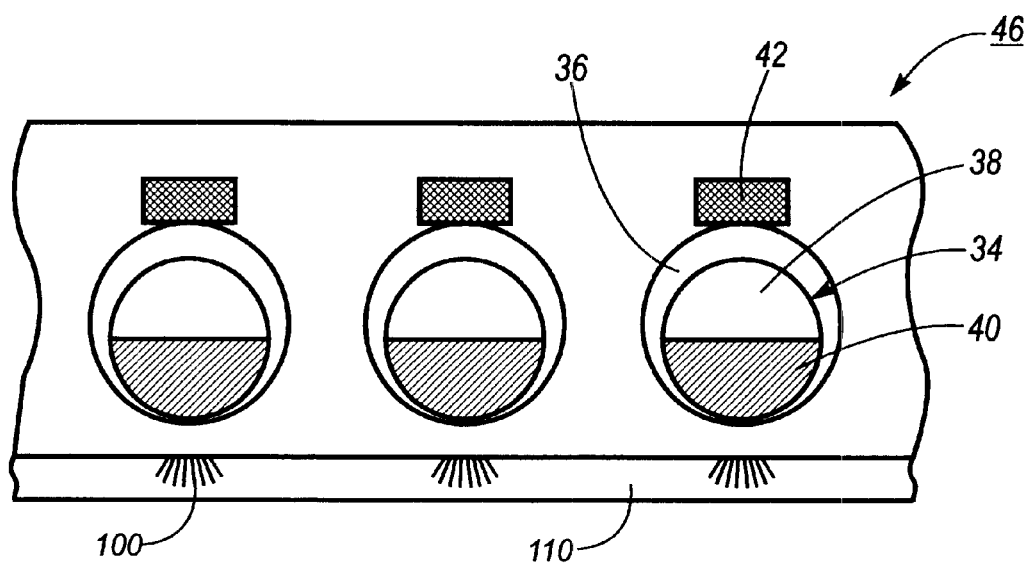
FIG. 14 shows a process used to make a gyricon sheet shown in FIG. 13.

Once a plasticized sheet 46 has been obtained with uniformly magnetized rotatable particles 34, an electric field can be applied as known in the art to orient the magnetized rotatable particles 34 in a common direction where the magnetized segment 40 has been rotated away from the soft magnetic material pad 42. Subsequently, a thin layer 110 of uncured or molten material, such as an uncured elastomer, epoxy or a molten polymer, containing powdered soft magnetic material particles 100 is adhered to the side of the gyricon sheet which does not have soft ferromagnetic materials pads 42 and towards which the magnetized segments 40 of the rotatable elements 34 have been oriented. The powdered soft magnetic material particles 100 will be attracted towards the magnetic segments 40 of the rotating elements 34 and form the soft magnetic material pads 42 as shown in FIG. 14. At this point the thin layer 110 containing the particles 100 is cured or otherwise solidified, locking the soft magnetic material pads 42 in place.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 4 shows a cross-sectional view for either a spherically or cylindrically shaped rotating element 34 the pad will tend to form in a circular shape for a spherically shaped rotating element 34 or in an elongated shape for a cylindrically shaped rotating element.

Configuration 2—Element With Dual Magnetic Portions and a Single Pad

Figure 15:
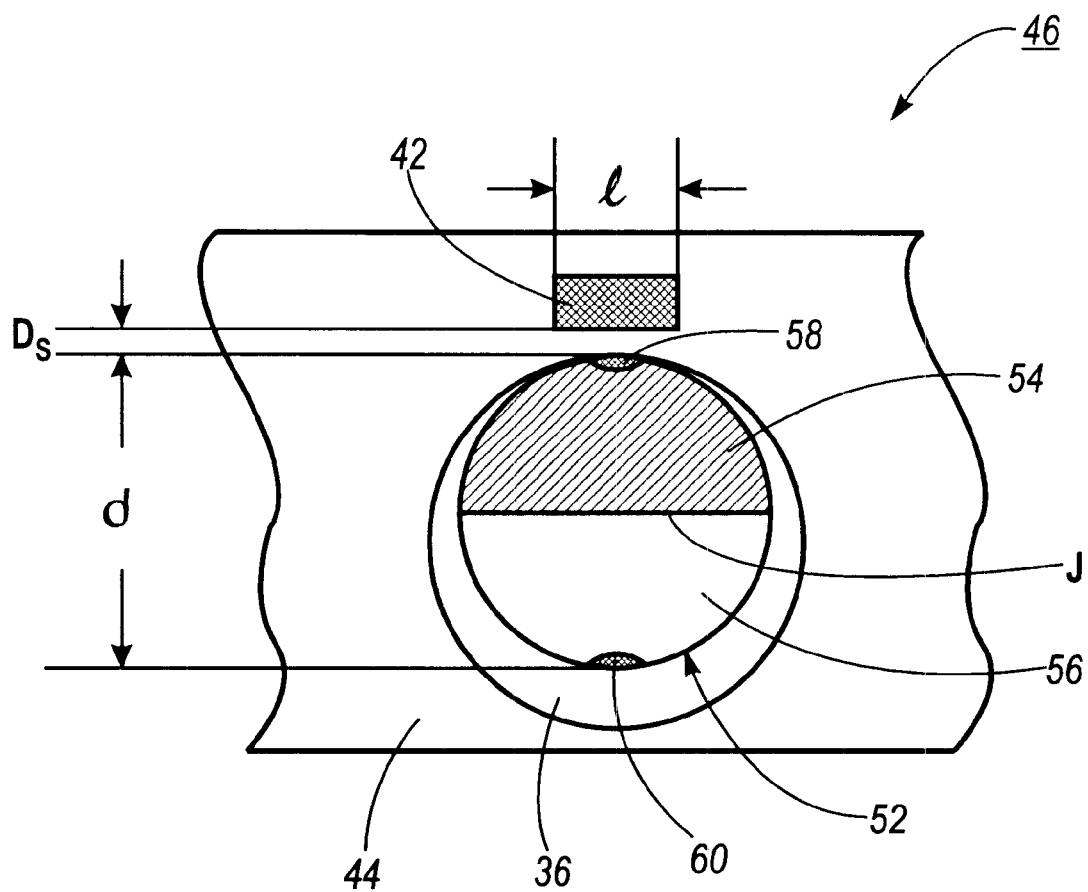
FIG. 15 shows a cross-sectional view of a third embodiment of a gyricon sheet according to the present invention.

FIG. 15 shows a cross-section of a gyricon sheet 46. Again, this sheet is a variant of the sheet 46 shown in FIG. 4 and the same reference numerals will be used for the same elements. The sheet 46 is made from a transparent optical medium 44 with an oil filled cavity 36 which contains a rotating element 52. Rotating element 52 is a spherically or cylindrically symmetric bichromal element containing, for example, a black segment 54 and a white segment 56. Additionally, rotating element 52 contains two small polar magnetic segments 58, 60 where polar magnetic segment 58 is located adjacent to the black segment 54 and polar magnetic segment 60 is located adjacent to the white segment 56. Further, if the junction J of the segments 54, 56 is viewed as an equatorial line then the magnetic segments are located at the "poles' of the rotating element 52.

A single soft magnetic material pad 42 is contained within the transparent optical medium 44 adjacent to the oil filled cavity 36, as shown in the FIG. 15. The two magnetic segments 58, 60 interact with the soft magnetic material pad 42 to provide the rotating element with two rotational positions in which the threshold is controlled by magnetic fields. Each magnetic segment 58, 60 interacts with the soft magnetic material pad 42 in the same manner as described above with respect to FIG. 4. That is, when one of the magnetic segments 58, 60 of the rotating element 52 is adjacent to the soft magnetic material pad 42 that is embedded next to the oil filled cavity 36, a strong magnetic force tends to hold the rotating element 52 in place. This is because the distance between the magnetic segments 58, 60 of the rotating element 52 and the soft magnetic material pad 42 is very short compared to the dimensions of the magnetized portions of the rotating element. For practical purposes, the separation distance $D_s$ between the rotating element 34 and the soft magnetic material pad 42 should be no more than the diameter d of the rotating element 34 multiplied by a factor of three. The soft magnetic material pad 42 should preferably have a length l smaller than ¼ of the rotating element diameter d. The only restriction on the upper limit of the length l is that it must not be so large as to interfere with surrounding rotational elements or their soft magnetic material pads. This will be dictated by the packing density of the gyricon sheet 46. Depending on the packing density, the length l of the soft magnetic material pad 42 can be as large as the diameter d of the rotating element 34 or even twice as large as the diameter d of the rotating element 34 or more. This magnetic force will cause the rotating element 52 to be latched in place, and will also require a larger electrical field than otherwise to cause the rotating element 52 to start to rotate in the oil filled cavity 62. Once the rotating element 52 has rotated a short distance the polar magnetic segment will experience a much reduced force from the soft magnetic material pad 42 it had been adjacent to and the motion of the rotating element 52 will be dominated by the applied electrical field.

Figure 18:
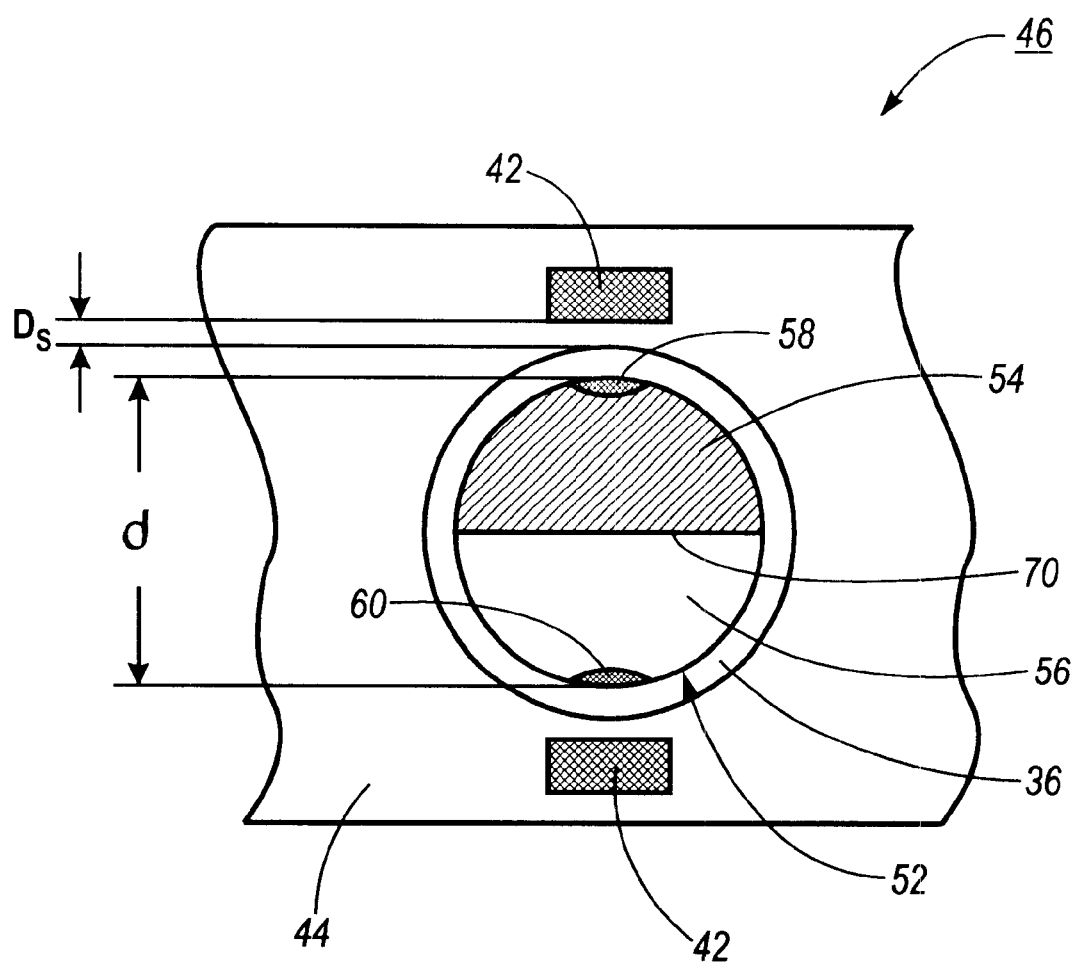
FIG. 18 shows a cross-sectional view of a fourth embodiment of a gyricon sheet according to the present invention.

Using a rotating element 52 with two polar magnetic segments 58, 60 and one soft magnetic material pad 42 provides thresholds for both states of rotation. Two polar magnetic segments 58, 60 are used, one for each desired orientation of the rotating element 52, and therefore, the threshold is controlled for both states, in contrast to the embodiment described above and discussed with respect to FIG. 4. Additionally, the magnetized portion of the rotating element 52 is confined to two small polar magnetic segments 58, 60. While it would be possible to implement this variation using a rotating element which uses the large magnetized segment 40 of the rotating element shown in FIG. 4 combined with a single polar magnetic segment 58, 60 of the type shown in the rotating element shown in FIG. 18, using two small polar magnetic segments 58, 60 as shown in FIG. 18 provides a finer control, more precise control. These enhancements would be useful in providing for the sharp threshold and image storage requirements needed to effectively implement passive addressing.

Rotating Element Fabrication-Polar Magnetic Segment

This rotating element can be fabricated as know in the art with a modified multiple rotating disk assembly, as described in U.S. Pat. No. 5,717,514 by Sheridon titled "Polychromal Segmented Balls For A Twisting Ball Display", and U.S. patent application Ser. No. 08/960,865 by Sheridon et al. titled "Twisting Cylinder Display" and incorporated by reference hereinabove, or other planar stream/free jet type devices such as those disclosed in U.S. Pat. No. 5,344,594, titled "Method For Fabrication Of Multicolored Balls For A twisting Ball Display", by Sheridon and also incorporated by reference hereinabove. The manufacturing devices discussed below are variations on those discussed with respect to FIGS. 5 and 6 and the same reference numerals will be used to identify the same elements.

Figure 16:
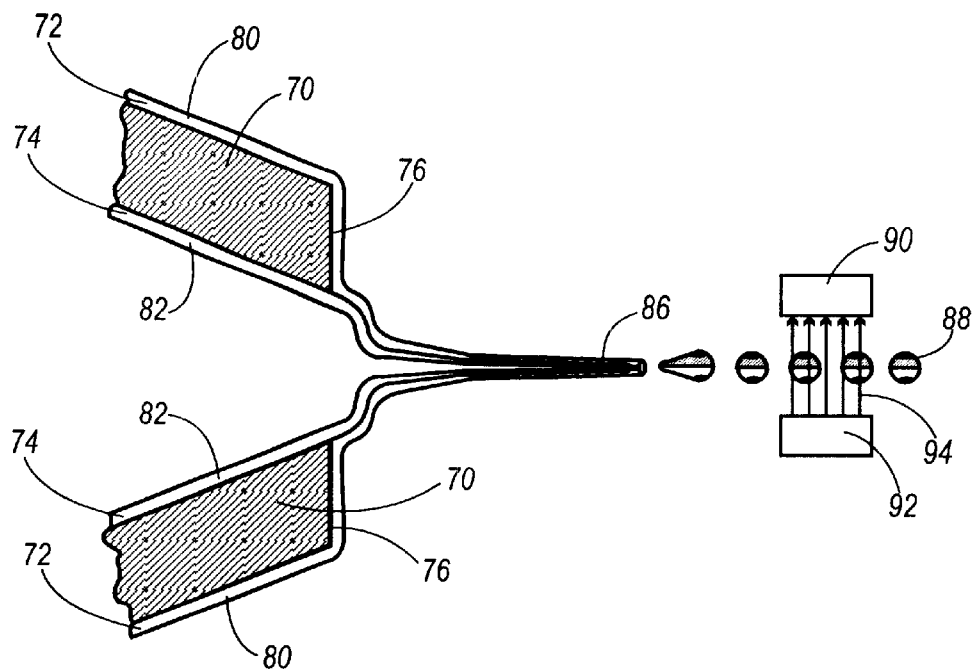
FIG. 16 shows a cross-sectional view of a method of making rotating elements according to the present invention.

To generally understand the concepts of magnetic rotating element generation, FIG. 16 shows two separator members 70, each having two opposed surfaces 72, 74 connected at edge 76, over each of which two fine planar streams 80, 82 of hardenable material are flowing. In this example, outward planar streams 80 contain a magnetic pigment similar to that used in the manufacture of magnetic tapes, such as black magnetic pigment Type 031182 by Wright Industries, Brooklyn, N.Y. either alone or in conjunction with other black pigments as are known in the art, while inward planar streams 82 contain each contain one of the pigments used to provide the segment colorations of the rotating elements 88. For instance one of the inward streams 82 may contain a white pigment while the other of inward planar streams 82 may contain a black pigment. The planar streams 80, 82 combine to form a free jet 86 of liquid which contains side-by side, amounts of each liquid from each planar stream 80, 82 from each separator member 76. In order to create the smaller, polar magnetic segments the outward planar streams 80 may contain a smaller volume of material than the inward planar streams 82.

The free jet 86 of liquid is formed when the flow rate of the liquids away from the edge 76 is great enough. Methods known in the art for creating a free jet 86 include a spinning disk assembly as described in U.S. Pat. No. 5,717,514 by Sheridon titled "Polychromal Segmented Balls For A Twisting Ball Display", and a jet assembly, a planar sheet liquid sheet, and a cylindrical liquid sheet described in U.S. Pat. No. 5,344,594, titled "Method For Fabrication Of Multicolored Balls For A Twisting Ball Display", by Sheridon, any of which may be suitably used. If low viscosity hardenable liquids are used the free jet 86 breaks up into rotating elements 88 at its distal end as shown in FIG. 16.

While the rotating elements 88 are in flight from the free jet 86, they pass through a steady magnetic field 94, which is shown being created by two magnets 90, 92. As the rotating elements 88 pass through the magnetic field the section of the rotating elements 88 containing the magnetic pigment will become magnetized, As the rotating elements 88 are identically oriented with respect to their trajectories, they will be identically magnetized with respect to their geometric poles. The steady magnetic field may be created by any number of ways known in the art, for example, a permanent magnet, an electric field or a direct current through a coil. To properly magnetize the magnetic pigment the magnetic field 94 should be at least 50 gauss.

If high viscosity hardenable liquids are used, as disclosed in U.S. Pat. No. 6,055,091 by Sheridon et al. then the free jet 86 forms filaments which are suitable for making cylindrically symmetric rotating elements 34. As shown in FIG. 16, with respect to spheres 88, if the filaments are passed between a magnetic field 94 while they are being spun, the magnetic pigment will be magnetized and all filaments will be identically magnetized.

Figure 17:
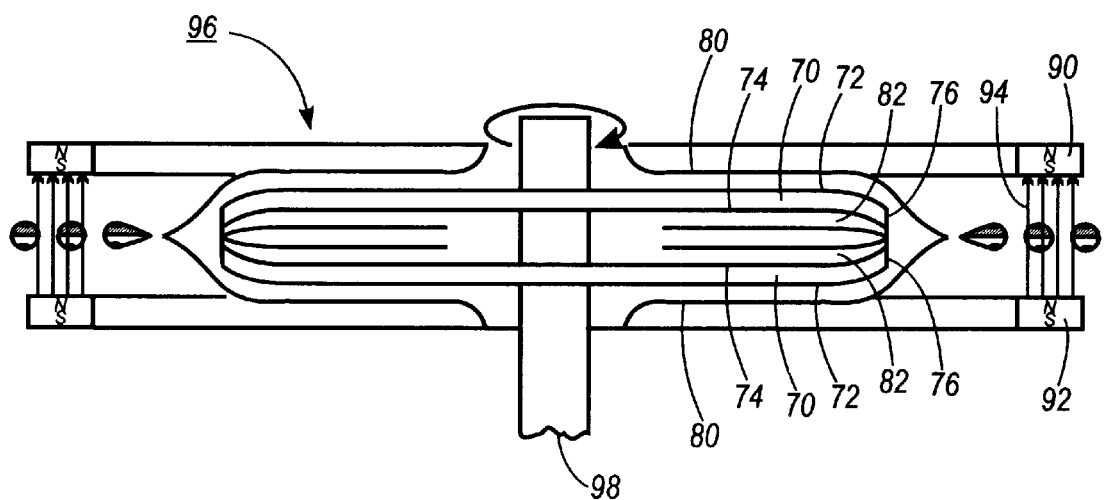
FIG. 17 shows a cross-sectional view of an apparatus used to make rotating elements according to the present invention.

FIG. 17 shows an implementation of the technique described above with respect to FIG. 16 using a multiple spinning disk assembly 96. Like elements are given the same reference numerals as used in FIG. 16. The two separator members 70 are each implemented by a spinning disk which rotates around a single spindle 98. Each separator member has two surfaces 72, 74 connected at edge 76. Over each separator member 70 two fine planar streams 80, 82 of low viscosity hardenable material are flowing. In this example, outward planar streams 80 contain a magnetic pigment similar to that used in the manufacture of magnetic tapes, such as black magnetic pigment Type 031182 by Wright Industries, Brooklyn, N.Y. either alone or in conjunction with other black pigments as are known in the art, while inward planar streams 82 each contain one of the pigments used to provide the segmental colorations of the rotating elements 88. For instance one of the inward streams 82 may contain a white pigment while the other of inward planar streams 82 may contain a black pigment. The planar streams 80,82 combine to form a free jet 86 of liquid which contains side-by side, amounts of each liquid from each planar stream 80, 82 from each separator member 76. In order to create the smaller polar magnetic segments the outward planar streams 80 may contain a smaller volume of material than the inward planar streams 82.

A free jet 86 of liquid is formed from the reservoir 84 when the flow rate of the liquids away from the edge 76 is great enough. The free jet 86 breaks up into rotating elements 88 at its distal end. While the rotating elements 88 are in flight from the free jet 86, they pass through a steady magnetic field 94, which is shown being created by two torous-shaped magnets 90, 92. As the rotating elements 88 pass through the magnetic field the section of the rotating elements 88 containing the magnetic pigment will become magnetized, As the rotating elements 88 are identically oriented with respect to their trajectories, they will be identically magnetized with respect to their geometric poles.

If high viscosity hardenable liquids are used, then identically magnetized filaments, suitable for cylindrically symmetric rotating elements will be created instead of spheres 88.

Figure 17A:
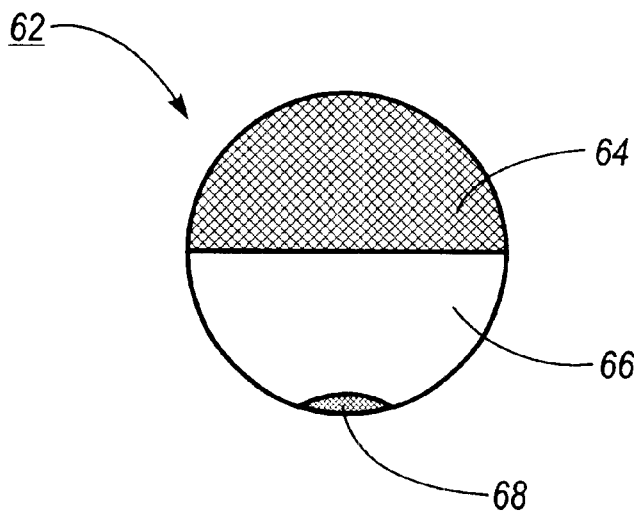
FIG. 17a shows an alternative embodiment to a rotating element with two magnetic segments.

In the event that a simpler rotating element 62, using a large black magnetized segment 64 and only one small polar magnetic segment 68 separated by an white or colored unmagnetized segment 66, as shown in FIG. 17a, is desired then only three of the surfaces would be used. One surface would be used for the large black magnetized segment, one for the white or colored unmagnetized segment and one for the magnetic polar segment. This element could be used interchangeably with the above described element having two polar, magnetic segment.

Figure 17B:
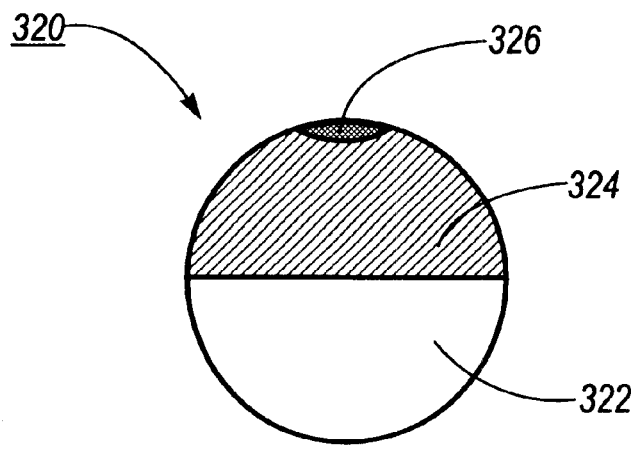
FIG. 17b shows an alternative embodiment to a rotating element with one magnetic segment.

Furthermore, this apparatus can also be used to create a rotating element 320 with only a single small, polar magnetic segment 326 and two unmagnetized segments 322, 324 as shown in FIG. 17b. Again, only three surfaces would be used. One surface would be used for the black segment, one for the white segment and one for the polar magnetic segment. Such an element could be used interchangeably with the segmentally charged rotating element described above with respect to FIG. 4.

Sheet Fabrication Method

The sheet 46 can be fabricated using the thin layer technique as described above and shown in FIG. 11. Once a plasticized sheet 46 has been obtained with uniformly magnetized rotatable particles 34, an electric field can be applied as known in the art to orient the magnetized rotatable particles 34 in a common direction. Subsequently, a thin layer 110 of uncured or molten material, such as an uncured elastomer, epoxy or a molten polymer, containing powdered soft magnetic material particles 100 is adhered to one side of the gyricon. The powdered soft magnetic material particles 100 will be attracted towards the polar magnetic segment 58 of the rotating elements and form the soft magnetic material pads 42 as described earlier. At this point the thin layer 110 containing the particles 100 is cured or otherwise solidified, locking the soft magnetic material pads 42 in place.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 4 shows a cross-sectional view for either a spherically or cylindrically shaped rotating element 34 the pad will tend to form in a circular shape for a spherically shaped rotating element 34 or in an elongated shape for a cylindrically shaped rotating element.

Configuration 3—Element With Dual Magnetic Portions and two Pads

FIG. 18 shows a cross-section of a gyricon sheet 46. Again, this sheet is a variant of the sheet 46 shown in FIG. 4 and the same reference numerals will be used for the same elements. The sheet 46 is made from a transparent optical medium 44 with an oil filled cavity 36 which contains a rotating element 52. Rotating element 52 is a bichromal element containing, for example, a black segment 54 and a white segment 56. Additionally, rotating element 52 contains two small polar magnetic segments 58, 60 where polar magnetic segment 58 is located adjacent to the black segment 54 and polar magnetic segment 60 is located adjacent to the white segment 56. Further, if the junction 70 of the segments 54, 56 is viewed as an equatorial line then the magnetic segments 58, 60 are located at the "poles" of the rotating element 52.

Two soft magnetic material pads 42 are contained within the transparent optical medium 64 adjacent to the oil filled cavity 36 in an opposed configuration, as shown in the FIG. 18. The two magnetic segments 58, 60 interact with the two soft magnetic material pads 42 to provide the rotating element with two rotational positions in which the threshold is controlled by magnetic fields. Each magnetic segment 58, 60 interacts with one of the two soft magnetic material pads 42 in the same manner as described above with respect to FIG. 4. That is, when one of the magnetic segments 58, 60 of the rotating element 52 is adjacent to one of the soft magnetic material pads 42 that is embedded next to the oil filled cavity 36, a strong magnetic force tends to hold the rotating element 52 in place. This is because the distance between the magnetic segments 58, 60 of the rotating element 52 and the soft magnetic material pad 42 is very short compared to the dimensions of the magnetized portions of the rotating element. For practical purposes, the separation distance $D_s$ between the rotating element 52 and the soft magnetic material pad 42 should be no more than the diameter d of the rotating element 52 multiplied by a factor of three. The soft magnetic material pad 42 should preferably have a length l no smaller than ¼ of the rotating element diameter d. The only restriction on the upper limit of the length l is that it must not be so large as to interfere with surrounding rotational elements or their soft magnetic material pads. This will be dictated by the packing density of the gyricon sheet 46. Depending on the packing density, the length l of the soft magnetic material pad 42 can be as large as the diameter d of the rotating element 34 or even twice as large as the diameter d of the rotating element 34 or more. This magnetic force will cause the rotating element 52 to be latched in place, and will also require a larger electrical field than otherwise to cause the rotating element 52 to start to rotate in the oil filled cavity 62. Once the rotating element 52 has rotated a short distance it will experience a much reduced force from the soft magnetic material pad 42 it had been adjacent to and the motion of the rotating element 52 will be dominated by the applied electrical field.

Using a rotating element 52 with two magnetic segments and two soft magnetic material pads provides thresholds for both states of rotation. Two magnetic segments and two soft magnetic material pads are used, one for each desired orientation of the rotating element, and therefore, the threshold is controlled for both states, in contrast to the embodiment described above and shown in FIG. 4. Additionally, the magnetized portion of the rotating element is confined to two small polar magnetic segments. While it would be possible to implement this variation using a rotating element which uses the magnetized segment 40 of the rotating element shown in FIG. 4 combined with a single polar magnetic segment 58 of the type shown in the rotating element shown in FIG. 18, using two small polar magnetic segments 58, 60 as shown in FIG. 18 provides a finer more precise control. These enhancements would be useful in providing for the sharp threshold and image storage requirements needed to effectively implement passive addressing.

Methods of fabricating the rotating elements 32 and the sheets utilizing those elements have been detailed above with respect to other configurations and are also applicable in this embodiment.

Configuration 4—Soft Magnetic Material Rings

The various embodiments discussed above placed the soft magnetic material pads near one or both poles of a spherical rotating element. While this is a convenient location for the soft ferromagnetic material, it suffers from the disadvantage that light can not travel through the soft magnetic material and therefore some of the desirable visual characteristics of the gyricon sheet may be disrupted. For instance, the brightness of the display may be lessened. Therefore, it would be desirable to fabricate a gyricon device using magnetic fields and soft magnetic material where the soft magnetic material is not contained in the optical viewing path. The following description describes another variant of the sheet shown in FIG. 4 and uses the same reference numerals for like elements.

Figure 19:
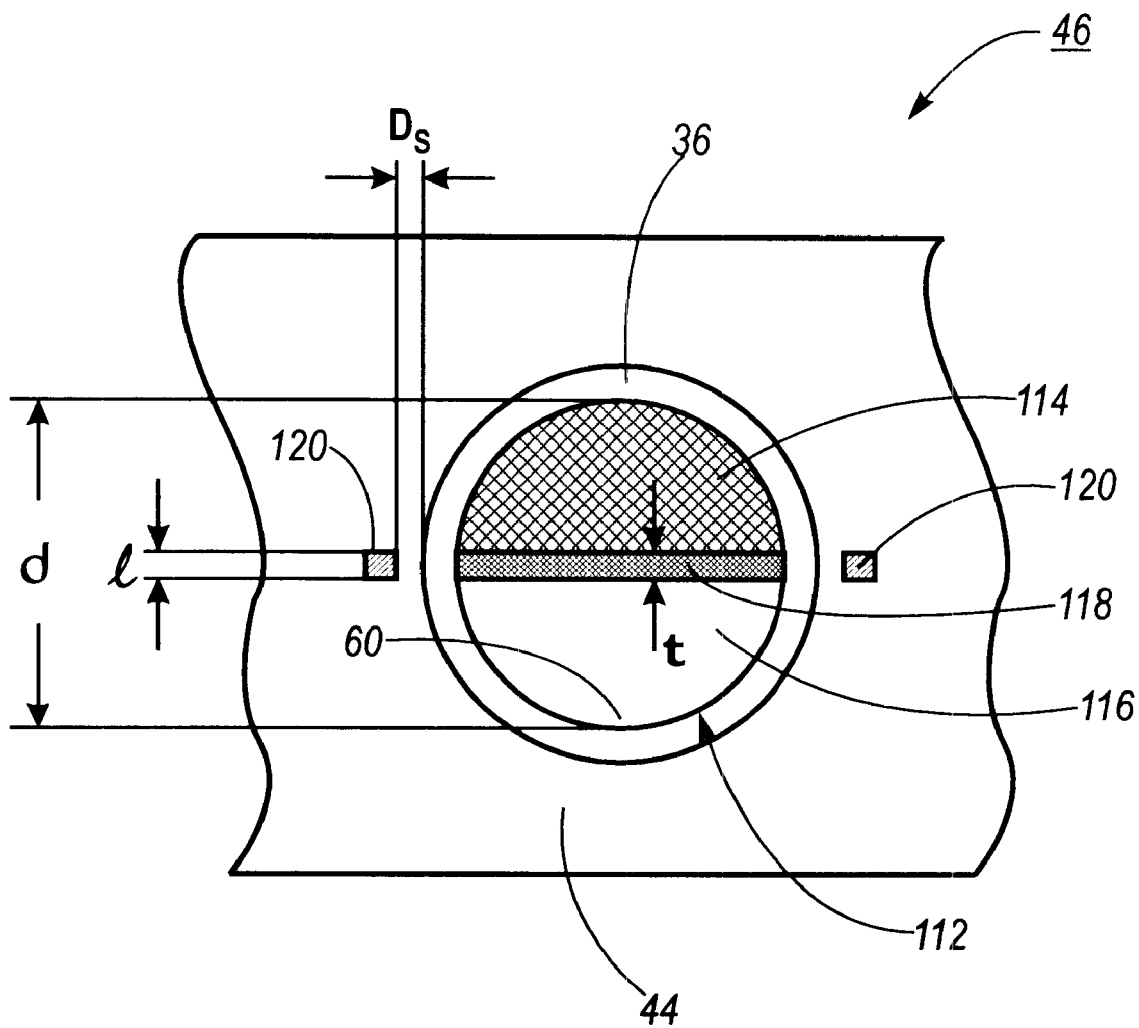
FIG. 19 shows a cross-sectional view of a fifth embodiment of a gyricon sheet according to the present invention.

FIG. 19 shows the gyricon sheet 46 made from transparent optical medium 44 with an oil filled cavity 36 as before. However, the oil filled cavity 36 contains a bichromal rotating element 112 with an end segment 114 of a first color and an end segment 116 of a second color different from the first color. Interposed between the end segments 114, 116 is a magnetic segment 118. The magnetic segment 118 is a relatively thin segment, of thickness t, approximately slicing through the center of the rotating element 112. Instead of discreet soft magnetic material pads there is now a soft magnetic material pad in the shape of a soft magnetic material loop or ring 120 surrounding the oil filled cavity 36 again, at approximately the centerline of the oil filled cavity 36. It should be noted that if the rotating element 112 is spherically symmetric than the soft magnetic material ring 120 will be essentially round, as for instance, the rings around Saturn. However, if the rotating element 112 is cylindrically symmetric then the soft magnetic material ring 120 will be an elongated shape. The rotating element 112 has two equally stable states of orientation, each with a sharp threshold mostly controlled by magnetic fields between the magnetic segment 118 and the soft magnetic material ring 120. For practical purposes, the separation distance $D_s$ between the rotating element 112 and the soft magnetic material ring 120 should be no more than the thickness t of the magnetic segment 118 multiplied by a factor of four. The soft magnetic material ring 120 should preferably have a length l no smaller than ¼ of the magnetic segment thickness t. The only restriction on the upper limit of the length l is that it must not be so large as to interfere with surrounding rotational elements or their soft magnetic material pads. This will be dictated by the packing density of the gyricon sheet 46. Depending on the packing density, the length l of the soft magnetic material ring 120 can be as large as the thickness t of the magnetic segment 118 or even four as large as the thickness t of the magnetic segment 118 or more.

Operation is similar to the examples described above. The magnetic segment 118, interacts with the soft magnetic material ring 120 in the same manner as described above with respect to FIGS. 4 and 18. That is, when the magnetic segment 118 of the rotating element 112 is adjacent to the soft magnetic material ring 120 embedded next to the oil filled cavity 36, a strong magnetic force tends to hold the rotating element 112 in place. This magnetic force will cause the rotating element 112 to be latched in place, and will also require a larger electrical field than otherwise to cause the rotating element 112 to start to rotate in the oil filled cavity 36. Once the rotating element 112 has rotated a short distance it will experience a much reduced force from the soft magnetic material ring 120 and the motion of the rotating element 112 will be dominated by the applied electrical field.

This configuration allows for latching with either side of the rotating element 112 to be viewable and unobstructed by magnetic latching elements.

Rotating Element Fabrication

Fabrication of the rotating element 112 shown in FIG. 19, again requires modified multiple rotating disk assembly, as described in U.S. Pat. No. 5,717,514 by Sheridon titled "Polychromal Segmented Balls For A Twisting Ball Display", and U.S. patent application Ser. No. 08/960,865 by Sheridon et al. titled "Twisting Cylinder Display" and incorporated by reference hereinabove, or other planar stream/free jet type devices such as those disclosed in U.S. Pat. No. 5,344,594, titled "Method For Fabrication Of Multicolored Balls For A Twisting Ball Display", by Sheridon and also incorporated by reference hereinabove as discussed with reference to creating the rotating elements that have one or more small, pole magnetic segments.

Two separator members would be required but only three of the liquid delivery surfaces would be used. One surface would be used for one of the colored end segments, one surface would be used for the other, differently colored end segment and one for the magnetic segment. Again, the magnetic segment in the individual rotating elements can be magnetized by causing the rotating elements to pass through a magnetic field during the fabrication process, as illustrated in FIGS. 16 and 17.

Sheet Fabrication

The soft magnetic material ring 120 can also be fabricated by utilizing the same process as the Sheet Fabrication Method 1 described above for the soft magnetic material pads with a single latched state as shown in FIG. 9. The magnetized rotating element 112 is mixed with a soft magnetic material powder such as Black Pigment #V302 by the Ferro Corporation, Cleveland, Ohio. The powdered particles would cluster around the magnetized magnetic segment. Again, surplus particles can be removed by the use of a fluidized bed or by placing the balls on a screen and washing them with an air stream. The rotating element 112 is then mixed with a liquid elastomer and spread out into a thin layer on a flat surface to form a sheet. This sheet is next placed between two flat magnets and the magnetic field created by these magnets will cause the magnetized rotating elements to rotate into a common alignment with each other. With this magnetic field present the sheet is cured into a tough silicone elastomer, as is known in the art. After curing, the elastomer is swelled by placing it into an oil bath as is also know in the art. The powdered soft magnetic material particles have thus been incorporated into the elastomer matrix, to form the soft magnetic material ring 120 in the vicinity of the magnetic segment 118 of the rotating element 112.

Alternatively, the soft magnetic material ring 120 can also be fabricated by utilizing the same process as the Sheet Fabrication Method 3 described above for the soft magnetic material pads with a single latched state and shown in FIG. 12. The soft magnetic material ring 120 can be formed by mixing into an uncured elastomer soft magnetic material powder and magnetized rotating elements 112. This is formed into an uncured sheet on a surface, and the curing is delayed to allow the pigment particles to be attracted to the magnetized segments of the rotating elements 112. The pigment particles will be attracted to the magnetized segments because the magnetized segments create a very non-uniform magnetic field in their vicinities. This field provides the mechanical force to move the pigment particles to the surface of the magnetized segments of the rotating elements. When this process is sufficiently complete, a uniform magnetic field is applied to the sheet, causing the rotating elements and the attached soft magnetic material pigment particles, to rotate into common alignment. While this field is continuously applied the elastomer sheet is cured as is known in the art. The sheet can then be swelled, as is also known in the art.

Hard Magnetic Material Trap Devices

Up to this point, the description has been focussed on describing gyricon devices which utilize soft magnetic materials in conjunction with magnetized elements. That is material capable of developing a strong magnetic dipole strength while exposed to a strong external magnetic field, but that is not capable of retaining significant remnant magnetism when no longer exposed to the external field. However, forms are also possible which utilize hard magnetic materials, that is material capable of retaining significant magnetism without the aid of an external field. These devices are described as magnetic trap devices because the continuous magnetic field serves to trap the rotating element in its place until an extra strong electric field or an opposite polarity magnetic field is applied to overcome the magnetic field and allow the rotation of the element.

Gyricon With Magnetic Pads

Figure 20:
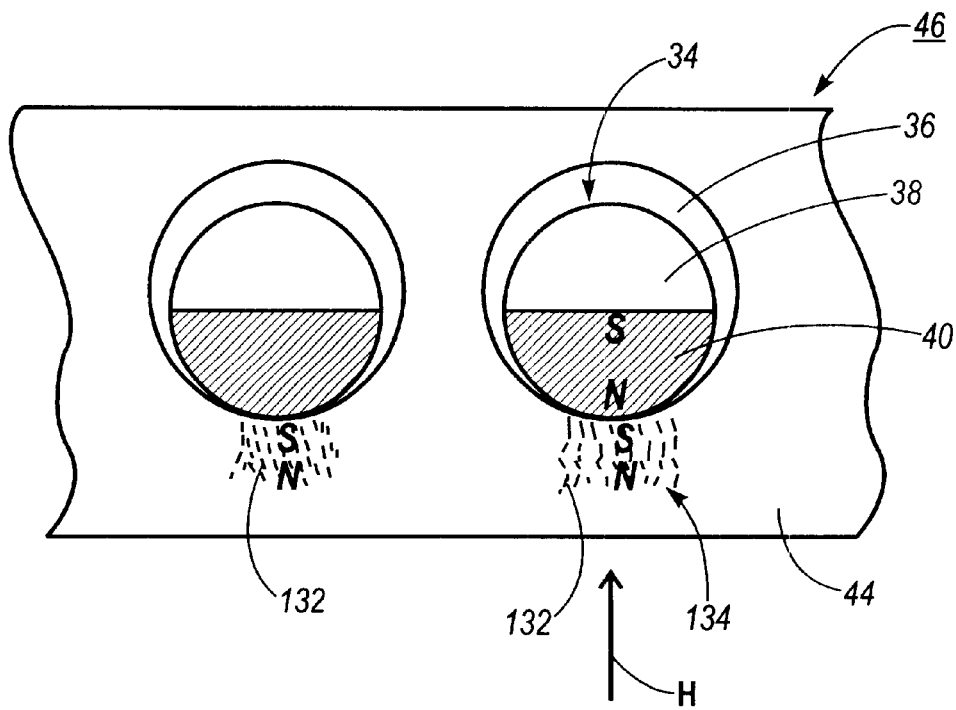
FIG. 20 shows a cross-sectional view of a sixth embodiment of a gyricon sheet according to the present invention with a rotating element in a first orientation.

The rotatable optical Gyricon elements described above in FIGS. 1, 2, and 3 are constrained to stay within cavities that emulate the shapes of the elements. Therefore it is possible to create magnetic traps that ensure the bistability of switching between optical states, and that create modifiable switching thresholds. FIG. 20 shows a modification of the structure shown in FIG. 4, and therefore the same reference numerals will be used for the same elements.

FIG. 20 shows a gyricon sheet 46 made from a transparent optical medium 44 with an oil filled cavity 36 enclosing a rotating element 34 where one segment 40 is one color and the other segment 38 is a second color. The rotating element 34 shown in FIG. 20 is the same bichromal rotating element 34 as shown in FIG. 4 and the segment 40 of the rotating element 34 is made from pigments, at least some of which are permanently magnetizable. As noted with regard to FIG. 17b, rotating element 320 may be used interchangeably with the rotating element 34 shown in this figure and other figures throughout. Adjacent to each oil filled cavity 36 and localized to the dimensions of the rotating element 34 is a pad 134 of permanently magnetized particles 132. This is different from the structure shown in FIG. 4 which had a pad made of soft magnetic material. The pad 134 and the magnetized segment 40 of the rotating element 34 are magnetized in such a way that when the magnetized segment 40 of the rotating element 34 is rotated to be adjacent to the pad 134 the magnetized segment 40 and the pad 134 are maximally attracted to one another. This can be accomplished by polarizing the magnetic segment 40 and the pad 132 as shown in the diagram where "N" and "S" represent the north and south poles respectively. Thus, when the rotating elements are rotated as shown in FIG. 20 they are held in place by a magnetic field H. In addition, since the magnetic pads 134 are of dimensions comparable to those of the magnetic segment 40, the magnetic field H created by them in the vicinity of the rotating element 34 is strongly non-uniform.

Figure 21:
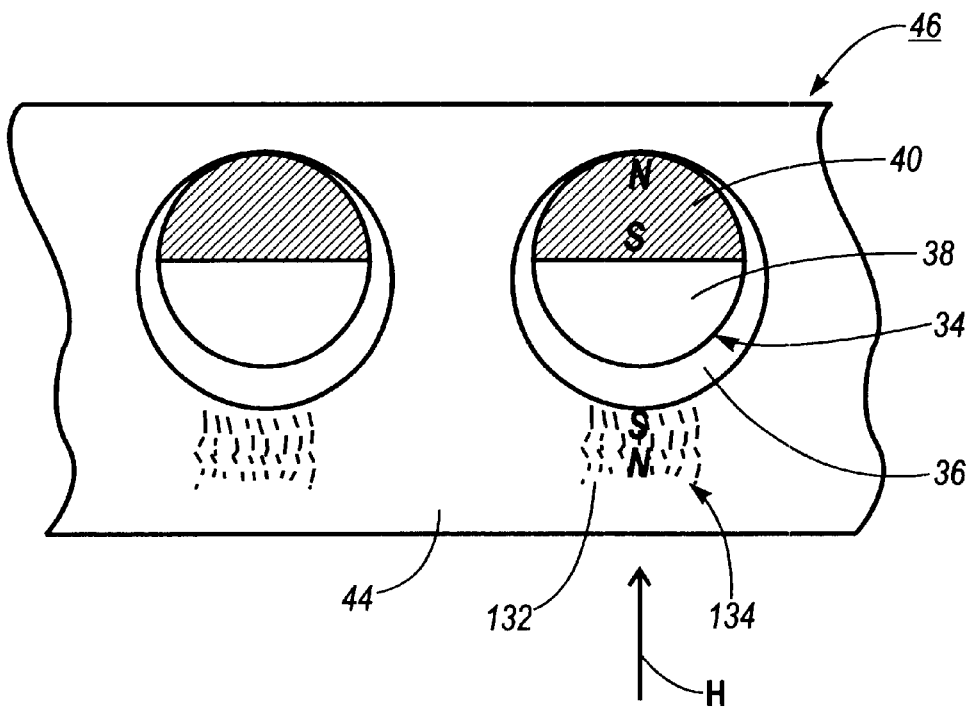
FIG. 21 shows a cross-sectional view of a sixth embodiment of a gyricon sheet according to the present invention with a rotating element in a second orientation.

FIG. 21 shows the same gyricon sheet 46 with the rotating element 34 rotated in the opposite configuration as shown in FIG. 20. That is, the rotating element 34 has been rotated such that the magnetic segment 40 is facing away from the pad 134. As can be seen in FIG. 21, the polarization of the magnetic segment 40 and the pad 134 are such that like poles are facing each other and the magnetic segment 40 and the pad 134 will now repel each other.

For the configuration shown in FIG. 21 to be stable, the rotating element 34 must not undergo slip rotation. Experimental observation confirms that when rotating elements are switched from one optical state to another they rotate as they cross the cavities. Sometimes they even roll along the cavity walls. When they reach the cavity walls adjacent to the addressing electrode they stop all forms of rotary motion. These rotating elements never undergo slip rotation in contact with cavity walls, only rolling rotation.

Thus the rotating element 34 with its magnetic segment 40 facing upward is pushed against the cavity wall by the magnetic field. It can roll along the cavity wall, but once it reaches the highest portion of the cavity wall any further rotation will move the magnetic segment 40 closer to the magnetic pad 134, a movement resisted by the repelling force of the magnetic field H. Thus this is a second stable orientation of the rotating element with respect to magnetic field H.

This sheet can be fabricated using any of the methods previously described for fabricating a soft magnetic material pad device that is a gyricon with a single latched state and substituting a permanently magnetizable particle, such as Black Magnetic Pigment type 03118 by Wright Industries, Brooklyn, N.Y., for the soft magnetic material particles.

Gyricon With Etched Rubber Magnet

Figure 22:
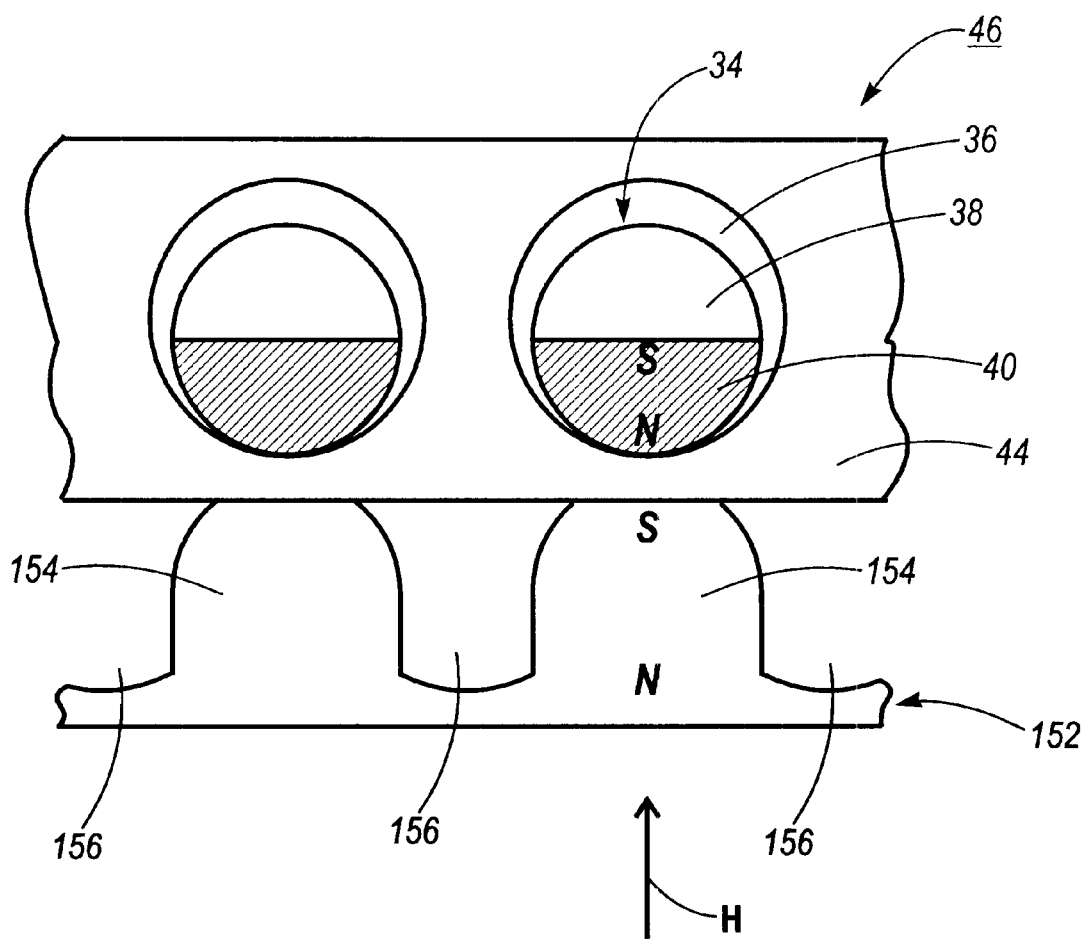
FIG. 22 shows a cross-sectional view of a seventh embodiment of a gyricon sheet according to the present invention.

Other means of implementing the strongly non-uniform magnetic field H with dimensions comparable to those of the magnetic segment exist. FIG. 22 shows an alternative implementation and the same reference numerals will be used to identify the same elements. Again, the gyricon sheet 46 is made from the transparent optical medium 44 with an oil filled cavity 36 enclosing a rotating element 34 although rotating element 320 shown in FIG. 17b could also be used.

However, instead of the pad 134 of permanently magnetized particles 132 a magnetic pad 152 has been adhered to one surface of the gyricon sheet. The magnetic pad 152 is constructed from a uniform permanently magnetized rubber sheet which has had etched areas 156 removed to create magnetic hills 154. The etching depth determines the strength of the non-uniform component of the magnetic field created by this magnet. The magnetic hills 154 have dimensions of the same order as the rotating element 34 and the magnetic pad 152 is aligned with the gyricon sheet 46 such that each magnetic hill 154 is aligned with an oil-filled cavity 36. The magnetized segment 40 of the rotating element 34 is magnetized in such a way that when the magnetized segment 40 of the rotating element 34 is rotated to be adjacent to the magnetic hill 154 of the magnetic pad 152, the magnetized segment 40 and the magnetic hill 154 are maximally attracted to one another. This can be accomplished by polarizing the magnetic segment 40 and the magnetic hill 154 as shown in the diagram where "N" and "S" represent the north and south poles respectively. Thus, when the rotating elements are rotated as shown in FIG. 22 they are held in place by a magnetic field H. In addition, since the magnetic hills 154 are of dimensions comparable to those of the magnetic segment 150, the magnetic field H created by them is strongly non-uniform.

The gyricon sheet 46 can be made using any of the previously known techniques for creating gyricon sheets and utilizing magnetizable rotating elements, but in particular manufacturing techniques which produce a regular array of rotating elements within a sheet will simplify production and alignment of the magnetic pad 152. One such manufacturing technique is the "eggcrate" display disclosed in U.S. Pat. No. 5,777,782 by Sheridon, titled "Auxiliary Optics For A Twisting Ball Display" and herein incorporated by reference. The "eggcrate" display produces a highly, regular geometric pattern of rotating elements which allows for the tight registration and alignment of rotating elements with auxiliary components such as optical components or in this case a patterned magnetic pad.

Magnetic Pad Fabrication Method 1

The patterned magnetic pad 152 can be made by taking a sheet of "rubberized magnet", so called because it consists of a high concentration of magnetic pigment particles dispersed in a rubber binder, and patterning it by several known methods. One method is to coat the surface of the rubberized magnet with a photoresist. The photoresist can then be masked and patterned as is known in the art. If a positive photoresist is used, the gyricon sheet 46 itself can be used as the mask. The rotating elements 34 will block the light rays where a magnetic hill is desired. Using the gyricon sheet 46 as the mask to produce the microstructure on the magnetic pad 152 insures that the magnetic hills 154 will be of the correct dimensional size and will correctly align with the rotating elements 34 thus relieving some of the alignment issues. Once the photoresist has been exposed and developed the rubberized magnet can be etched using acids, such as nitric acid or sulfuric acid, or by using a plasma discharge etching process. The depth of the etching process, and thus the strength of the spatially varying portion of the magnetic field, is determined by the strength of the acid and the amount of time spent in the acid.

Magnetic Pad Fabrication Method 2

In another known method, a thin aluminum mask can be created on the sheet of rubberized magnet. This sheet would be overcoated with a photoresist, the latter being exposed using the Gyricon sheet 46 as a photo-mask, as before. If a positive photoresist was used, the exposed areas will be removed. Etching with an acid, such as nitric acid, will leave optically reflective aluminum mirrors over regions corresponding to the rotating element 34 positions. The sheet of rubberized magnet can now be exposed to a strong light source, such as from a laser or a strong incandescent lamp. The strong light source will destroy the magnetic properties of the rubberized magnet, where it is not protected by the aluminum mask (which reflects the light), by heating the sheet above the Curie point. Areas of the rubberized magnet heated above their Curie point will lose their magnetism. Although this does not result in the actual removal of material to form the magnetic hills 154, the effect is the same.

Once the patterned magnetic pad 152 is made it can be aligned with and adhered to the gyricon sheet using appropriate adhesives or mechanical clamping devices. Another approach would be to coat the surface of the gyricon sheet with a layer of uncured silicone rubber, and apply it to the rubberized magnet. The edges of the thus made composite sheet would next be clamped and the silicone rubber cured. The silicone rubber sheets would adhere poorly, but the clamps at the edges of the sheet would prevent delamination.

Gyricon With Captured Magnetic Rotating Elements

Figure 23:
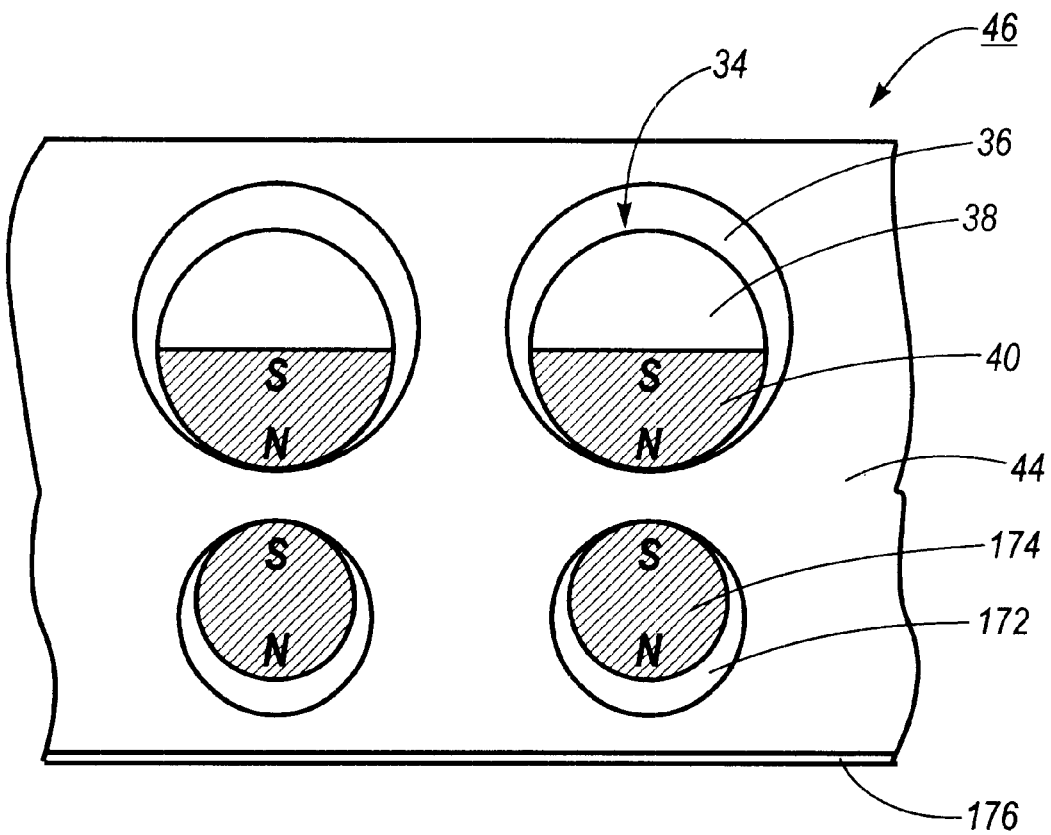
FIG. 23 shows a cross-sectional view of a eighth embodiment of a gyricon sheet according to the present invention.

Another means of implementing the strongly non-uniform magnetic field H is with magnets having dimensions comparable to those of the magnetic segment. One embodiment is shown in FIG. 23. As the structure shown in FIG. 23 is a variant of the structure shown in FIG. 4, the same reference numerals will be used to identify the same elements. FIG. 23 shows an implementation of a gyricon sheet 46 made from a transparent optical medium 44 with an oil filled cavity 36 enclosing a rotating element 34 where one segment 38 is one color and the other segment 40 is a second color. The rotating element 34 shown in FIG. 23 is the same bichromal rotating element 34 as shown in FIG. 4, however the rotating element 320 shown in FIG. 17b, could also be used. The segment 40 of the bichromal rotating element is made from pigments, at least some of which are permanently magnetizable, such as those used in magnetic recording tapes. Examples of such pigments include Black Magnetic Pigment type 031182 by Wright Industries, Brooklyn, N.Y.

However, instead of the pad 134 of permanently magnetized particles 132, as shown in FIG. 22, a second oil filled cavity 172 enclosing a ferro-magnetic element 174 is provided. It should be noted that while a round ferro-magnetic element is illustrated, it is not necessary, and it may even be preferable that the ferro-magnetic element 174 not be round. This is due the constraint that the ferro-magnetic element 174 should not itself rotate during the subsequent life of the gyricon sheet 46. This can accomplished in several ways. The first of these is to allow the ferromagnetic element to, at least partially, stick to the transparent optical medium. This affect might also be accomplished by making the ferro-magnetic element 174 in a shape that is not amenable to rotation, such as one having protrusions or sharp edges which would impede rotation. This affect can also be accomplished by using magnetic balls that release poorly from the silicone elastomer when it is swollen in plasticizing oil.

Lastly, a thin permanently magnetic layer 176 could be used to hold the ferro-magnetic element 174 in the correct orientation. Such a thin magnetic layer could comprise a thin sheet magnet, a thin layer of magnetic particles or other means. The advantage to using ferro-magnetic elements 174 that are spherical, is that the same process used to make the rotating elements 34 can be used giving good control of dimensions and insuring that the dimensions of the ferro-magnetic elements 174 are of the same order as the rotating elements 34.

Figure 24:
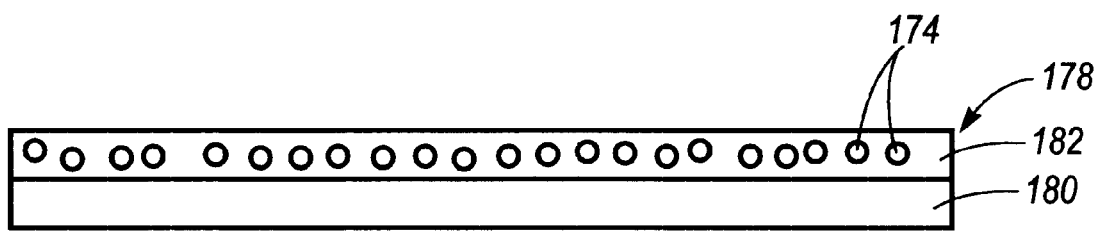
FIG. 24 shows a first step in a process used to make a gyricon sheet shown in FIG. 23.

The ferro-magnetic element 174 is aligned within the gyricon sheet 46 such that each ferro-magnetic element 174 is aligned with a rotating element 34. The ferro-magnetic element 174 could be comprised of magnetic pigments, or for stronger magnetic fields rare earth materials. The magnetized segment 40 of the rotating element 34 is magnetized in such a way that when the magnetized segment 40 of the rotating element 34 is rotated to be adjacent to the ferro-magnetic element 174 the magnetized segment 40 and the ferro-magnetic element 174 are maximally attracted to one another. This can be accomplished by polarizing the magnetic segment 40 and the ferro-magnetic element 174 as shown in the diagram where "N" and "S" represent the north and south poles respectively. Thus, when the rotating elements are rotated as shown in FIG. 24 they are held in place by a magnetic field H. In addition, since the ferro-magnetic elements 174 are of dimensions comparable to those of the magnetic segment 40, the magnetic field H created by them is strongly non-uniform.

Sheet Fabrication Method

Figure 25:
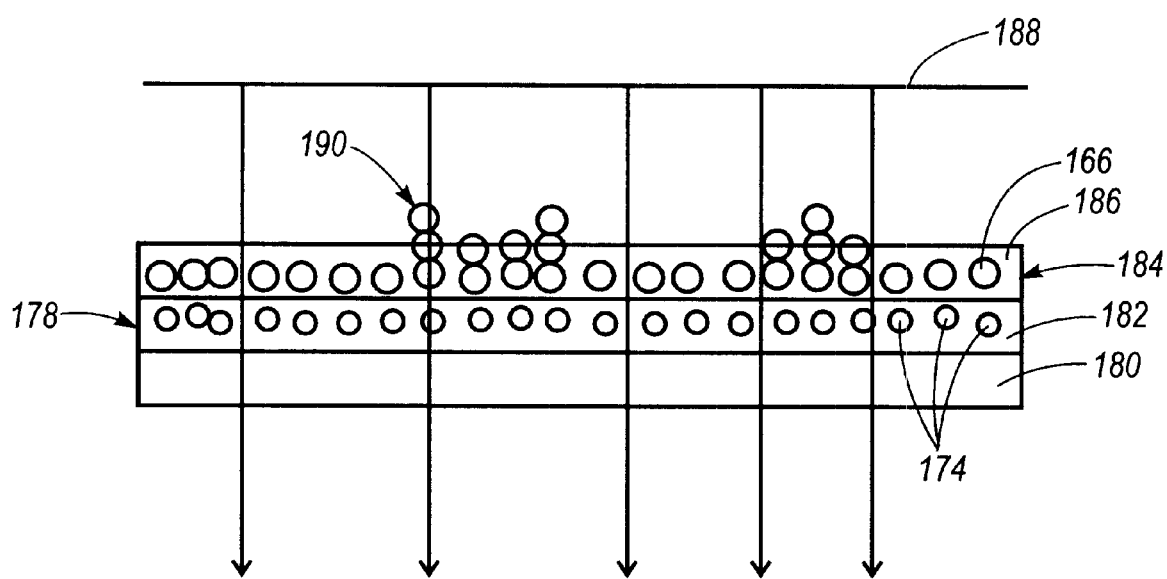
FIG. 25 shows a second step in a process used to make a gyricon sheet shown in FIG. 23.

The gyricon sheet 46 shown in FIG. 23 can be constructed by first making a ferro-magnetic particle layer 178 comprising unmagnetized ferro-magnetic elements 34 in uncured elastomer 182 as shown in FIG. 24. The ferro-magnetic particle layer 178 should be made on a release layer 180 such as Teflon. After the ferro-magnetic particle layer 178 has been partially cured a second layer of uncured elastomer 186 containing rotating elements 34 is applied to form a rotating element layer 184 as shown in FIG. 25. The thickness of the second layer of elastomer 186 should be greater than the diameter of the rotating elements 34, but preferably less than twice the diameter of the rotating elements 34. A uniform magnetic field 188 is applied in a direction normal to the layer 185, 178 surfaces. The uniform magnetic field 188 will cause the rotating elements 34 to seek out and align with the ferro-magnetic elements 174 and possibly form strings of rotating elements such as string 190. This is a well known effect and is the basis of the 'magnetic brush' development systems used in xerography. At this point the compound structure of the rotating element layer 184 plus the ferro-magnetic particle layer 178 can be cured. During the curing process, both layers 178, 186 will be bonded together.

After curing, any excess rotating elements 34 which have formed strings 190 can easily be removed using a knife or by light rubbing because they will be protruding from the cured elastomer 186. The compound structure of the cured rotating element layer 184 plus the cured ferro-magnetic particle layer 178 can be removed from the release layer 180 and swelled as in known in the art to produce gyricon sheet 46 shown in FIG. 23.

Hybrid Devices Containing Both Soft and Hard Magnetic Material

Two classes of improved gyricons and their operation have been described thus far. Those containing soft magnetic material and those containing hard magnetic material. However, hybrid devices containing both types of magnetic material are also feasible.

Gyricon With Magnetic Trap and Opposed Latch

Figure 26:
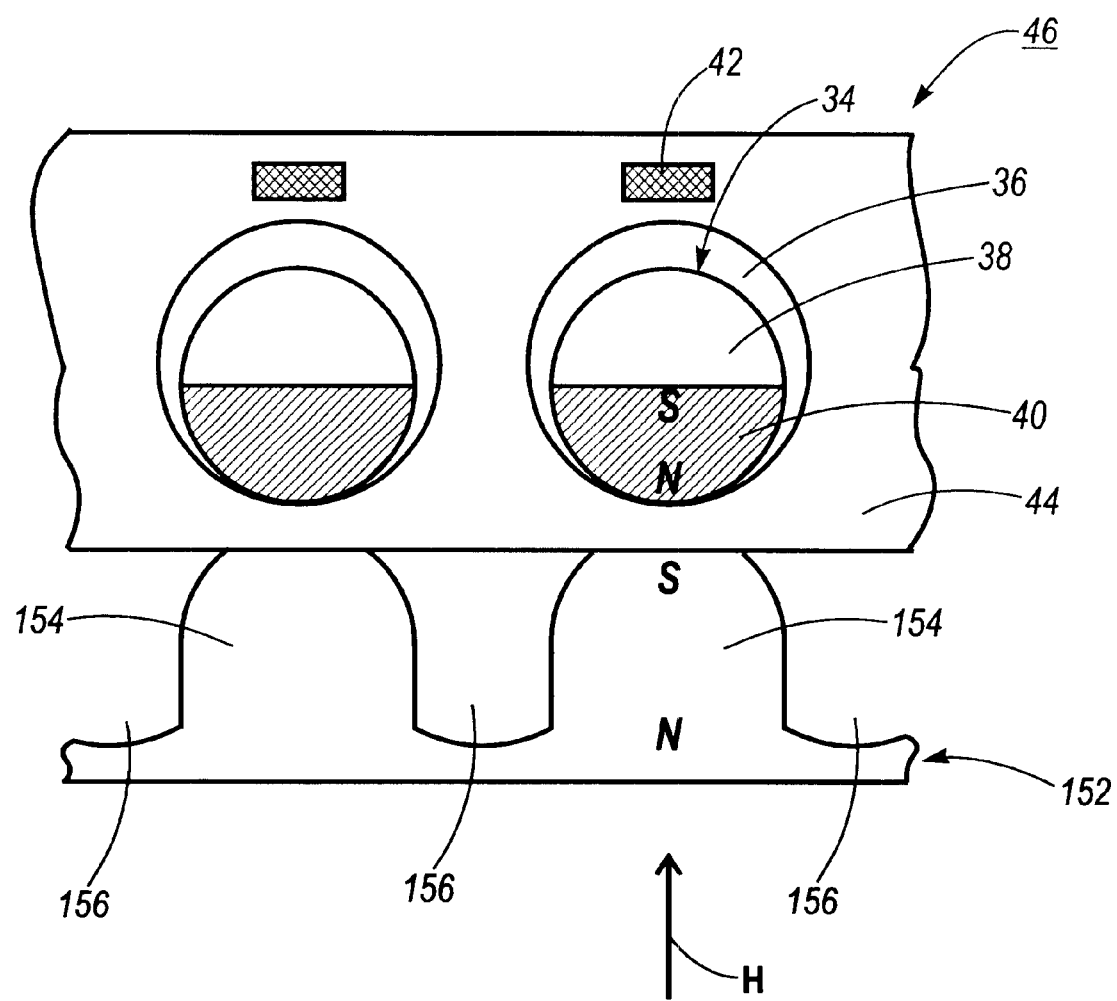
FIG. 26 shows a cross-sectional view of a ninth embodiment of a gyricon sheet according to the present invention.

FIG. 26 shows a gyricon sheet 46 which has the magnetic elements of the embodiments shown in both FIGS. 4 and FIG. 22, therefore the same reference numerals will be used to donate the same elements. In FIG. 26 is shown a cross-section of a portion of a magnetically assisted Gyricon sheet 46. A black and white bichromal spherically or cylindrically symmetric rotating element 34 is shown in which the black magnetized segment 40 is made from black pigments, some of which are permanently magnetizable. It should be noted that rotating element 320 shown in FIG. 17b, could also be used interchangeably with the rotating element 34. It should also be noted that black and white are used here for illustrative purposes only and any colors could be chosen. The white unmagnetized segment 38 is constructed from the usual materials and is not magnetizable. This rotating element is contained in an oil filled cavity 36. The soft magnetic material pad 42 is incorporated near the cavity structure of each rotating element the same as shown in FIG. 4. The rotating element 34 is also made from materials that develop electrical potentials in contact with the liquid in the oil filled cavity 36 and in the presence of the electrical field, so that the segments 38, 40 of the rotating element 34 develop different electrical potentials from each other. Additionally, a magnetic pad 152 has been adhered to the surface of the gyricon sheet which is opposed to the soft magnetic material pad 42. The magnetic pad 152 is constructed from a uniform permanently magnetized rubber sheet which has had etched areas 156 removed to create magnetic hills 154 as discussed earlier with respect to FIG. 22. In operation, the device would work as a magnetic trap device described hereinabove with additional stability applied from the soft magnetic material pad 42 for the condition when the rotating element 38 is disposed away from and is being repelled by the magnetic pad. It should be noted that this configuration may also use other of the rotating elements discussed hereinabove including the rotating element with a single pole magnetic segment, dual pole magnetic segments, or a rotating element with a single pole magnetic segment and a magnetic segment.

Figure 27:
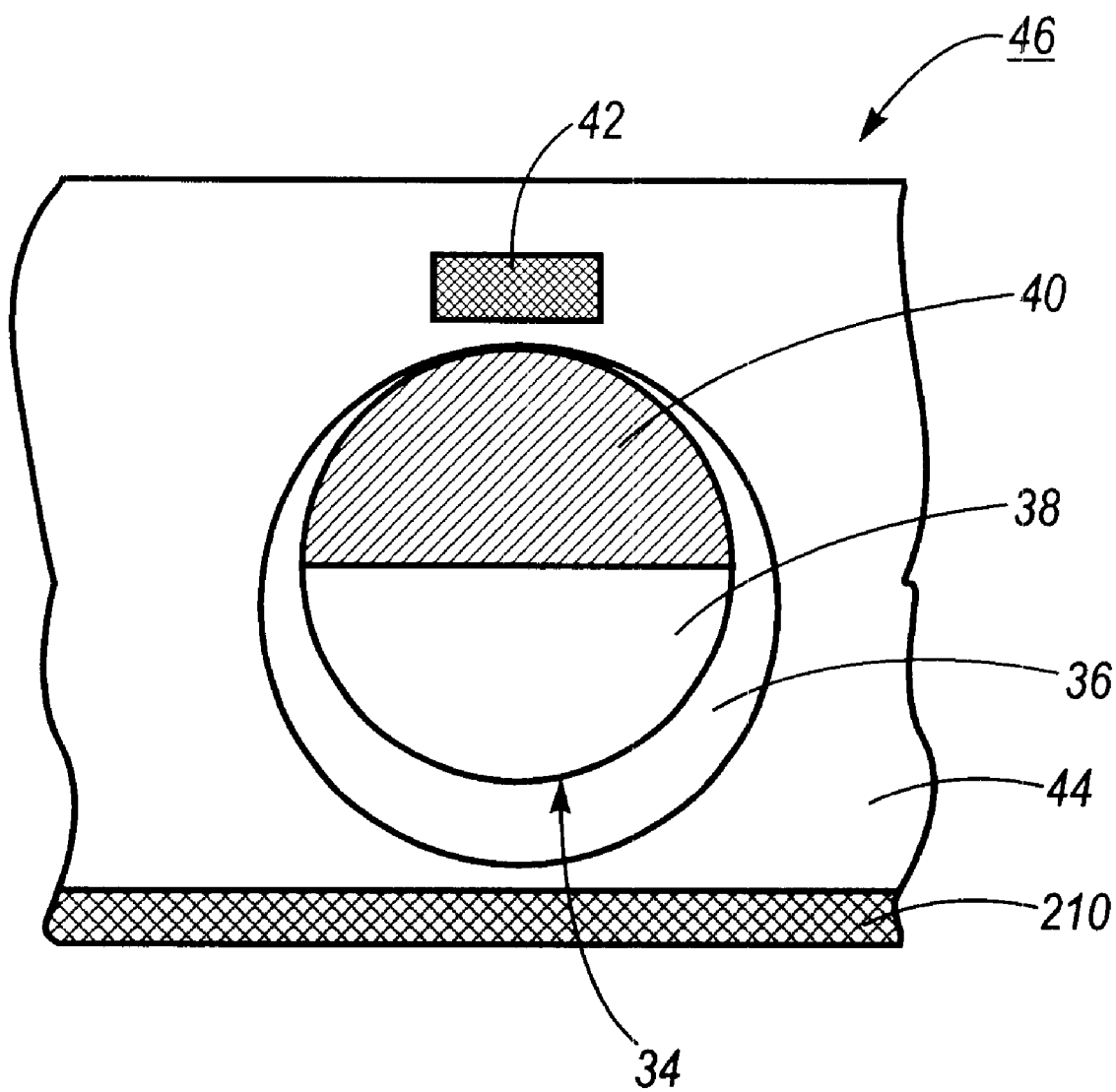
FIG. 27 shows a cross-sectional view of a tenth embodiment of a gyricon sheet according to the present invention.

An alternative embodiment is shown in FIG. 27. FIG. 27 shows a cross-sectional view of a similar sheet using the same elements as used in FIG. 26, except that the patterned magnetic pad 152 has been replaced with a substantially uniform, thin soft magnetic material layer 210. It should also be noted that rotating element 320 shown in FIG. 17b can be used in this embodiment as well.

The soft magnetic layer 210 functions similarly to the soft magnetic pads 42 discussed herein before. The magnetic segment 40 of the rotating element 34 induces a non-uniform magnetic attractive force between the magnetic segment 40 and the soft magnetic layer 210. This magnetic force will cause the rotating element 34 to be attached to the oil filled cavity 36 wall. The magnetic force will also require a larger electrical field than otherwise to cause the rotating element 34 to start to rotate in the oil filled cavity 36 because the electrical field must first overcome the magnetic force to cause the rotating element 34 to rotate. However, except for the increased value of the applied electric field, the gyricon sheet 46 may be addressed by any of the addressing methods described herein above or known in the art. Once the rotating element 34 has rotated a short distance it will experience a much reduced force from interaction with the soft magnetic material layer 210 and the motion of the rotating element 34 will be dominated by the applied electrical field.

Gyricon With Magnetic Trap and 90 Degree Latch

Figure 28:
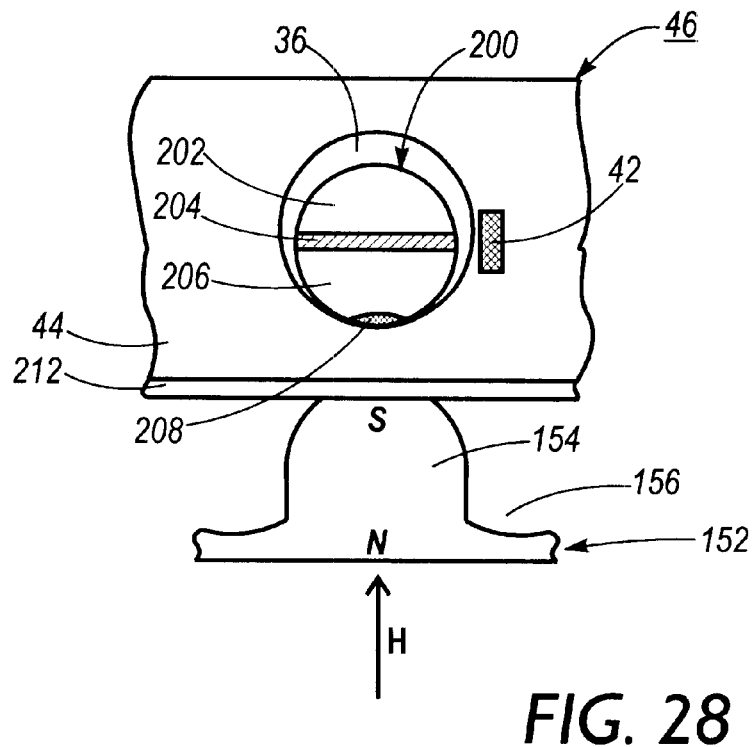
FIG. 28 shows a cross-sectional view of a eleventh embodiment of a gyricon sheet according to the present invention with a rotating element in a first orientation.
Figure 29:
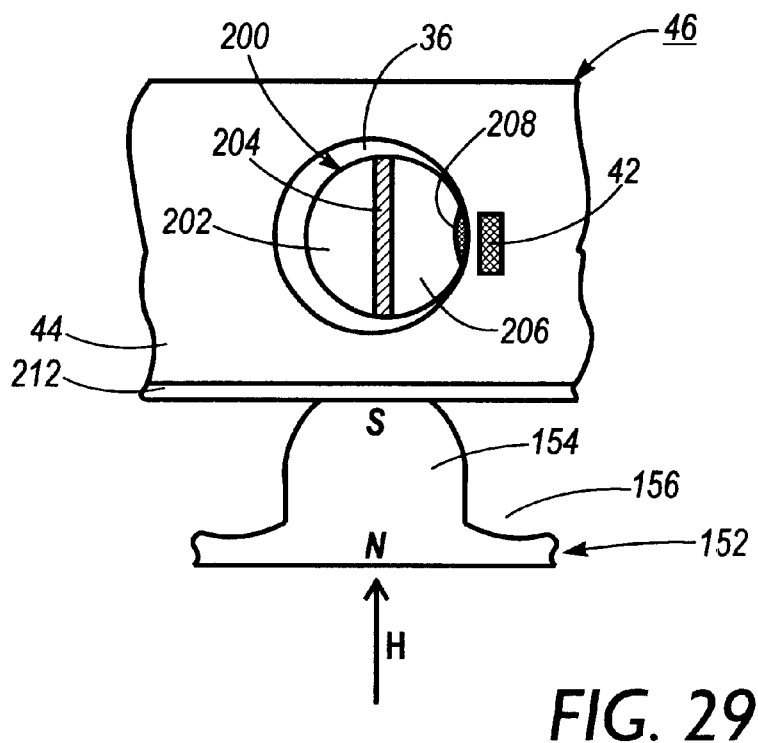
FIG. 29 shows a cross-sectional view of a eleventh embodiment of a gyricon sheet according to the present invention with a rotating element in a second orientation.

FIGS. 28 and 29 show a gyricon sheet 46 which has the magnetic elements of the embodiments shown in FIG. 26, therefore the same reference numerals will be used to denote the same elements. In FIG. 28 is shown a cross-section of a portion of a magnetically assisted Gyricon sheet 46. A spherical rotating element 200 is shown contained in an oil filed cavity 36. The rotating element 200 is different from the previous embodiments of rotating elements. The rotating element 200 has two transparent end segments 202, 206 and a thin, colored central segment 204 interposed between the two transparent end segments 202, 206. Additionally, the rotating element 200 has a polar permanently magnetic segment 208, of the same type as discussed hereinbefore adjacent to one of the transparent end segments 206. The rotating element 200 provides two optical states. The first is to display the colored central segment to an observer as shown in FIG. 28. However, when the rotating element 200, is rotated by 90 degrees, the colored central segment 204 is viewed edge on and the rotating element 200 appears substantially transparent allowing backing sheet 212 to be viewed. Backing sheet 212 can be a white, black, or colored or patterned sheet as known in the art. Gyricon devices utilizing rotating elements with transparent end segments and thin colored central segments are known in the art and a complete description of their operation and uses is contained in U.S. Pat. No. 5,717,514 by Sheridon titled "Polychromal Segmented Balls For A Twisting Ball Display", and U.S. patent application Ser. No. 08/960,865 by Sheridon et al. titled "Twisting Cylinder Display" incorporated by reference hereinabove.

A soft magnetic material pad 42 is incorporated near the cavity structure of each rotating element as shown in FIGS. 28 and 29. Notice that instead of being on the opposite side of the oil filled cavity 36 from the magnetic pad 152, as shown in FIG. 26, the magnetic pad 42 is place to one side of the oil filled cavity 36. This is to provide two rotational states, of the rotating element 200, which are 90 degrees from one another. The magnetic pad 152 is constructed from a uniform permanently magnetized rubber sheet which has had etched areas 156 removed to create magnetic hills 154 as discussed earlier.

In operation, the device would work as a magnetic trap device described hereinabove with an additional rotational state supplied by the soft magnetic material pad 42. The polar magnetic segment 208 would interact with either the magnetic pad 152 or the magnetic pad 42 to provide magnetic latching as discussed hereinabove. It should be noted that if the rotating element 200 is rotated from the magnetic pad 152 docked position it may not rotate in a direction that guarantees the polar magnetic segment 208 is adjacent to the soft magnetic material pad 42. For this reason, it is probably advisable not to undergo a complete 90 degree rotation when moving from the first state, shown in FIG. 28 to the second state, shown in FIG. 29. A slightly lesser rotation will ensure that the rotating element will rotate back to the first state in the same direction it took in rotating from the first state. It should be noted that the orientation of the polar magnetic segment 208 with respect to rotating element 200 rotation is guaranteed by the orientation of the rotating element 200 in the electric field.

It should also be noted that rotating element 320 shown in FIG. 17b is magnetically equivalent to rotating element 200 and could also be used in a gyricon sheet constructed similarly with a 90 degree latch. While the rotating element 200 provides two distinct states, one substantially transparent and one with a color, using the rotating element 320 would provide three states, the two magnetic latching states as described with respect to FIG. 28 plus the 90 degree latch state. The benefit to providing the 90 degree latch is that the rotating element would display ½ half of each color and the two unmagnetized segments 322, 324. If the unmagnetized segments were, for instance, chosen to be black and white, the 90 degree latch state would provide ½ black and ½ white, or grey.

Figure 30:
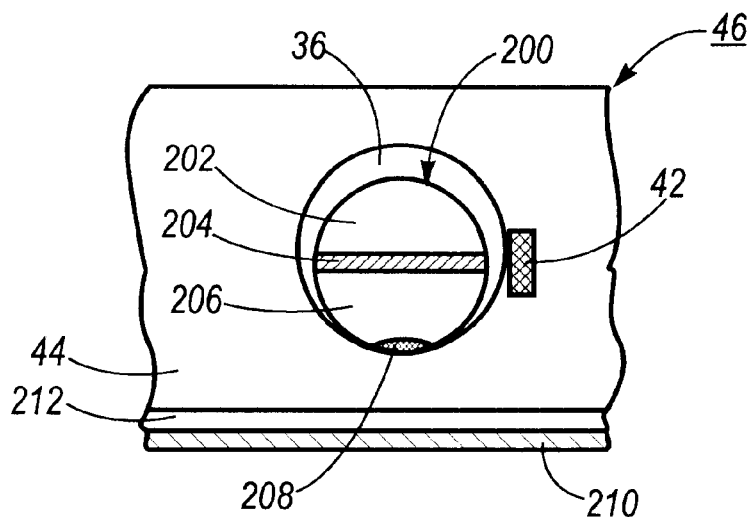
FIG. 30 shows a cross-sectional view of a twelfth embodiment of a gyricon sheet according to the present invention with a rotating element in a first orientation.
Figure 31:
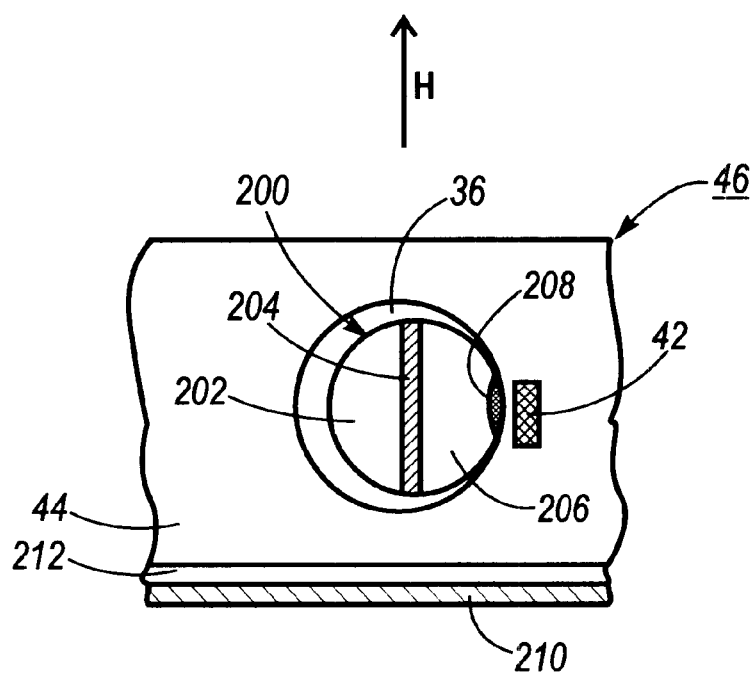
FIG. 31 shows a cross-sectional view of a twelfth embodiment of a gyricon sheet according to the present invention with a rotating element in a second orientation.

An alternative embodiment is shown in FIGS. 30 and 31. FIGS. 30 and 31 show a cross-sectional view of a similar sheet using the same elements as used in FIGS. 28 and 29, except that the patterned magnetic pad 152 has been replaced with a substantially uniform, thin soft magnetic material layer 210, as used hereinbefore with respect to FIG. 23 The device works similarly to the device described hereinbefore with respect to FIG. 27.

The soft magnetic layer 210 functions similarly to the soft magnetic pads 42 discussed herein before. The magnetic segment 208 of the rotating element 200 induces a non-uniform magnetic attractive force between the magnetic segment 208 and the soft magnetic layer 210. This magnetic force will cause the rotating element to be attached to the oil filled cavity wall. The magnetic force will also require a larger electrical field than otherwise to cause the rotating element 200 to start to rotate in the oil filled cavity 36 because the electrical field must first overcome the magnetic force to cause the rotating element 200 to rotate. However, except for the increased value of the applied electric field, the gyricon sheet 46 may be addressed by any of the addressing methods described herein above or known in the art. Once the rotating element 200 has rotated a short distance it will experience a much reduced force from interaction with the soft magnetic material layer 210 and the motion of the rotating element 200 will be dominated by the applied electrical field. Thus the soft magnetic material pad 42 and the soft magnetic material layer 210 provide two stable positions for the rotation of the rotating element 200 as the rotating element 200 will be attracted to each of them when it is positioned such that the polar magnetic segment 208 is adjacent to either the soft magnetic material pad 42 or the soft magnet material layer 210.

Rotating Element Fabrication

This rotating element can be fabricated as known in the art with a modified multiple rotating disk assembly, as described in U.S. Pat. No. 5,717,514 by Sheridon titled "Polychromal Segmented Balls. For A Twisting Ball Display", and U.S. patent application Ser. No. 08/960,865 by Sheridon et al. titled "Twisting Cylinder Display" and incorporated by reference hereinabove, or other planar stream/free jet type devices such as those disclosed in U.S. Pat. No. 5,344,594, titled "Method For Fabrication Of Multicolored Balls For A Twisting Ball Display", by Sheridon and also incorporated by reference hereinabove. The manufacturing process and apparatus has been detailed thoroughly hereinabove with respect to FIGS. 16 and 17. The manufacture of rotating element 200 requires the same 4 stream process as shown in FIGS. 16 and 17 with one stream to be used for the polar magnetic segment, two streams, one each, to be used for the two transparent end segments and one stream for the colored central segment.

Sheet Fabrication

Figure 32:
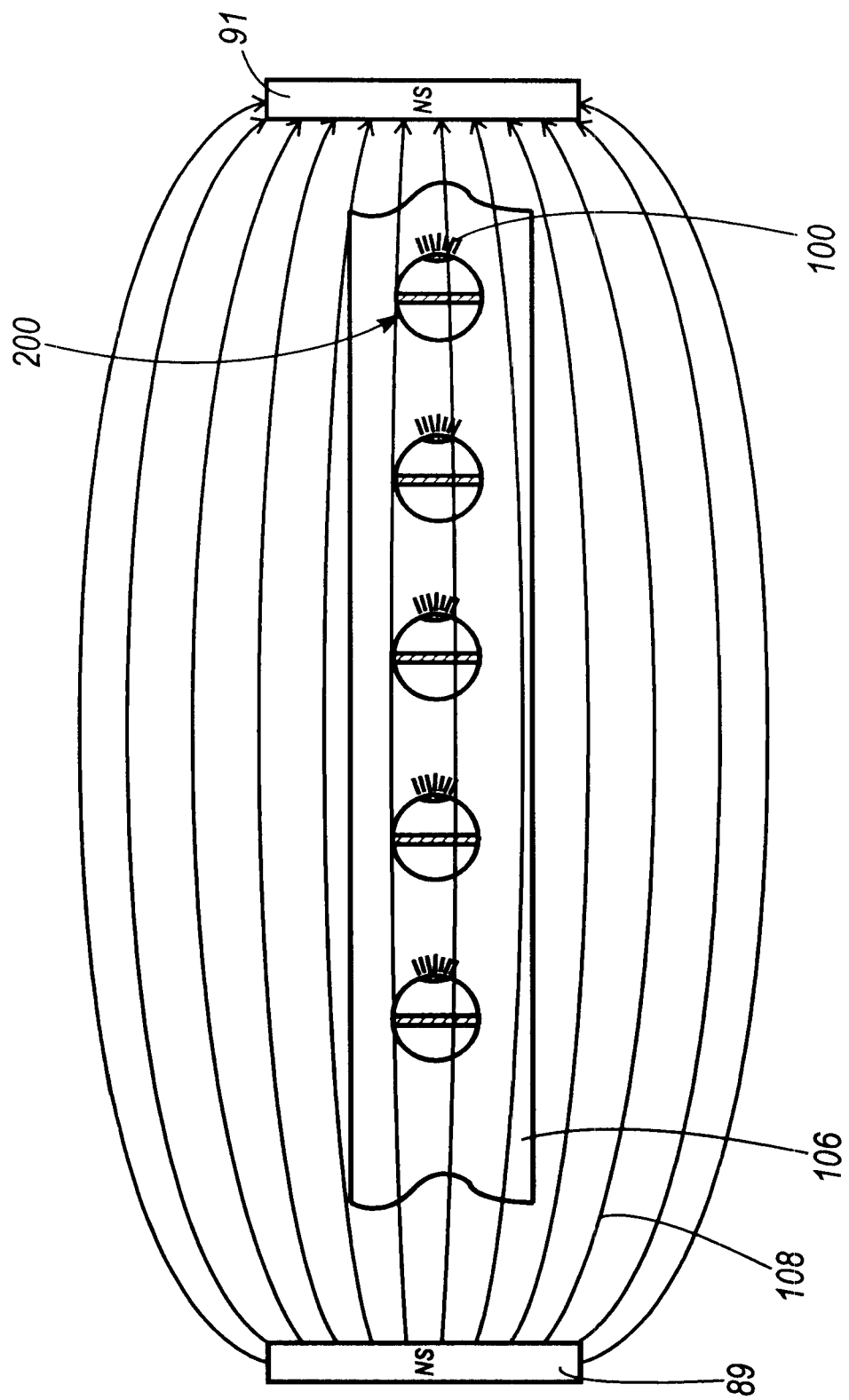
FIG. 32 shows a step in a process used to make a gyricon sheet shown in either FIGS. 28 and 29 or FIGS. 31 and 32.

The sheets may be fabricated using either Fabrication method 1 or Fabrication Method 3 of the sheet manufacturing techniques discussed hereinabove with respect to Gyricons having a single latched state and shown in FIGS. 7 through 12. It should be noted however, that when a strong magnetic field is applied to orient the rotating elements in a common direction, as shown hereinabove in FIGS. 7 and 12, that the magnetic field 108 should be oriented in a direction parallel to the plane of the uncured sheet 106 as shown in FIG. 32 when constructing the sheet with the 90 degree latch. The soft magnetic material layer may be provided by using the technique discussed herein above with respect to sheet Fabrication method 2 and solidifying the layer before particle migration has taken place. In all other respects, fabrication remains the same.

Unique Cylindrical Optical Gyricon Elements

All of the devices described thus far could have either cylindrical or spherical symmetry, but the magnetic modifications to control thresholding and to create binary latching can be also applied to some unique cases of rotating cylinders to accomplish the same ends. There are some characteristics unique to these cylindrical cases that require additional discussion.

Figure 33:
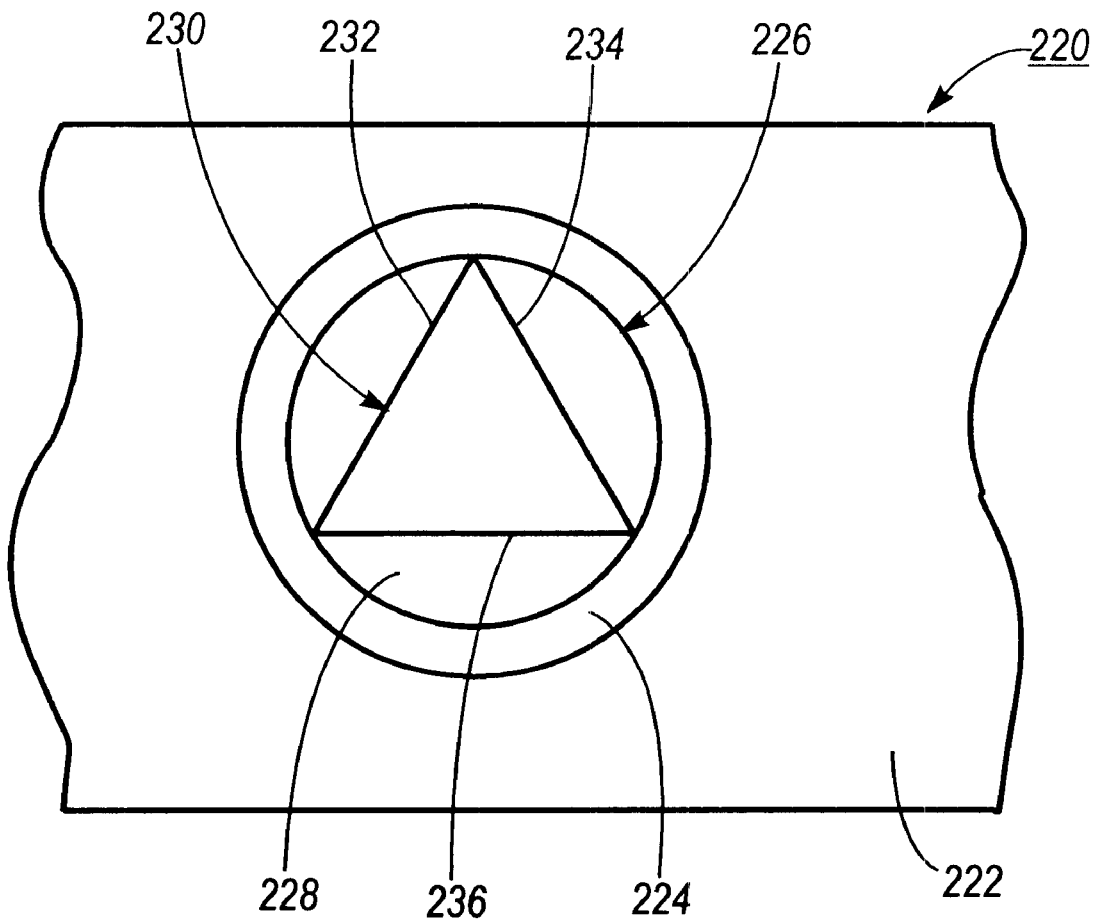
FIG. 33 shows a cross-sectional view of a prior art gyricon.

In Co-pending and now issued U.S. Pat. No. 5,894,367 titled "Twisting Cylinder Display Using Multiple Chromatic Values" by Sheridon, and incorporated by reference hereinabove, cylindrically rotating Gyricon optical elements are disclosed. A distinct advantage of these cylinderical elements is their ability to form a display capable of both additive color and good saturation of the basic colors. This is illustrated in FIG. 33 which also appears in U.S. patent application Ser. No. 08/960,868. FIG. 33 shows a cross-sectional view of a gyricon sheet 220 made from a transparent optical medium 222 having an oil filled cavity 224 enclosing a rotating element 226, as shown before. However, this rotating element 226 is comprised of a mul-tisided display surface 230 encased in a transparent cylinder 228. In this embodiment, the multisided display surface 230 has three display surfaces 232, 234, 236. Each display surface can be chosen to be a separate color, black, white or shades of grey to provide a gyricon sheet which can provide greyscale, highlight color or even a full-color RGB display. For the purposes of this discussion, let us assume that the three display surfaces 232, 234, and 236 are selected to be red, blue, and green respectively to provide a full color RGB display. As in the previous cases, the element is addressed by providing an electric field (not shown) which causes the rotating element 226 to rotate to the orientation desired.

Figure 34:
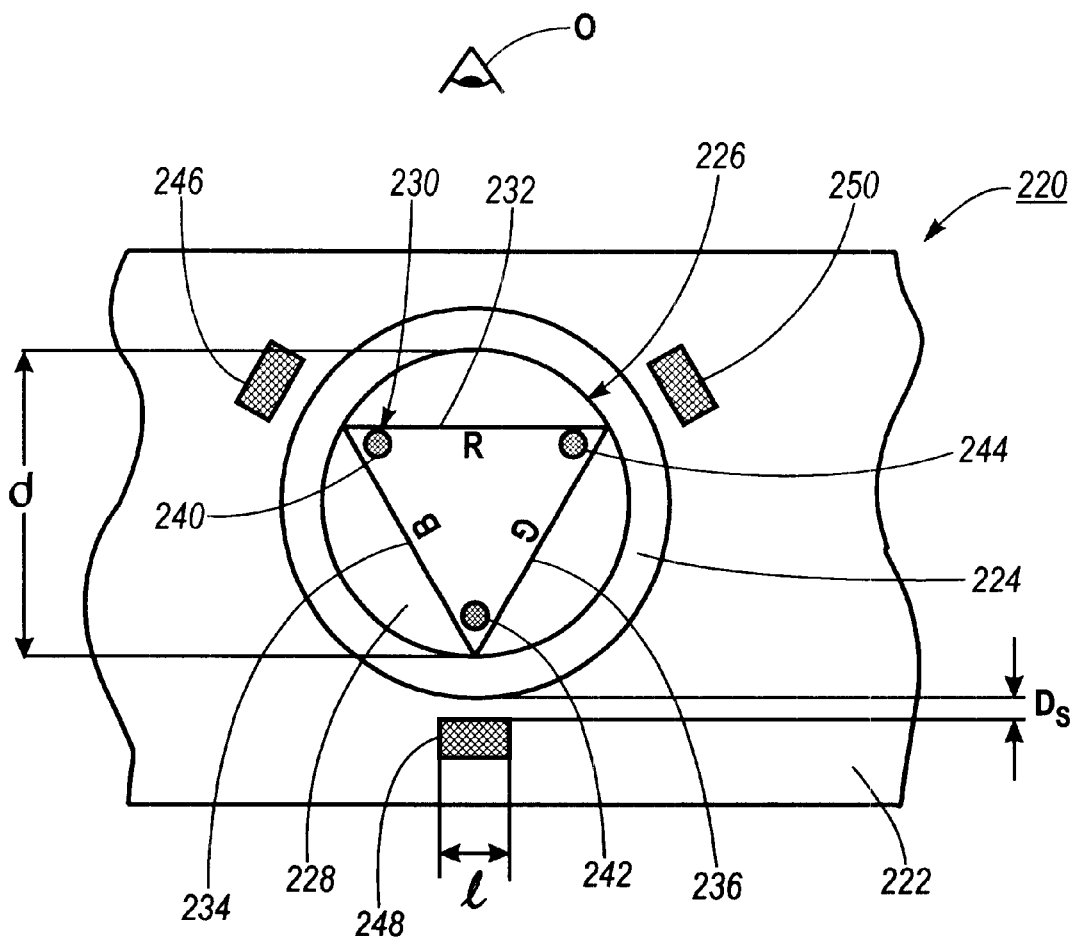
FIG. 34 shows a cross-sectional view of a thirteenth embodiment of a gyricon sheet according to the present invention.

FIG. 34 shows the gyricon sheet 220 shown in FIG. 33 after modifications to enable magnetic latching. As such, the same reference numerals will be used to identify the same elements. In FIG. 34, the rotating element has been rotated to a position to allow an Observer O to view the display surface 232, which is colored red. The rotating element 226 has been modified such that each vertex of the multisided display surface 230 has a magnetic portion resulting in three magnetic vertices 240, 242, 244. The magnetic vertex is shown as a small cylinder in the corner of each vertex of the multisided display element, however, this need not be so. The entire vertex could be magnetic, or small magnetic portions of other shapes could be included in the vertice. Additionally, while the entire vertices themselves could be made magnetic, the magnetic vertices are depicted as a small magnetic portion contained within the multisided display surface to eliminate any interference with the viewable color on the display surfaces 232, 234, 236 by the magnetic vertices 240, 242, 244. The magnetic vertices 240, 242, 244 are made from a magnetic material that has been perma- nently magnetized such as black magnetic pigment Type 031182 by Wright Industries, Brooklyn, N.Y. as discussed herein before. The soft magnetic material pads 246, 248, 250 are made from soft magnetic material, a magnetic material that is capable of developing a strong magnetic dipole strength while exposed to a strong external magnetic field, but that is not capable of retaining significant remnant magnetism when the field is removed, as discussed herein before.

In operation, this embodiment of the gyricon sheet works similar to other embodiments discussed hereinabove. That is, when the magnetized vertices 240, 242, 244 of the rotating element 226 are adjacent to the soft magnetic material pads 246, 248, 250 embedded next to the oil filled cavity 224, a strong magnetic force tends to hold the rotating element 226 in place. This is because the distance between the magnetized portions of the rotating element 226 and the soft magnetic material pads 246, 248, 250 is very short compared to the dimensions of the rotating element 226, thus providing a strong magnetic field. The soft magnetic material pads 246, 248, 250 are incorporated near the oil filled cavity 224 of each rotating element 226 as shown and separated from the oil filled cavity by a separation distance $D_s$. For practical purposes, the separation distance $D_s$ should be no more than the diameter d of the rotating element multiplied by a factor of three. The soft magnetic material pad 42 should preferably have a length l no smaller than ¼ of the rotating element diameter d. The only restriction on the upper limit of the length l is that it must not be so large as to interfere with surrounding rotational elements or their soft magnetic material pads. This will be dictated by the packing density of the gyricon sheet 46. Depending on the packing density, the length l of the soft magnetic material pad 42 can be as large as the diameter d of the rotating element 34 or even twice as large as the diameter d of the rotating element 34 or more. This magnetic force will require a larger electrical field than otherwise to cause the rotating element 226 to start to rotate in the oil filled cavity 224. Once the rotating element 226 has rotated a short distance it will experience a much reduced force from interaction with the soft magnetic material pads 246, 248, 250 and the motion of the rotating element 226 will be dominated by the applied electrical field.

Figure 35:
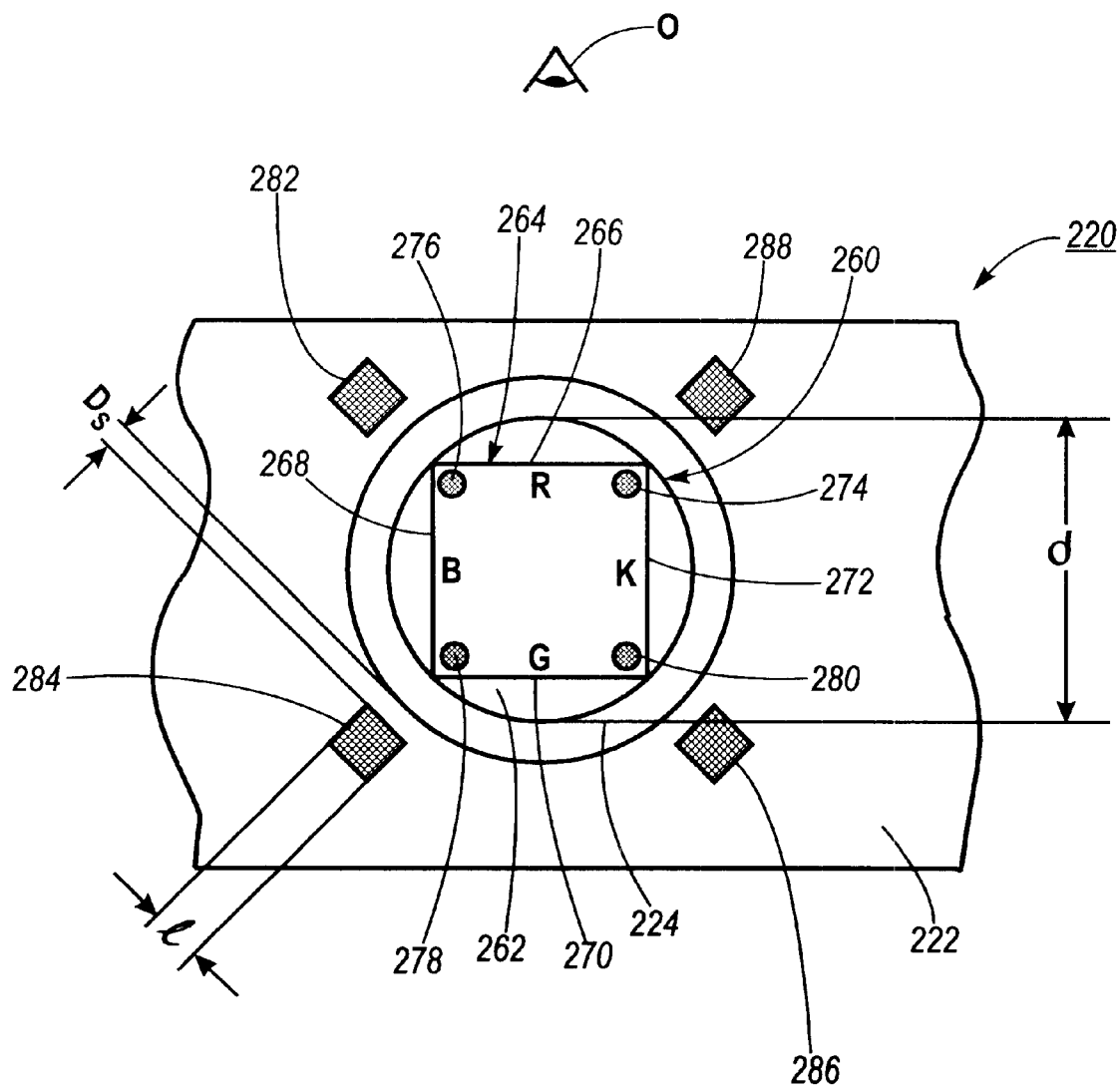
FIG. 35 shows a cross-sectional view of a fourteenth embodiment of a gyricon sheet according to the present invention.

It should be noted that the multisided display surface 230 need not be limited to three display surfaces 232, 234, 236 as shown in FIG. 34. For instance, FIG. 35 shows a modified version of the gyricon sheet 220 shown in FIG. 34. As such, the same reference numerals will be used to denote the same elements. FIG. 35 shows a cross-sectional view of a gyricon sheet 220 made from a transparent optical medium 222 having an oil filled cavity 224 enclosing a rotating element 260, as shown before. However, this rotating element 260 is comprised of a four sided multisided display surface 264 encased in a transparent cylinder 262. In this embodiment, the multisided display surface 230 has four display surfaces 266, 268, 270, 272. Each display surface can be chosen to be a separate color, black, white or shades of grey to provide a gyricon sheet which can provide greyscale, highlight color or even a full-color RGB display. For the purposes of this discussion, let us assume that the four display surfaces 266, 268, 270, 272 are selected to be red, blue, and green and black respectively to provide a full color RGB display. As in the previous cases, the element is addressed by providing an electric field (not shown) which causes the rotating element 260 to rotate to the orientation desired.

In FIG. 35, the rotating element has been rotated to a position to allow an Observer O to view the display surface 266, which is colored red. The rotating element 260 has been modified such that each vertex of the multisided display surface 264 has a magnetic portion resulting in four magnetic vertices 274, 276, 278, 280. Each magnetic vertex is shown as a small cylinder in the corner of each vertex of the multisided display surface 264, however, this need not be so. The entire vertex could be magnetic, or small magnetic portions of other shapes could be included in the vertex. Additionally, while the entire vertices themselves could be made magnetic, the magnetic. vertices are depicted as a small magnetic portion contained within the multisided display surface 264 to eliminate any interference with the viewable color on the display surfaces 266, 268, 270, 272 by the magnetic vertices 274, 276, 278, 280. The magnetic vertices 274, 276, 278, 280 are made from a magnetic material that has been permanently magnetized such as black magnetic pigment Type 031182 by Wright Industries, Brooklyn, N.Y. as discussed herein before. The soft magnetic material pads 282, 284, 286, 288 are made from soft magnetic material, a magnetic material that is capable of developing a strong magnetic dipole strength while exposed to a strong external magnetic field, but that is not capable of retaining significant remnant magnetism when the field is removed, as discussed herein before. The spacing and dimensions of the soft magnetic material pads 282, 284, 286, 288 follow the same parameters as set forth in the discussion hereinbefore with respect to FIG. 34.

In operation, this embodiment of the gyricon sheet works similar to other embodiments discussed hereinabove. That is, when the magnetized vertices 274, 276, 278, 280 of the rotating element 260 are adjacent to the soft magnetic material pads 282, 284, 286, 288 embedded next to the oil filled cavity 224, a strong magnetic force tends to hold the rotating element 260 in place. This is because the distance between the magnetized portions of the rotating element 260 and the soft magnetic material pads 282, 284, 286, 288 is short compared to the dimensions of the rotating element 260, thus providing a strong magnetic field. This magnetic force will require a larger electrical field than otherwise to cause the rotating element 260 to start to rotate in the oil filled cavity 224. Once the rotating element 260 has rotated a short distance it will experience a much reduced force from interaction with the soft magnetic material pads 282, 284, 286, 288 and the motion of the rotating element 260 will be dominated by the applied electrical field.

In both FIGS. 34 and 35 the magnetic portions of the rotating elements have been added at the vertices of the multisided display device. It should be noted that other arrangements are possible, for instance in the centers of the faces of each of the display surfaces. However, positioning the magnetic portions and the corresponding soft magnetic material pads adjacent to the vertices of the multisided display surface maximizes the display area on a display surface because it minimizes the amount of the viewable display surface which must be used to provide magnetic latching.

Rotating Element Fabrication

The rotating element shown in FIGS. 34 and 35 can be manufactured using known drawing techniques such as those discussed in U.S. patent application Ser. No. 08/960, 868 titled "A Twisting Cylinder Display Using Multiple Chromatic Values" and incorporated by reference hereinabove. U.S. patent application Ser. No. 08/960,868 discloses that a large format display element could be constructed from glass or plastic.

After assembly of the large format display element, one end of the large format display element is heated and a pulling device slowly draws filaments from the large format display element. In order to construct the display elements shown in FIGS. 34 and 35, four thin cylinders of magnetic material are added at the vertices. Because in this cylindrical structure there are many elements fused together, it should be understood that these components should mostly made from the same base polymer, differently pigmented or dyed as appropriate. This insures that all components of the cylinder have the same viscosity/temperature relationship to allow the filaments to be pulled" from a large format display element, as discussed in the U.S. Pat. No. 5,894,367. Likewise, these magnetic rods should probably also be made from the same base polymer, but with the substantial addition of magnetic pigment particles as discussed hereinbefore. When the filaments are being pulled from the large format display element they should be passed through a magnetic field, as discussed herein before and shown in U.S. Pat. No. 5,894,367 to insure that all display elements will be magnetized in the same orientation.

Sheet Fabrication

The gyricon sheet 220 and the soft magnetic material pads 282, 284, 286, 288 can be formed by mixing into an uncured elastomer soft magnetic material powder and magnetized rotating elements as discussed herein above with respect to FIG. 10. This is formed into an uncured sheet on a surface, and the curing is delayed to allow the. pigment particles to be attracted to the magnetized vertices of the rotating elements. The pigment particles will be attracted to the magnetized vertices because the magnetized vertices create a very non-uniform magnetic field in their vicinities. This field provides the mechanical force to move the pigment particles to the surface of the magnetized vertices of the rotating elements. When this process is sufficiently complete, a uniform magnetic field is applied to the sheet, causing the rotating elements and the attached soft magnetic material pigment particles, to rotate into common alignment, as is discussed hereinabove with respect to FIG. 12. While this field is continuously applied the elastomer sheet is cured as is known in the art. The sheet can then be swelled, as is also known in the art.

It will be understood that the shape of the soft magnetic material pad 42 will tend to conform to the shape of the rotating element 34 due to the method of manufacture of the soft magnetic material pad 42. For instance, the soft magnetic material pad 42 may tend to curve slightly and mimic the shape of the rotating element 34. Furthermore it will be understood that FIG. 34 shows a cross-sectional view for a cylindrically shaped rotating element and the pad will tend to form in an elongated shape for a cylindrically shaped rotating element.

Addressing Methods for Hard Magnetic Material Trap Devices

Two addressing methods exist for addressing the hard magnetic material trap devices described above. The first of these is to apply an electric field of sufficient strength to overcome the magnetic fields holding the rotating elements in place. Except for the increased value of the applied electric field, the gyricon sheet can be addressed by any of the addressing techniques described herein above or known in the art. The advantages of this method are simplicity in design of the addressing device, however the disadvantage lies in the greater strength of the electric field that must be applied.

The second of these is to apply a small, localized magnetic field of the opposite polarity to negate the magnetic field holding a rotating element in place. This small, localized magnetic field will "unlock" a specific rotating element, or a set of rotating elements, and allow rotation if an electric field of the correct polarity s concurrently applied. While this method has the advantage that smaller strength fields need to be generated it comes at the cost of added complexity in the design of the addressing device.

The disclosure up to this point has focussed on using local magnetic fields to provide greater stability of rotating elements in a gyricon sheet because the rotating elements can be latched into a desired position by using the local magnetic fields. The local magnetic fields provide stability against inadvertent rotation of elements that may occur due to stray electrical fields when a gyricon sheet is, for instance, handled in order to address the rotating elements and switch them from one position to another an electric field is applied which is strong enough to overcome the local magnetic field and cause the rotating elements to rotate to a new desired state. However, the local magnetic fields necessarily increase the strength of the electric field needed to cause rotation of the elements. The most stable stored images will necessarily have the strongest local magnetic fields and require the strongest applied electrical fields to cause rotation of the rotating elements to effect an image change. However, stronger electrical fields require more bulky and expensive equipment to generate and, if strong enough, may present a possible hazard to the user. Therefore, it would be desirable to construct a gyricon sheet which uses strong local magnetic fields for stability and a means of addressing such sheets that uses only low to moderate strength electric fields to address the rotating elements within the sheets.

An addressing means that does not require the stronger electric fields needed to overcome the strong local magnetic fields can be made by using an external magnetic field which temporarily 'unlocks' the rotating element in conjunction with a reduced electrical addressing field. The external magnetic field will counteract the local magnetic field experienced by the rotating element and effectively lowering the magnetic field experienced by the rotating element. The external magnetic field thereby permits lower electrical fields to be used for addressing the rotating elements.

Figure 36:
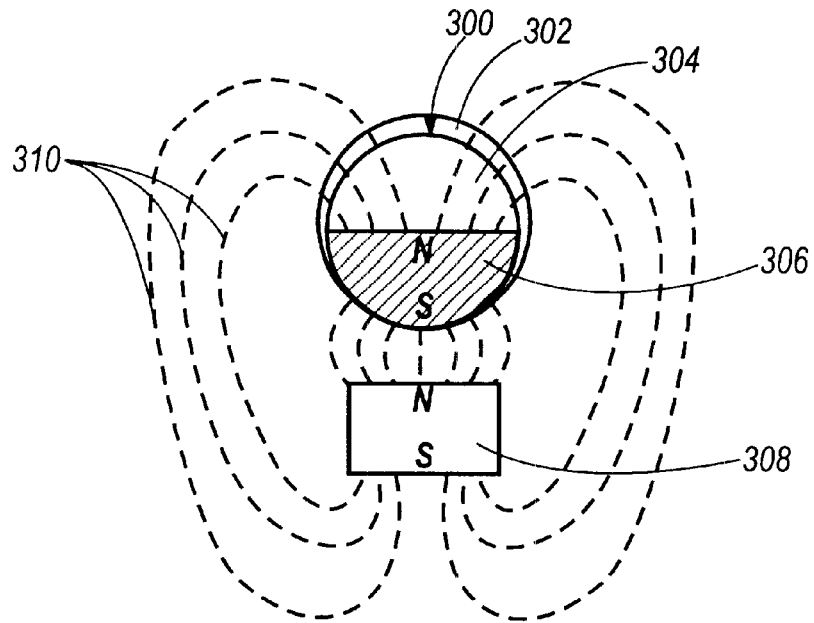
FIG. 36 shows a cross-sectional view of a magnetic model of a gyricon sheet shown in any of FIGS. 20–24.
Figure 37:
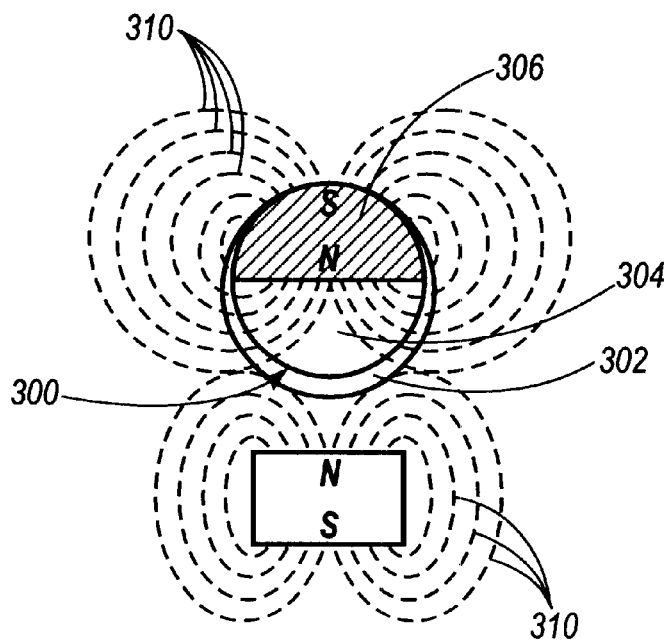
FIG. 37 shows a cross-sectional view of a magnetic model of a gyricon sheet shown in any of FIGS. 20–24.

FIGS. 36 and 37 show a rotating element 300 trapped in an oil filled cavity 302. The rotating element 300 has two segments, a magnetic segment 306 and a non-magnetic segment 304. Additionally, a magnet 308 having dimensions comparable to the rotating element 300 is disposed near the oil filled cavity 302. FIGS. 36 and 37 are consistent with the description of magnetic trapping devices discussed hereinabove with respect to FIGS. 20–23 and could represent any of the configurations discussed with respect to FIGS. 20–23. Additionally shown in FIGS. 36 and 37 are dominant magnetic field lines 310 that exist between the rotating element 300 and the magnet 308. In FIG. 36 the rotating element 300 is trapped in the position where the magnetic segment 306 is proximate to the magnet 308. This is the position where the magnetic segment 306 and the magnet 308 are oriented so they attract each other. The field lines 310 are seen to connect between the two magnets, indicating their attraction for each other.

In FIG. 37 the rotating element 300 is trapped in the position where the magnetic segment 306 is repulsed by the magnetic 308. Here it can be seen that the dominant magnetic field lines 310 from the magnetic segment 306 and the dominant magnetic field lines of the magnet 308 tend to repel each other.

Figure 38:
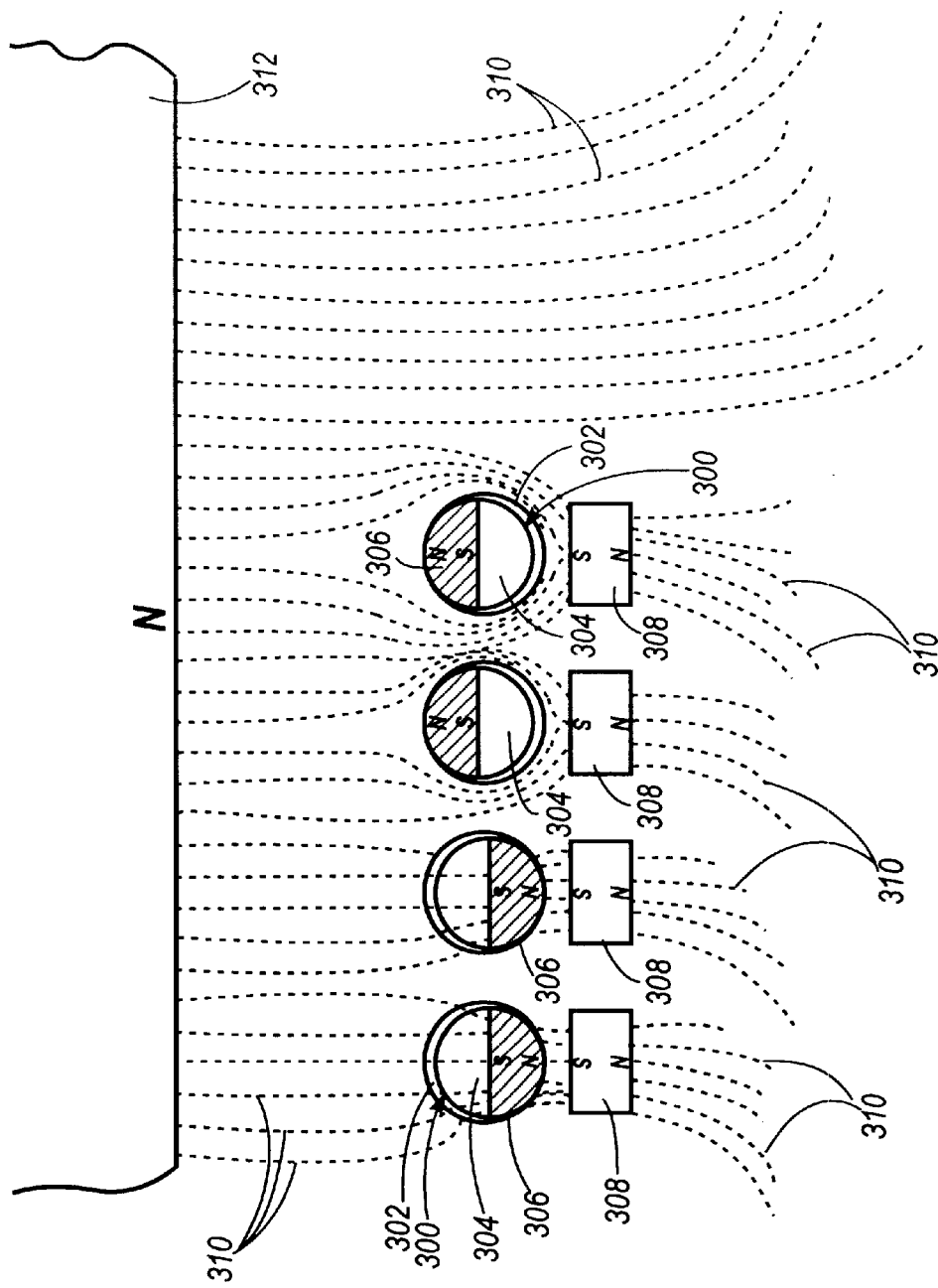
FIG. 38 shows the cross-sectional view shown in FIG. 37 with an additional magnet added.

FIG. 38 shows the constructions of FIGS. 36 and 37 where an external magnetic field has been added in the form of a uniform and relatively large magnet 312. By large it is meant that the size of the magnet 312 is much larger than the diameter of the rotating elements 300 by a factor of at least 10. Two sets of rotating elements 300 are depicted. The first set depicts the rotating elements 300 where the magnetic segment 306 is attracted to the magnet 308, as shown in FIG. 36. The second set depicts the rotating elements 300 where the magnetic segment 306 is repulsed by the magnetic 308 as depicted in FIG. 37. The dominant magnetic field lines 310 are re-drawn to show the influence of the large, relatively uniform magnet 312. It should be pointed out that while in this depiction the external magnetic field has been supplied using a magnet, other forms of supplying a magnetic field are known, such as an electric current changing linearly with time or a direct current in a coil. The means for supplying the external magnetic field is not important, only its size and magnitudes important.

Since both the rotating element 300 and the magnetic pad 308 are made partially from magnetic material that has a high permeability, many of the magnetic field lines associated with the large, uniform magnet 312 will bend to pass through and around these lesser magnets, as shown in FIG. 38. This effect causes the magnetic field associated with the magnet 312 to be non-uniform in the vicinity of both the rotating elements 300 and their associated magnets 308, creating mechanical forces that will be comparable to and oppositely acting to the forces associated with the magnetic fields 310 that exist between the rotating element 300 and the magnet 308 as shown in FIGS. 36 and 37. Effectively, this external magnetic field is nullifying the effects of the magnetic field associated with the magnet 308. The strength of the magnetic field 310 created by the external magnet 312, or other magnetic field generating means as described above, decreases as the magnet 312 is pulled away from the rotating elements 300.

While the decreased magnetic field condition, as shown in FIG. 38 exists, if an electrical field of less than sufficient strength to overcome the magnetic fields when the external magnetic field is not present is placed across the rotating elements 300 then the electric field will cause the rotating elements 300 to rotate. The following Figures illustrate how the magnetic unlocking mechanism operates for the rotating element 300.

In FIG. 39, the magnet 312 is some distance away from rotating element 300 and unable to supply a sufficient magnetic field to affect the rotating element 300. The rotating element 300 is in the condition in which it is attracted to the magnet 308. The magnet 312 is approaching the rotating element from the side opposite to the magnet 308.

FIG. 40 shows the magnet 312 being moved closer to the rotating element 300. As the magnet 312 is moved closer to the rotating element 300, the gradient of its magnetic field in the vicinity of the rotating element 300 increases to the point where it provides more attraction to the rotating element 300 than the magnet 308. When this condition occurs, the rotating element 300 is lifted from the cavity wall and suspended in the oil filled cavity 302.

FIG. 41 illustrates that when an external electrical field is applied across the rotating element 300 by using a charge differential 314 of the required polarity while the rotating element 300 is suspended in the oil filled cavity 302, the electric field will cause the rotating element 300 to rotate. When this happens, the rotating element 300 will also move toward the upper cavity wall of the oil filled cavity 302. This can also happen if the magnet 312 is strong enough to lessen the effect of the magnet 308, but not suspend rotating element 300 within the cavity. In that case, the rotating element 300 will still be in contact with the wall of the oil filled cavity 302, as illustrated in FIG. 39, but will rotate and move towards the upper cavity wall of the oil filled cavity 302 when the electric field is applied.

FIG. 42 shows the removal of magnet 312. As the magnet 312 is pulled away from the rotating element 300, the rotating element 300 will come under the magnetic dominance of the magnet 308 once again, locking it into its newstate. The rotating element 300 is now in the orientation where it is repelled by the magnet 308.

If the electrical addressing field were not present, the rotating element 300 would not have rotated and upon removal of the magnet 312 the rotating element 300 would simply have returned to its initial condition, as shown in FIG. 39.

In FIG. 43, the magnet 312 is again depicted some distance away from rotating element 300 and unable to supply a sufficient magnetic field to affect the rotating element 300. However, the rotating element 300 is in the orientation in which it is repelled from the magnet 308. The magnet 312 is approaching the rotating element from the side opposite to the magnet 308.

Figures 43, 44, 45, 46:
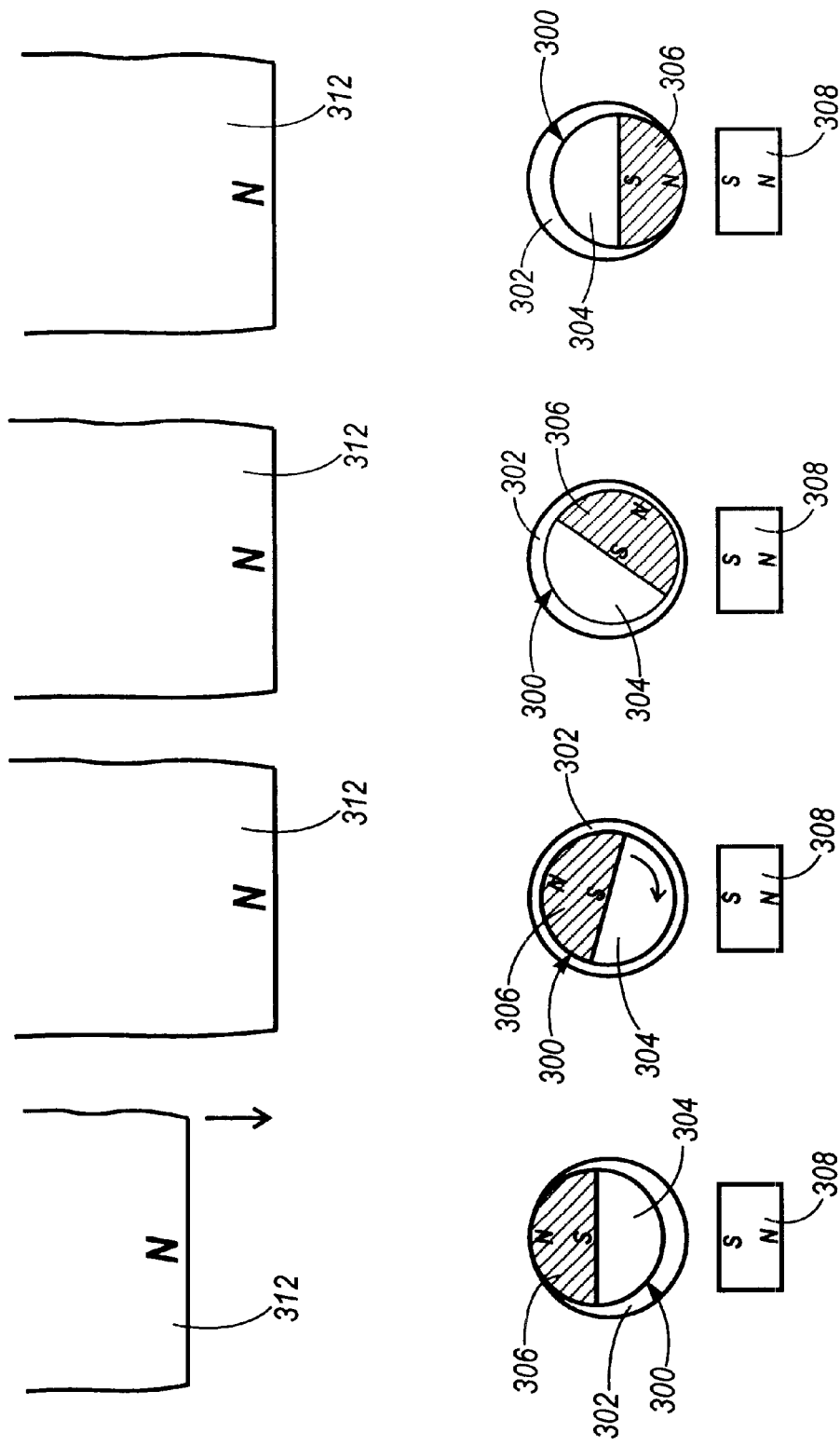
FIG. 43 shows a first step in an addressing process, according to the present invention, for a gyricon sheet shown in FIGS. 20–24.
FIG. 44 shows a second step in an addressing process, according to the present invention, for a gyricon sheet shown in FIGS. 20–24.
FIG. 45 shows a third step in an addressing process, according to the present invention, for a gyricon sheet shown in FIGS. 20–24.
FIG. 46 shows a fourth step in an addressing process, according to the present invention, for a gyricon sheet shown in FIGS. 20–24.

FIG. 44 depicts the magnet 312 moving closer to the rotating element 300. The increasing magnetic field from the magnet 312 will eventually cause the rotating element 300 to be repulsed from the upper wall of the oil filled cavity 302 and be suspended in the oil filled cavity 302. The force of the magnetic field from the magnet 312 also causes the rotating element 300 to begin to rotate.

FIG. 45 shows further movement of the rotating element 300 in the oil filled cavity 302 when the magnet 312 is kept in proximity to the rotating element 300. The force of the magnetic field from the magnet 312 continues to cause the rotating element 300 to rotate.

FIG. 46 shows the result of the rotation. The rotating element 300 ends up in the stable condition where it is attracted to the magnet 308. When the magnet 312 is removed the rotating element 312 will remain locked in place under the influence of the magnetic field from the magnet 308.

It should be noted that in the sequence depicted in FIGS. 43–46, the rotating element 300 rotated without the presence of an electric field. This shows that a magnetic field alone can be used to set all the rotating elements 300 to the same orientation or to clear the gyricon display of a displayed image. Had an electric field been present across the rotating element 300 the rotation of the rotating element shown in FIGS. 44–46 could have been prevented. However, this is an inherently unstable condition, and preventing rotating element 300 rotation would have required either a large electrical field as the magnet 312 was moved closer to the rotating element, or precisely controlled magnetic strengths of the magnet 308, magnetic segment 306 of the rotating element 300 and magnet 312.

FIGS. 47–51 apply the concepts shown in FIGS. 39–46 to show how addressing with a magnetic unlocking device in conjunction with an electrical field work on a gyricon sheet. Because the model and elements used in FIGS. 39–46 is identical to the model used in FIGS. 39–46 the same reference numerals will be used for the same elements, however the letter "a", "b", "c", or "d" will be appended to the reference numerals to denote a particular rotating element and all the elements associated with that particular rotating element for clarity.

Figure 47:
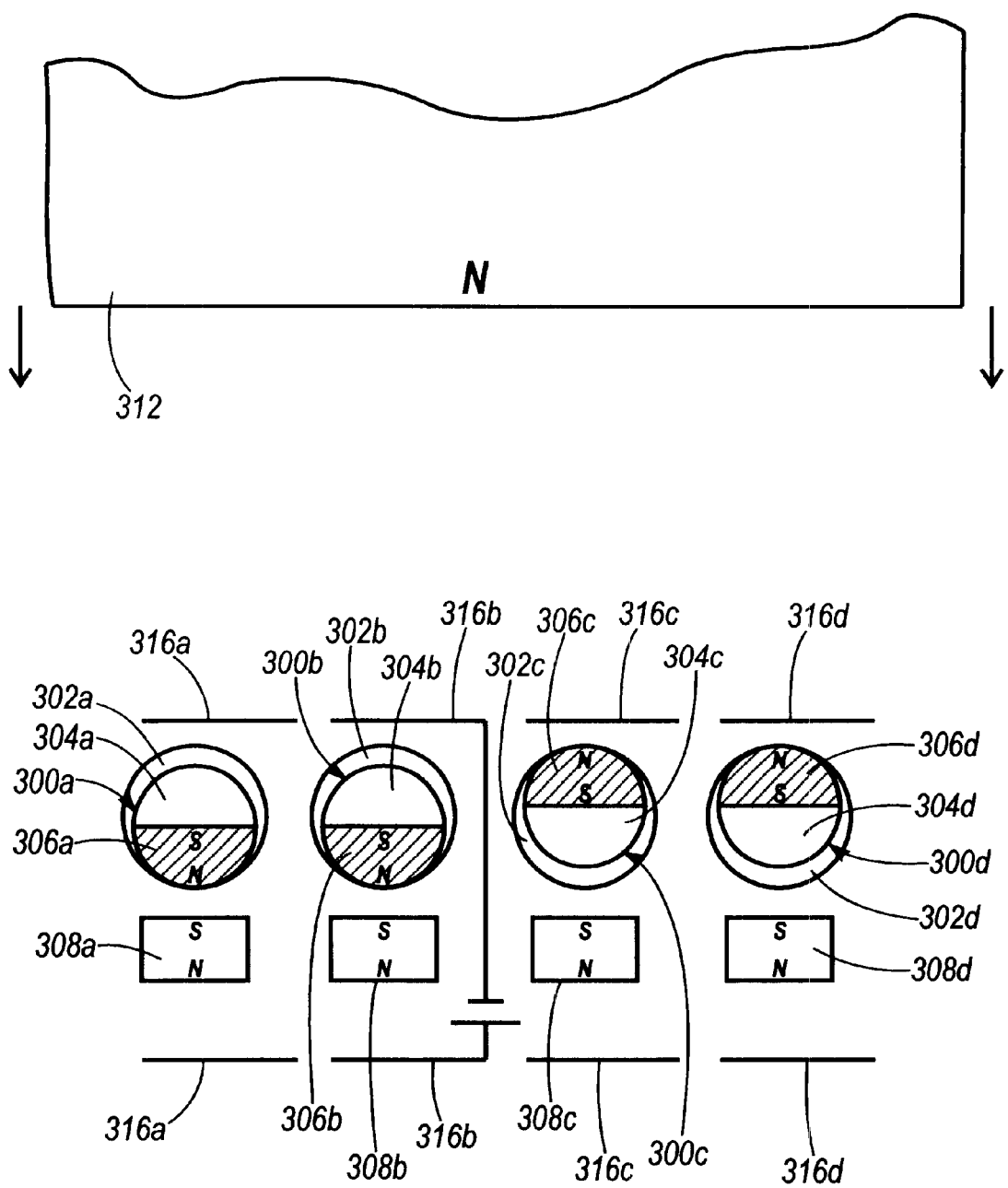
FIG. 47 shows a first step in an addressing process, according to the present invention, for a gyricon sheet shown in FIGS. 20–24.

FIG. 47 shows four rotating elements 300a, 300b, 300c, 300d. Rotating elements 300a and 300b are oriented in the state where they are attracted to their magnets 308a and 308b respectively. Rotating elements 300c and 300d are oriented in the state where they are repelled by their magnets 308c and 308d, respectively. A pair of electrodes 316a, 316b, 316c, 316d are associated with each rotating element 300a, 300b, 300c, 300d to represent the application of an electric field across the rotating elements 300a, 300b, 300c, 300d. An electric field exists when a pair of electrodes 316b has a charge differential 314b placed across it. While an electric field may be applied across a pair of electrodes 316b using a charge differential 314b, other methods are also known and may be used such -as image wise charge placement on the surface of a sheet. The magnet 312 is moving closer to the rotating elements 300a, 300b, 300c, 300d but is sufficiently distant from the rotating elements 300a, 300b, 300c, 300d that the magnetic fields from the magnet 312 have no impact on the rotating elements 300a, 300b, 300c, 300d. The charge differential 314b on the electrodes 316b and its associated electric field is also too small to cause rotation of the rotating element 300b.

Figure 48:
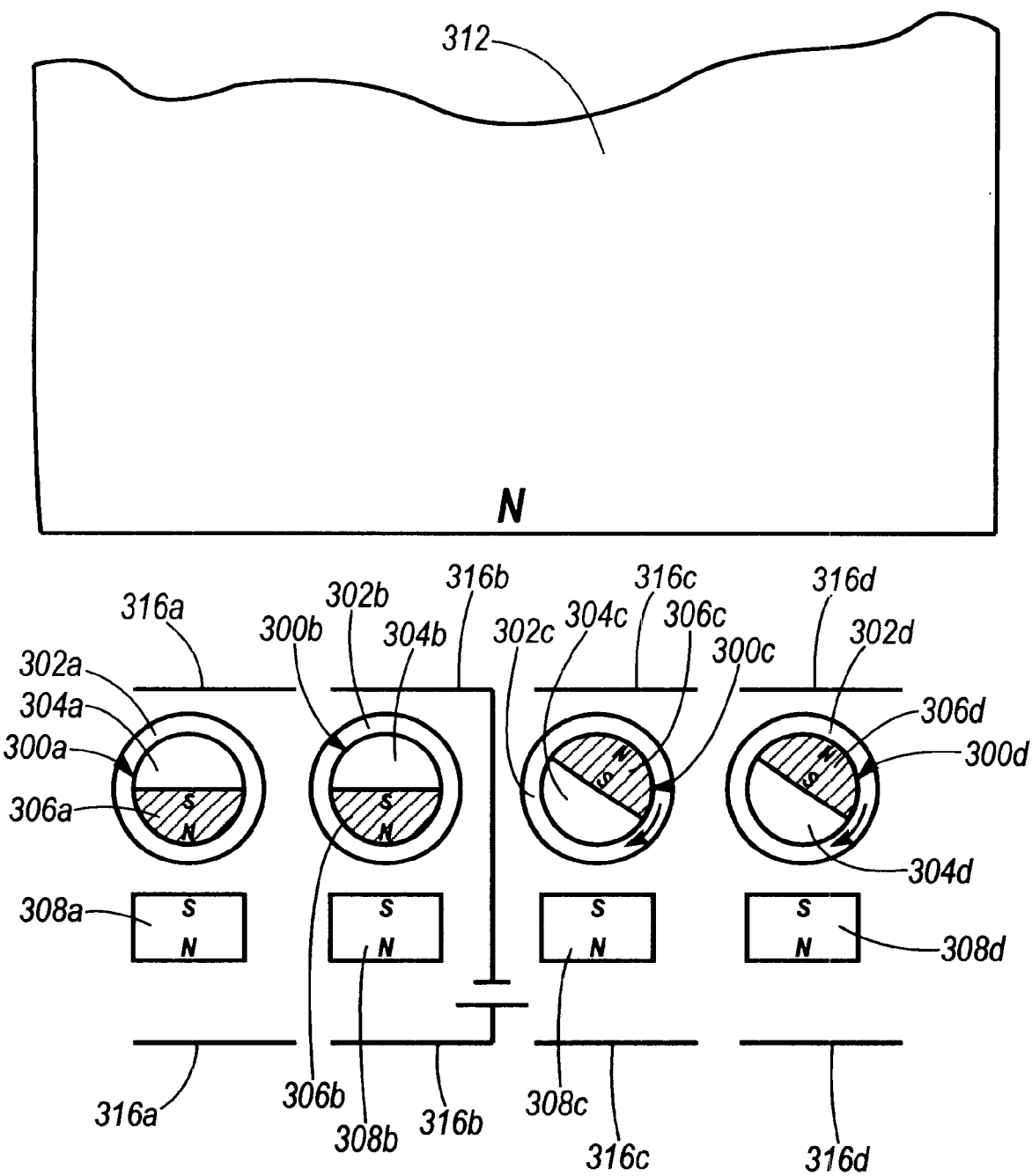
FIG. 48 shows a second step in an addressing process, according to the present invention, for a gyricon sheet shown in FIGS. 20–24.

In FIG. 48, the magnet 312 has moved sufficiently close to the rotating elements 300a, 300b, 300c, 300d that its associated magnetic field provides the dominant effect on the rotating elements 300a, 300b, 300c, 300d. Rotating elements 300a, and 300b are attracted to the magnet 312 and are suspended in their oil filled cavities 302a, 302b. Rotating elements 300c and 300d are repelled from the magnet 312 and are also suspended in their oil filled cavities 302c and 302d Additionally, the magnetic field associated with the magnet 312 has started to induce rotation in rotating elements 300c and 300d. The charge differential 314b across electrodes 316b and the associated electric field is still ineffectual in inducing rotation in rotating element 300b because the magnetic field from magnet 312 is the dominant force.

Figure 49:
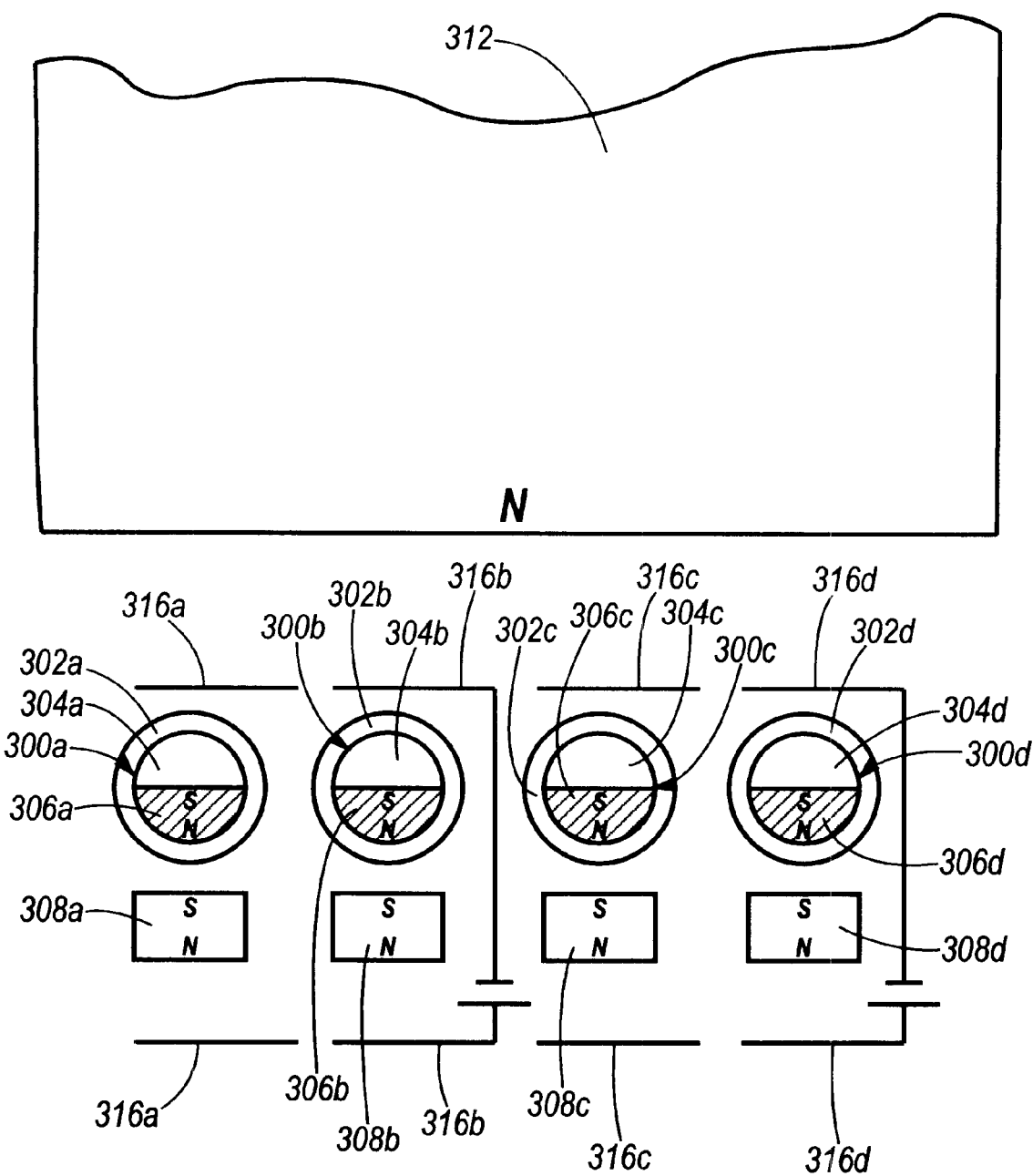
FIG. 49 shows a third step in an addressing process, according to the present invention, for a gyricon sheet shown in FIGS. 20–24.

FIG. 49 shows the return of a steady state condition after the rotation of rotating elements 300c and 300d showing that all the rotating elements 300a, 300b, 300c, and 300d are in the same orientation. The magnetic field from magnet 312 is still the dominating force. Additionally, a charge differential 314d has been placed across electrodes 316d to apply and electric field across rotating element 300d. If it is desired that any element be in the opposite state then an electric field must be placed across that element before the magnet 312 is removed to cause rotation of that rotating element. It should be noted that the electric field could have been placed earlier in the process with no harmful effects as has been illustrated with element 300b.

Figure 50:
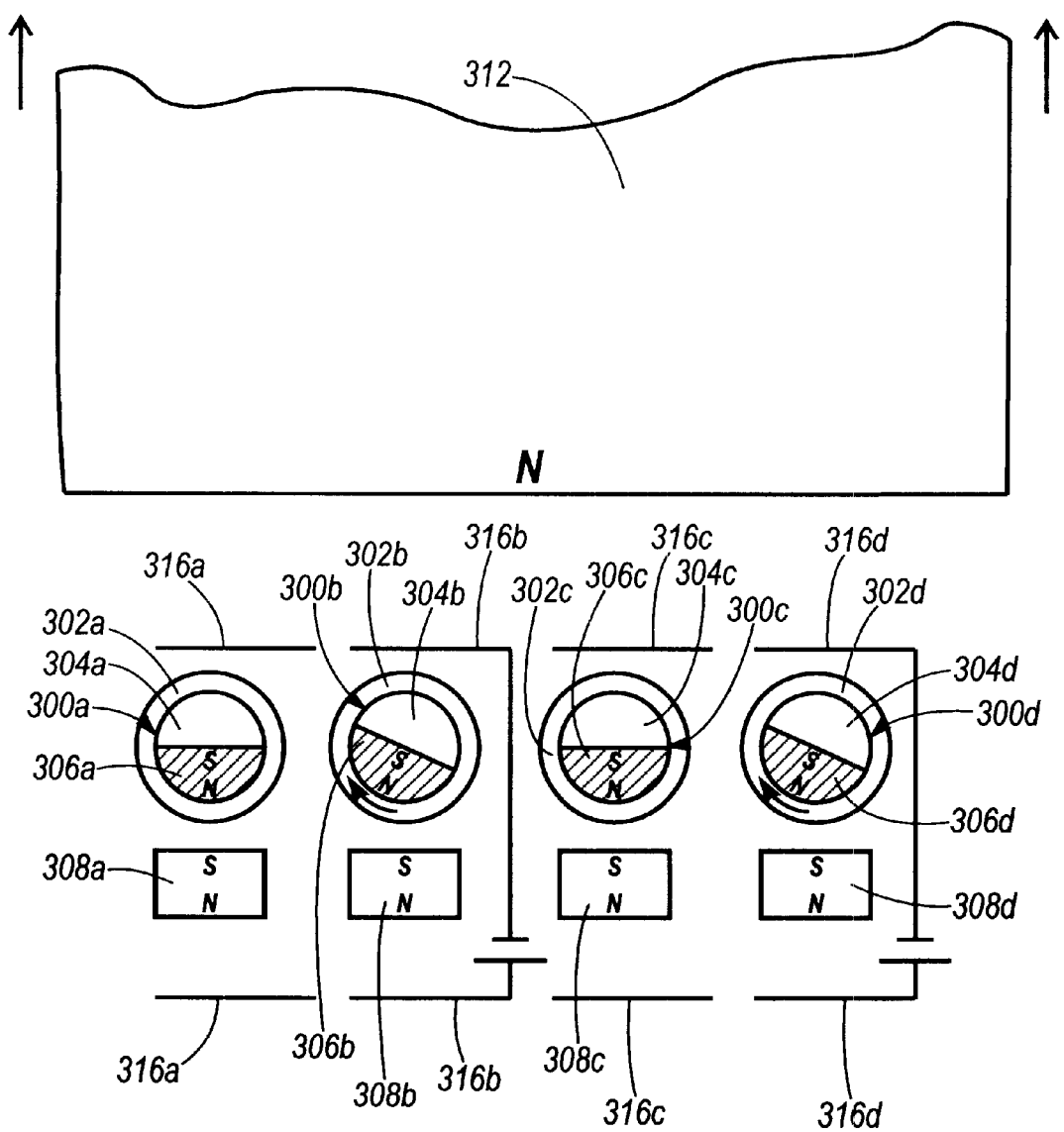
FIG. 50 shows a fourth step in an addressing process, according to the present invention, for a gyricon sheet shown in FIGS. 20–24.

FIG. 50 shows the magnet 312 being moved away from the rotating elements 300a, 300b, 300c, and 300d. As the magnet 312 is moved away from the rotating elements 300a, 300b, 300c, 300d, the effects of its magnetic field on the rotating elements 300a, 300b, 300c, 300d will decrease. As it is further withdrawn the magnet 312 and the magnets 308a, 308b, 308c, 308d will exert equal and nearly opposite forces on the ball. Under these conditions the electric field exerted by the charge differential 314b, 314d on the electrodes 316b, 316d will cause the associated rotating elements 300b, 300d to rotate.

Figure 51:
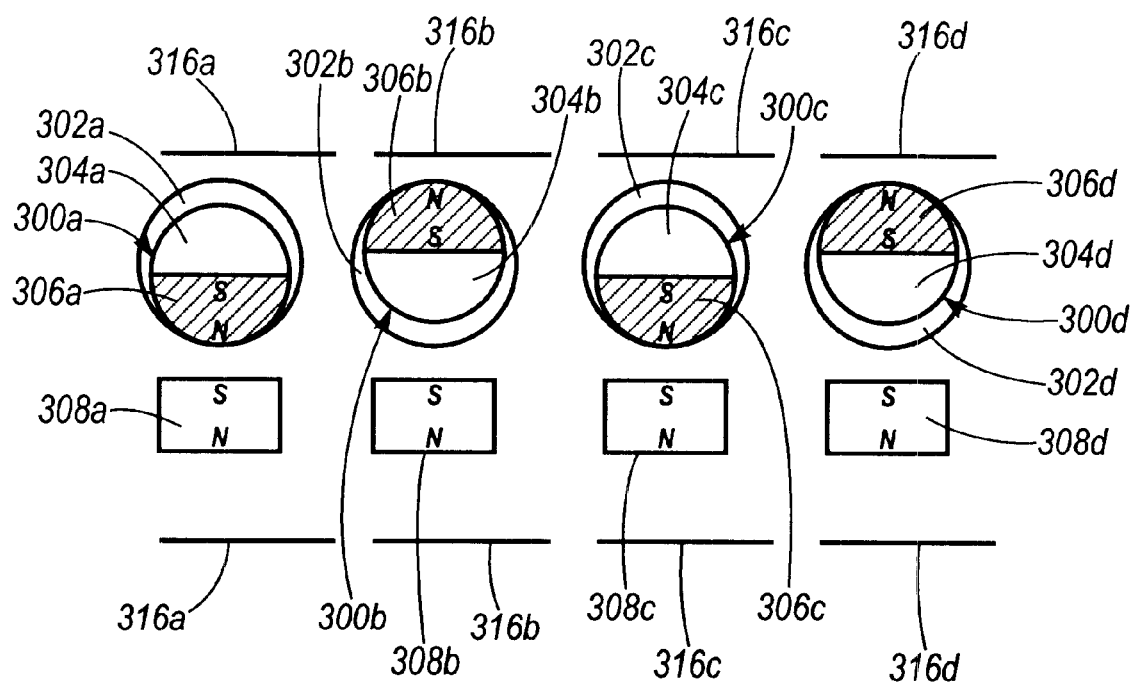
FIG. 51 shows a cross-section of a gyricon sheet shown in FIGS. 20–24 after it has been addressed according to the process shown in FIGS. 47–50.

FIG. 51 shows the stable state of the rotating elements 300a, 300b, 300c, and 300d after the magnet 312 has been completely withdrawn. Rotating elements 300a, 300c and now in the orientation where the rotating elements 300a, 300c are attracted to their associated magnets 308a, 308c respectively and rotating elements 300b, 300d are in the orientation where the rotating elements 300b, 300d are repelled by their associated magnets 308b, 308d respectively.

As can be seen from the above sequence, there is a great deal of leeway in how the addressing steps are performed. If no electric field is placed across any of the rotating elements while the magnet 312 is brought into proximity of the rotating elements, then all the elements will be changed to and remain in the same state. Therefore, if only "erasure" of the image is required then no electric fields are required. Any electric field that is desired to cause rotating elements to rotate may be placed across those rotating elements during any time in the process from before the magnet 312 is brought into proximity to the rotating elements up to the point where the magnet 312 is about to moved away from the rotating elements. So long as the electric field is in place prior to removal of the "unlocking" magnet field of the magnet 312 then the rotating elements will be rotated. The addressing sequence can also be broken down into two steps, the first being the approach of the magnet 312 with no applied electric fields to effect "erasure" of any image followed by the rapport of the magnet 312 with applied electric fields to effect "writing" of a new image.

With this method of addressing the rotating elements there are minimal requirements on the accuracy of the strengths of the magnets used in the system (magnets 308, magnet 312 and magnetic segments 306 of rotating elements 300) and for careful placement of the magnet 312. Simply moving magnet 312 close enough to rotating elements 300 to create an excess magnetic field and then moving it away suffices to satisfy the system requirements.

The above sequence illustrates a magnet 312 of a "north" polarity approaching the rotating elements from one side only. It should be noted that the same sequence can be implemented using a magnet of the opposite polarity so long as it also approaches the rotating elements from the opposite side.

This concept shown above may be implemented in several ways. For instance, any of the methods for providing and electric field and addressing a gyricon sheet, which are already known, such as those discussed hereinabove, may be combined with either a sheet magnet or a scanning magnet of sufficient strength. A scanning addressing system can be made by combining previously known scanning addressing systems, such as that discussed in U.S. Pat. No. 5,389,945, by Sheridon titled "Writing System Including Paper-Like Digitally Addressed Media and Addressing Device Therefor" and incorporated by reference hereinabove, with a magnet to be scanned as well. The magnetic field can be created by using a permanent magnet, or an electromagnet energized by a current flowing through a coil or any other method form creating a magnetic field.

What is claimed is:

1. A material comprising:
   a) a substrate having two opposed surfaces,
   b) at least one element, which can be made rotatable by a non-destructive operation, having a diameter and a circumference, disposed in the substrate, said element comprising at least two portions, each portion having an associated optical modulation characteristic, the optical modulation characteristic of at least one portion being different from the optical modulation characteristic of at least one other portion, wherein one portion is capable of being permanently magnetized and one portion is not capable of being permanently magnetized, and wherein the element has an anisotropy for providing an electrical dipole moment, the electrical dipole moment rendering the element electrically responsive such that when the rotating element is rotatably disposed in an electric field while the electrical dipole moment of the element is provided, the element tends to rotate to an orientation in which the electrical dipole moment aligns with the field, and
   c) additional permanently magnetized means so constructed and arranged such that when the portion of the element which is capable of being permanently magnetized is magnetized and the element is oriented such that the magnetized portion of the element is the portion of the element nearest the additional permanently magnetized means a magnetic attractive force will exist between the additional permanently magnetized means and the magnetized portion of the element, and when the element is oriented such that the magnetized portion of the element is the portion of the element farthest away from the additional permanently magnetized means a magnetic repelling force will exist between the additional permanently magnetized means and the magnetized portion of the element.

2. The material of claim 1 wherein said at least one element has been made rotatable.

3. The material of claim 1 wherein said at least one element is substantially spherical.

4. The material of claim 1 wherein said at least one element is substantially cylindrical.

5. The material of claim 1 wherein said at least one element is further constructed and arranged such that each portion comprises a segment and said element is comprised of at least two segments arrayed substantially parallel to one another, wherein each segment is adjacent to at least one other segment and to no more than two other segments, each segment adjacent to exactly one other segment is an exterior segment, and each segment adjacent to exactly two other segments is an interior segment.

6. The material of claim 5 wherein said at least one element further comprises at least three segments.

7. The material of claim 6 wherein the segment of said at least one element which is capable of being permanently magnetized is an exterior segment.

8. The material of claim 7 wherein the exterior segment capable of being permanently magnetized is a polar end segment.

9. The material of claim 6 wherein said at least one element further comprises at least four segments.

10. The material of claim 9 wherein the segment of said at least one element which is capable of being permanently magnetized is an exterior segment.

11. The material of claim 9 wherein the exterior segment capable of being permanently magnetized is a polar segment.

12. The material of claim 1 wherein the additional permanently magnetized means is so constructed and arranged to provide a non-uniform magnetic field wherein the provided magnetic field is stronger in the vicinity of said at least one element.

13. The material of claim 12 wherein the additional permanently magnetized means comprises at least one magnetized element disposed within said substrate and associated with an element, spaced from the associated element.

14. The material of claim 12 wherein the additional permanently magnetized means comprises a magnetized sheet adhered to one surface of the substrate.

15. The material of claim 12 further comprising at least one soft magnetic material pad disposed within said substrate, associated with an element, spaced from the associated element and the additional permanently magnetized means, and so constructed and arranged such that when the at least one portion of the element which is capable of being permanently magnetized is magnetized and the element is oriented such that the at least one magnetized portion of the element is the portion of the element nearest the soft magnetic material pad a magnetic attractive force will exist between the soft magnetic material pad and the at least one magnetized portion.

16. The material of claim 15 wherein the soft magnetic material pad and the additional magnetized means are opposed to each other.

17. The material of claim 15 wherein the soft magnetic material pad and the additional magnetized means are transverse to each other.

18. The material of claim 15 wherein the soft magnetic material pad has a length which is no smaller than approximately one-fourth of the diameter of said at least one element.

19. The material of claim 15 wherein the soft magnetic material pad is separated from said at least one element by no more than approximately the diameter of said at least one element multiplied by a factor of three.

20. A material comprising:
   a) a substrate
   b) at least one rotatable element disposed in the substrate, said rotatable element having a diameter and a circumference and said element comprising at least two segments arrayed substantially parallel to one another, wherein each segment is adjacent to at least one other segment and to no more than two other segments, each segment adjacent to exactly one other segment is an exterior segment, and each segment adjacent to exactly two other segments is an interior segment, each segment having an associated optical modulation characteristic, the optical modulation characteristics of at least one segment being different from the optical modulation characteristic of at least one other segment, wherein one segment is capable of being permanently magnetized and one segment is not capable of being permanently magnetized, and wherein the element has an anisotropy for providing an electrical dipole moment, the electrical dipole moment rendering the element electrically responsive such that when the rotating element is rotatably disposed in an electric field while the electrical dipole moment of the element is provided, the element tends to rotate to an orientation in which the electrical dipole moment aligns with the field, and
   c) additional permanently magnetized means so constructed and arranged such that when the portion of the element which is capable of being permanently magnetized is magnetized and the element is oriented such that the magnetized portion of the element is the portion of the element nearest the additional permanently magnetized means a magnetic attractive force will exist between the additional permanently magnetized means and the magnetized portion of the element, and when the element is oriented such that the magnetized portion of the element is the portion of the element farthest away from the additional permanently magnetized means a magnetic repelling force will exist between the additional permanently magnetized means and the magnetized portion of the element.

21. The material of claim 20 wherein said at least one element is substantially spherical.

22. The material of claim 20 wherein said at least one element is substantially cylindrical.

23. The material of claim 20 wherein the segment of said at least one element which is capable of being permanently magnetized is an exterior segment.

24. The material of claim 23 wherein the exterior segment capable of being permanently magnetized is a polar end segment.

25. The material of claim 20 wherein the additional permanently magnetized means is so constructed and arranged to provide a non-uniform magnetic field wherein the provided magnetic field is stronger in the vicinity of said at least one element.

26. The material of claim 20 further comprising at least one soft magnetic material pad disposed within said substrate, associated with an element, spaced from the associated element and the additional permanently magnetized means, and so constructed and arranged such that when the at least one portion of the element which is capable of being permanently magnetized is magnetized and the element is oriented such that the at least one magnetized portion of the element is the portion of the element nearest the soft magnetic material pad a magnetic attractive force will exist between the soft magnetic material pad and the at least one magnetized portion.

* * * * *